United States Patent [19]
Yoshizawa et al.

[11] Patent Number: 5,142,666
[45] Date of Patent: Aug. 25, 1992

[54] LEARNING SYSTEM IN A NEURON COMPUTER

[75] Inventors: Hideki Yoshizawa; Hiroki Iciki; Hideki Kato, all of Tokyo; Kazuo Asakawa, Kanagawa; Yoshihide Sugiura, Tokyo; Hiroyuki Tsuzuki, Kanagawa; Hideichi Endoh; Takashi Kawasaki; Toshiharu Matsuda, all of Kawasaki; Hiromu Iwamoto, Yokohama; Chikara Tsuchiya, Tokyo; Katsuya Ishikawa, Kawasaki, all of

[73] Assignee: Fujitsu Limited, Kanagawa, Japan

[21] Appl. No.: 486,644

[22] Filed: Feb. 28, 1990

[30] Foreign Application Priority Data

Mar. 1, 1989 [JP] Japan .................... 1-48880

[51] Int. Cl.⁵ .................... G06F 15/18; G09C 1/100
[52] U.S. Cl. .................... 395/24; 395/27
[58] Field of Search .................... 364/513; 395/24, 27

[56] References Cited
U.S. PATENT DOCUMENTS 4,972,473 11/1990 Ejiri et al. .................... 364/513
5,038,282 8/1991 Gilbert et al. .................... 364/200

Primary Examiner—Allen R. MacDonald
Assistant Examiner—George Davis
Attorney, Agent, or Firm—Nikaido, Marmelstein, Murray & Oram

[57] ABSTRACT

A learning system in a neuron computer includes a neural network for receiving an analog signal from a first analog bus through an analog input port in a time divisional manner and performing a sum-of-the-products operation, and outputting an analog output signal to a second analog bus. A control pattern memory stores a pattern of a signal for controlling the neural network. A sequencer produces an address of the control pattern memory and a weight memory. The weight memory stores weight data of the neural network. A digital control unit controls the neural network, control pattern memory, sequencer, and weight memory, and executes a learning algorithm. The learning system further includes an input control unit provided on the input side of the neural network for selecting an input signal for executing the learning algorithm input from the digital control unit or an analog input signal input from the analog input port.

11 Claims, 47 Drawing Sheets

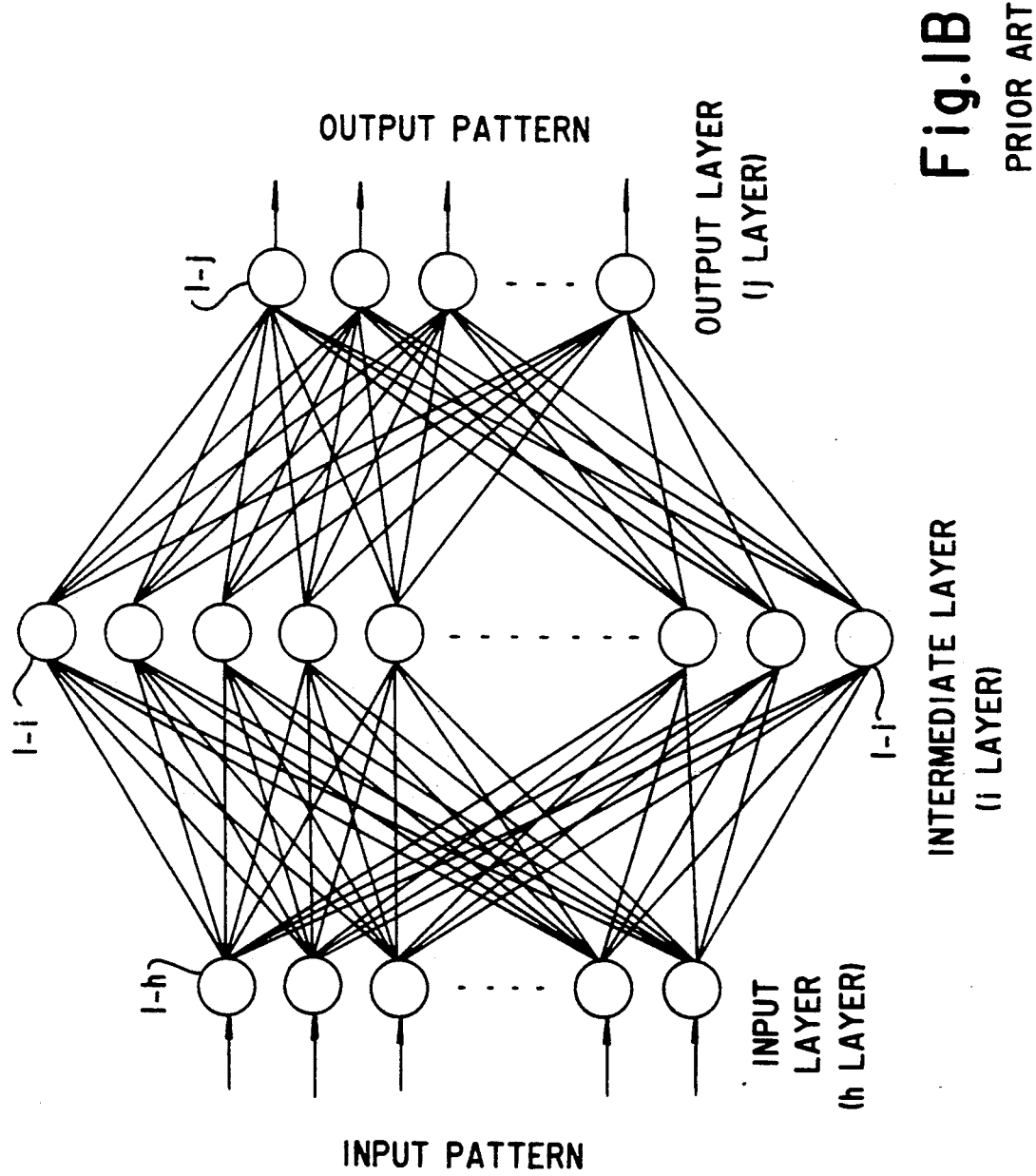

| Fig.4A | Fig.4B |
|---|---|
| | Fig.4C |

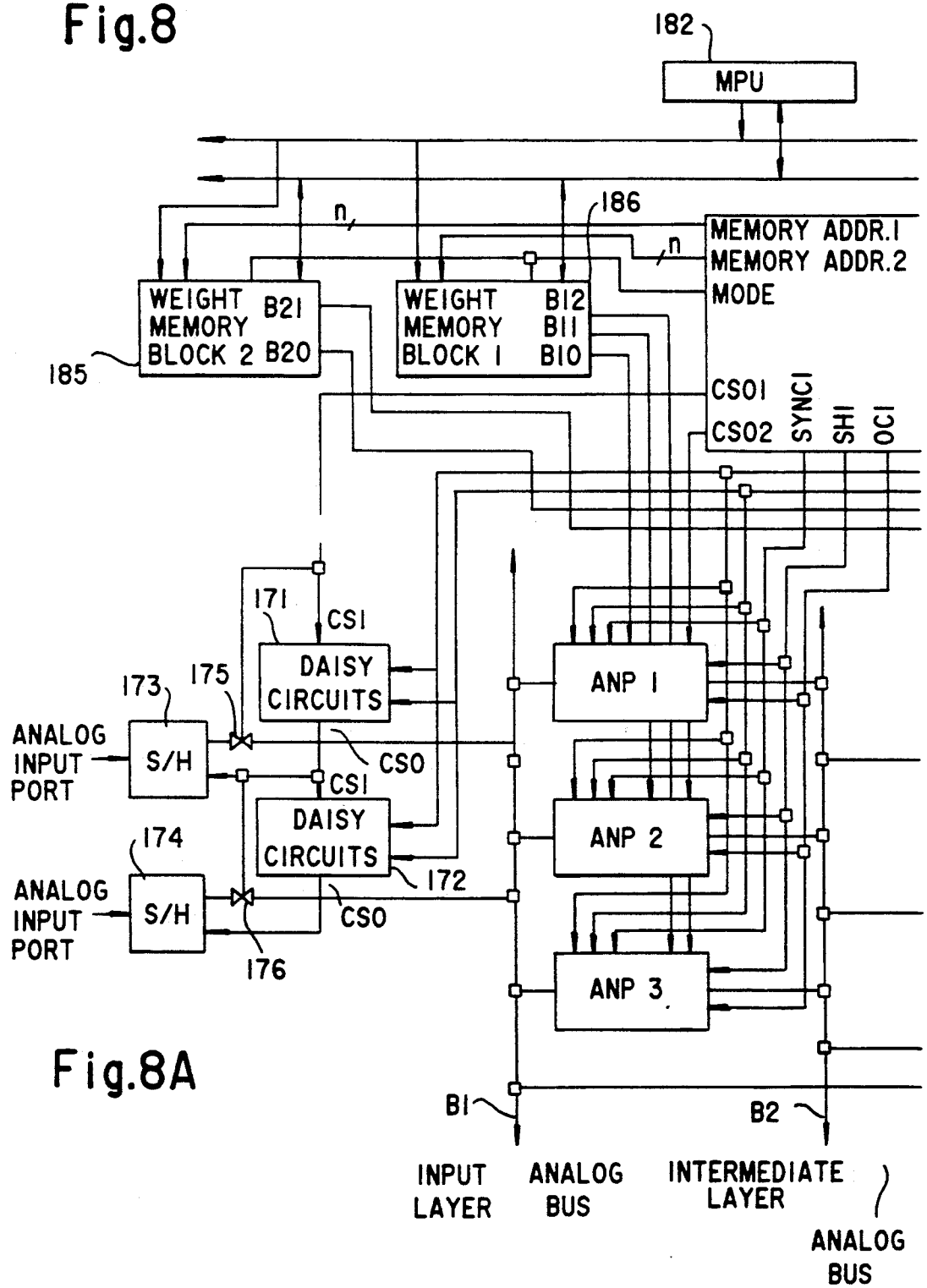

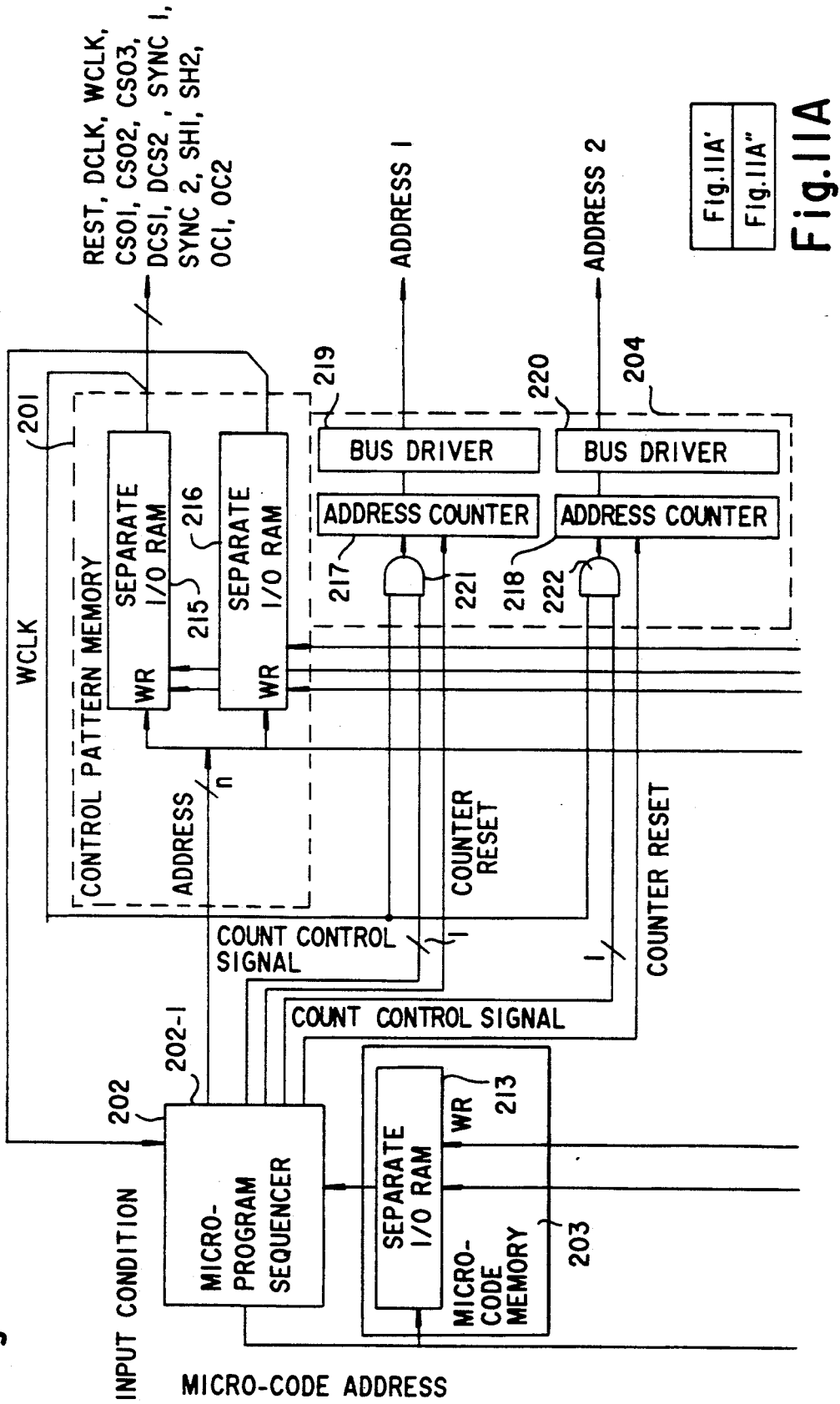

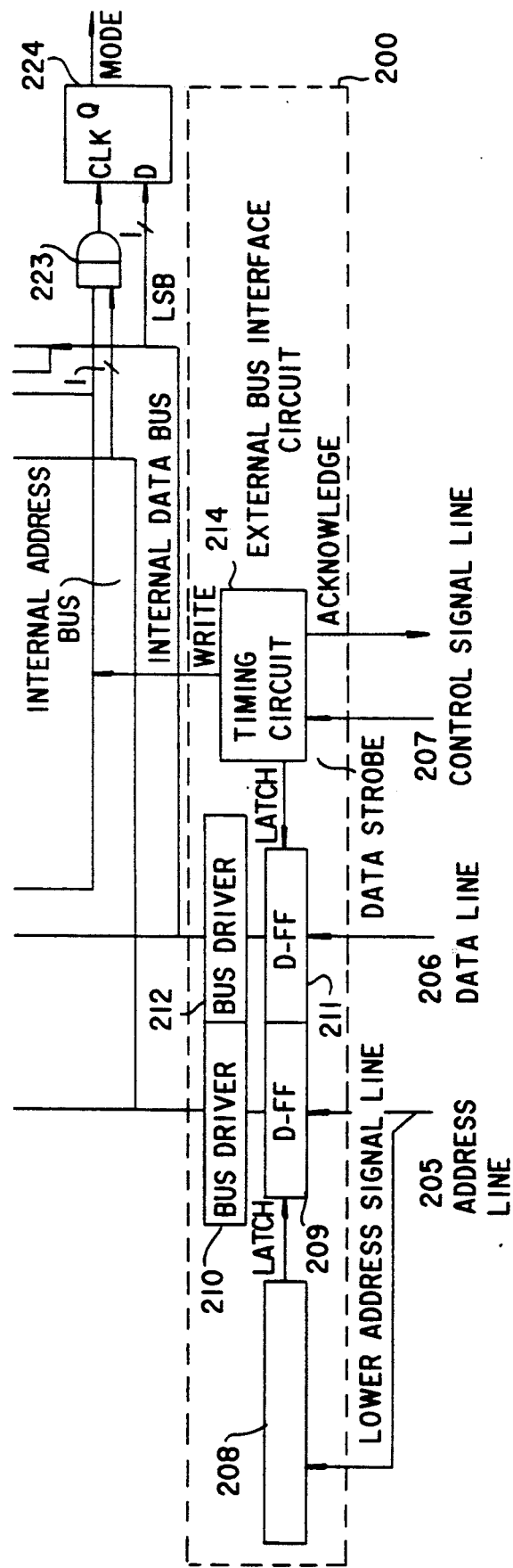
Fig.11A"

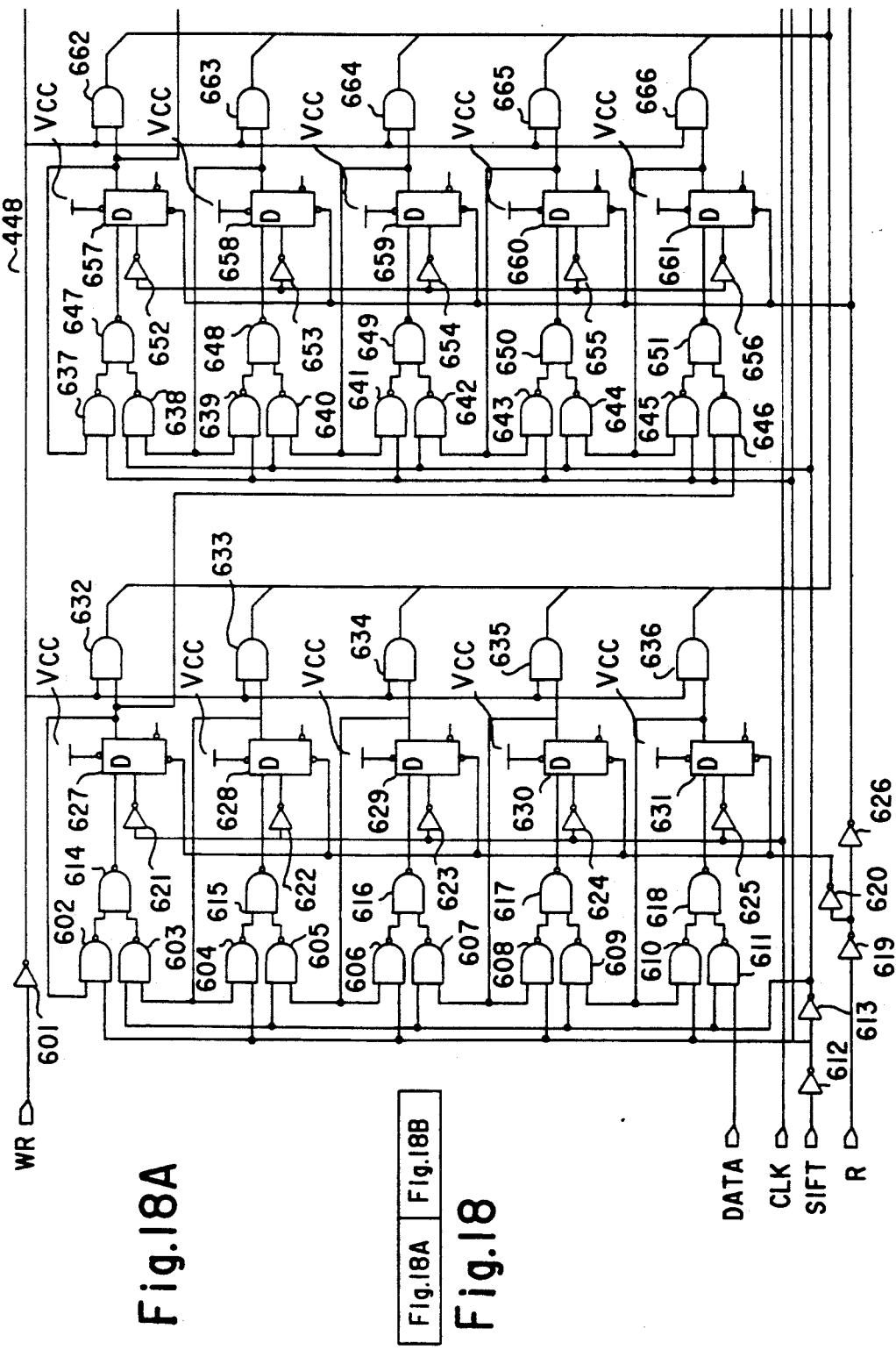

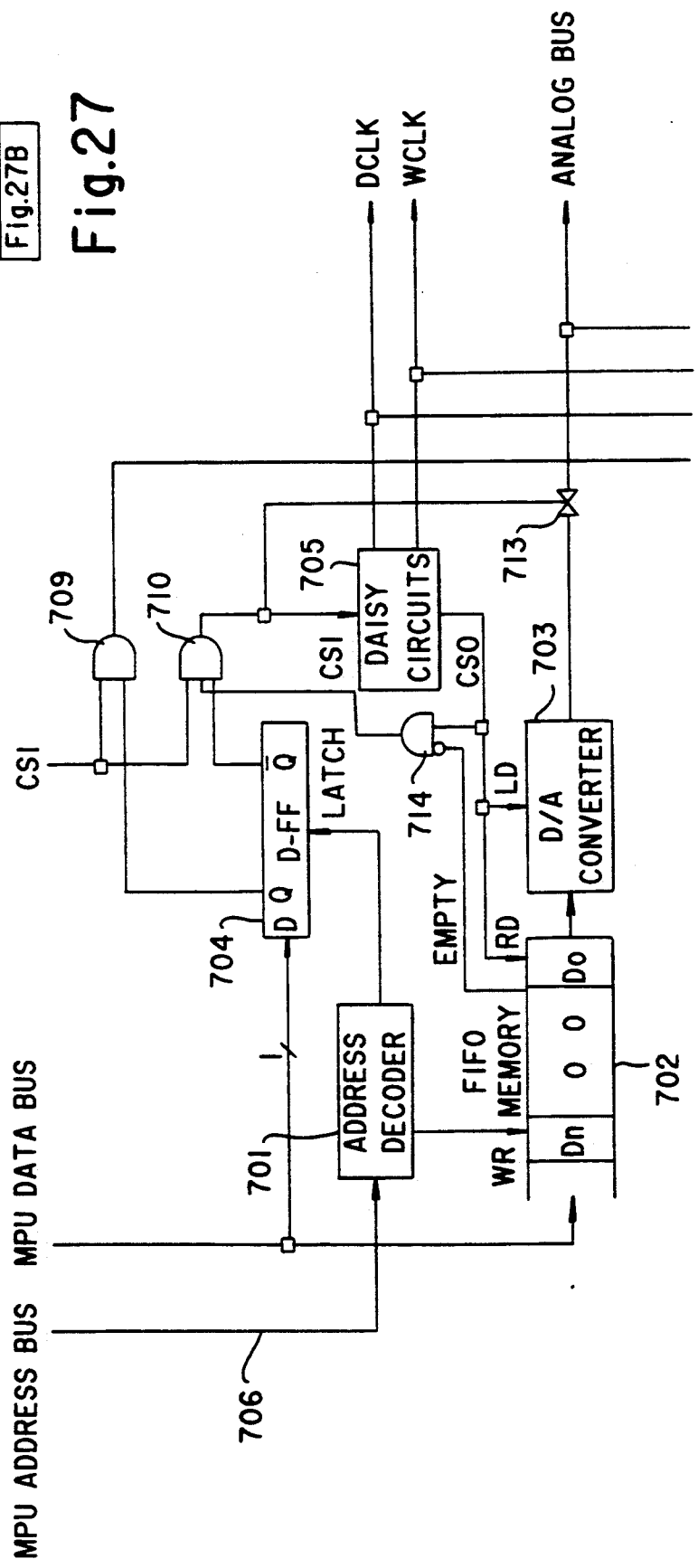

LEARNING SYSTEM IN A NEURON COMPUTER

BACKGROUND OF THE INVENTION

The present invention relates to a neuron computer and more particularly to a learning process system in a neuron computer realized by connecting an analog neuron chip through an analog time divisional transmission path for performing the learning function.

In a conventional sequential processing computer (Von Neuman type) it is difficult to control a data process function in accordance with a variation in the usage method or environment. Therefore, an adaptive data processing method utilizing a parallel distribution system and a layered network is proposed. The back propagation method (D. E. Rumelhart, G. E. Hinton, and R. J. Williams, "Learning Internal Representations by Error Propagation", PARALLEL DISTRIBUTED PROCESSING, Vol. 1, pp. 318-364, The MIT Press, 1986) receives particular attention because of its high practicality.

The back propagation method utilizes a layered structure network comprising a node, called a basic unit, and internal connection having weights presented. FIG. 1A shows the structure of a basic unit 1. Basic unit 1 carries out a process similar to a continuous neuron model. It comprises a multiple-input single-output system and further comprises a multiplication unit 2 for multiplying a plurality of inputs ($Y_h$) by respective weights ($W_{ih}$) of the internal connections, an accumulating unit 3 for adding all the multiplied results, and a threshold value processing unit 4 for outputting a final output $X_i$ by applying a nonlinear threshold value process to the added values.

FIG. 1B shows a conceptual view of the structure of a layered neural network. Many basic units (1-h, 1-i, 1-j) are connected in layers as shown in FIG. 1B and the output signal patterns, corresponding to the input signal patterns, are output.

Upon learning, the weights ($W_{ih}$) of connections between respective layers are determined in order to minimize the difference between the output patterns and a target teacher pattern. This learning is applied to a plurality of input patterns and then multiplexed. Upon an association operation, even if the input pattern contains information which is slightly incomplete upon the learning and therefore different from the complete information input upon learning, the output pattern close to the teacher pattern provided upon learning is provided, thereby enabling a so-called associating process.

To realize a neuron computer with such a structure, a transmission and reception of the data between basic units constituting a layered network is conducted by as small a number of wires as possible. This is a problem which should be solved when a complex data process is realized by forming multilayers of the network structure and increasing the number of basic units.

However, the data transmission system explained above requires a large number of wires between the two layers, thus preventing it from being made small. Further, its reliability cannot be increased when the layered network is manufactured into a chip. For example, consider a complete connection in which the number of adjacent layers is made the same and all the basic units 1 are connected to each other. In this case, the number of wires increase in proportion to the second power of the number of basic units, thereby resulting in a rapid increase in the number of wires.

SUMMARY OF THE INVENTION

An object of the present invention is to provide a neuron computer capable of transmitting and receiving data between basic units forming a layered network with a minimum number of wires and further of performing a forward learning operation by using a set of analog neuron processors.

A feature of the present invention resides in a learning system in a neuron computer comprising a neural network for receiving an analog signal from a first analog bus in a time divisional manner and performing a-sum-of-the-products operation and outputting an analog output signal to the second analog bus. A control pattern memory stores a pattern of a control signal for the neural network. A sequencer produces an address of a control pattern memory and a weight memory. The weight memory stores weight data of the neural network. A digital control device controls the neural network, control pattern memory, sequencer, and weight memory and executes a learning algorithm. An input control device, provided in the input side of the neural network, selects one of the input signals for executing an algorithm input from the digital control device or an analog input signal input from the analog port.

BRIEF DESCRIPTION OF THE DRAWINGS

FIG. 1B shows a conceptional view of a structure of a layered type neural network, FIG. 11A shows a detailed circuit diagram of a master control block used in the embodiment shown in FIG. 8 of the present invention.

DETAILED DESCRIPTION OF THE PREFERRED EMBODIMENT

Figure 1A:
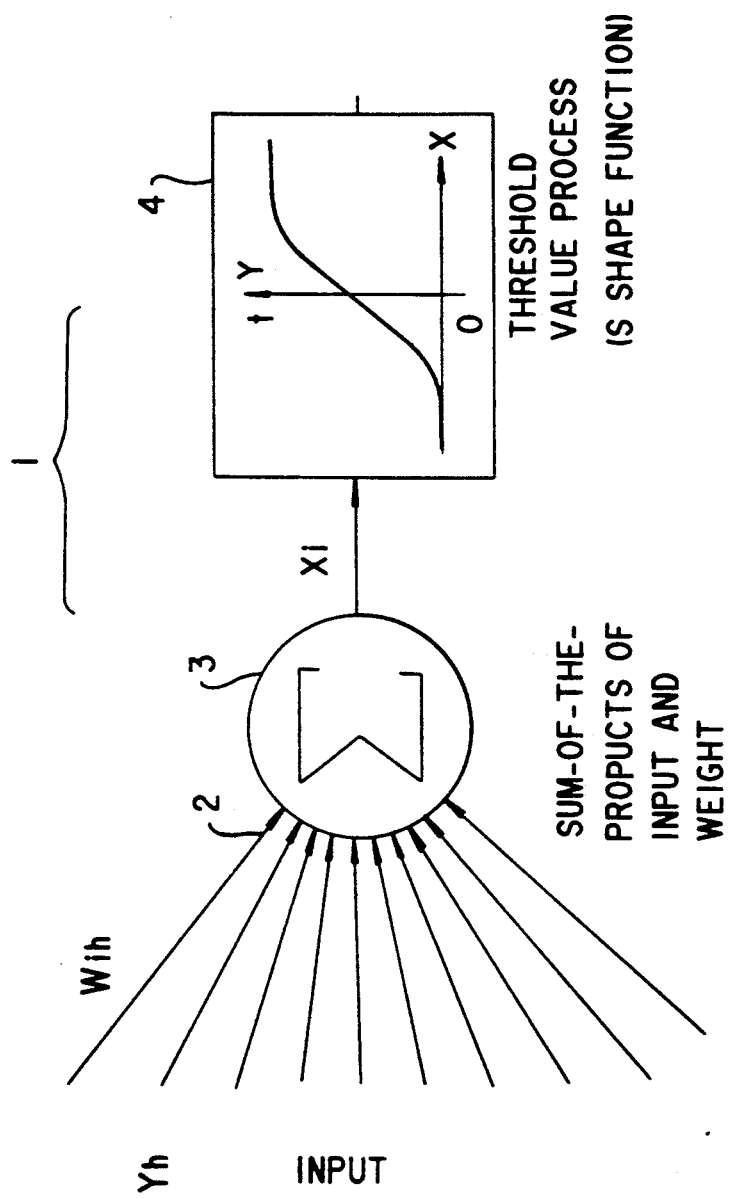
FIG. 1A shows a principle structure of a basic unit of a neuron model.
Figure 2:
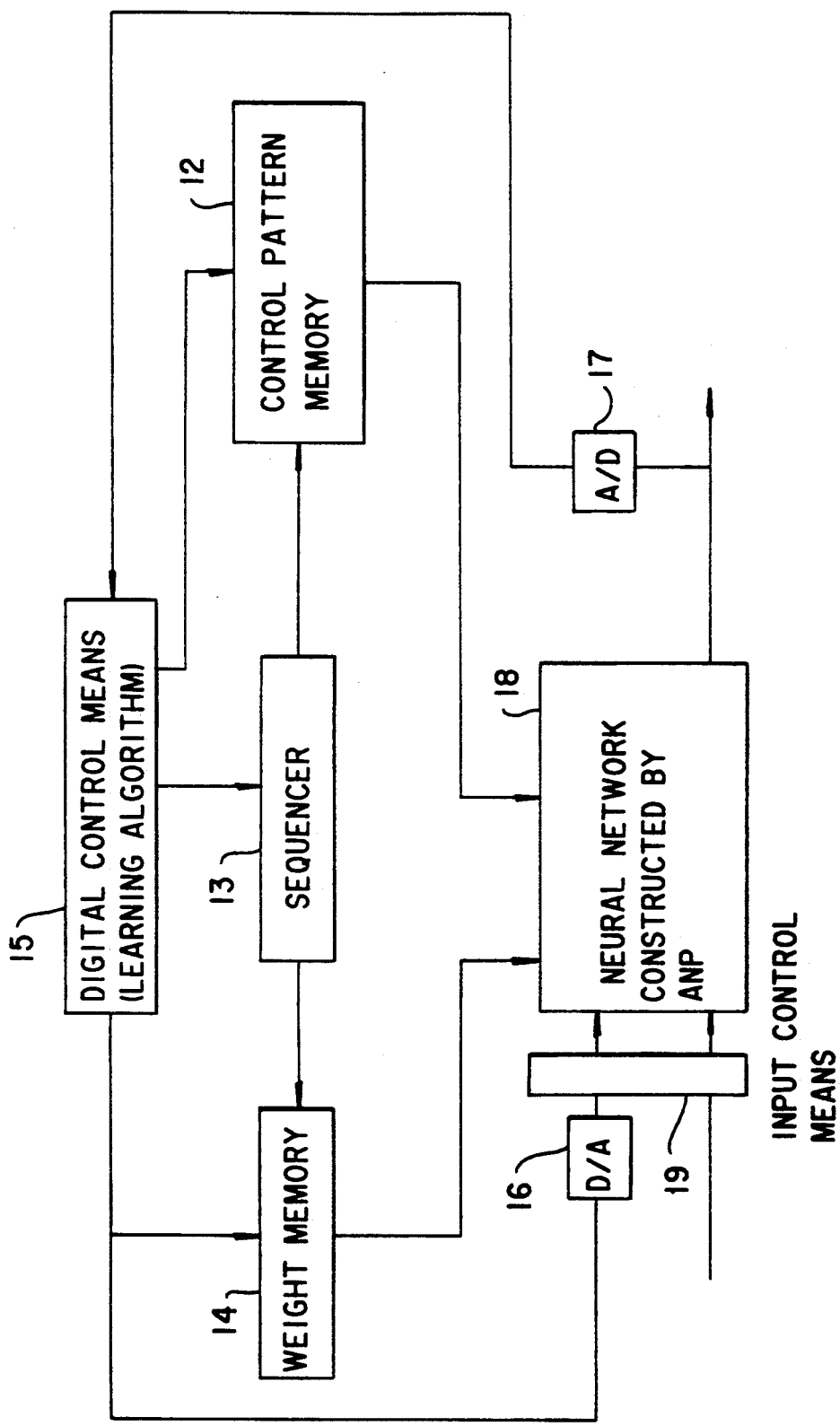
FIG. 2 is a principle block diagram of an embodiment of the present invention.

FIG. 2 shows a system block diagram of a neuron computer of the present invention.

Neural network 18 receives analog signals from the common first analog bus provided to the input side of respective layers in a time divisional manner, carries the sum-of-the-products by using digital weight data, and provides the analog signals to the second common analog bus provided to the output side of respective layers, thereby forming a set of analog neuron processors (ANP).

Control pattern memory 12 stores a control signal pattern of the neural network. Weight memory 14 stores weight data. Sequencer 13 produces an address of control pattern memory 12 and weight memory 14. Digital control means 15 comprises a general purpose processing unit including an MPU and a main storage. It is connected through network 18 and D/A and A/D converters 16 and 17 and further controls the neural network, control pattern memory sequencer and weight memory as a whole. Input control means 19 is provided at an input stage of ANP network 18 for performing a learning function and the input control means receives an analog input signal from the digital control means. An analog input signal is input to an analog neuron chip in a time divisional manner and the products of the signal and the weight data are added to provide a sum-of-the-products signal. This signal is then output through a nonlinear function circuit and an analog neuron chip is formed. A plurality of analog neuron chips forms a layered-type or a feedback type neural network 18 and provides an output from control memory 12, whose address is provided by sequencer 13. The weight data obtained from learining is supplied to neural network 18 from weight memory 14. Neural network 18, control pattern memory 12, sequencer 13 and weight memory 14 are controlled and managed by a digital signal from digital control means 15. The MPU in digital control means 15 executes a learining algorithim and checks an output signal. Therefore, the analog neuron computer system is characterized by a time divisional analog input signal and a time divisional analog output signal.

Input control means 19 selects either an input signal for carrying out a learning algorithm to be input from digital control means 15 or an analog input signal to be input from the analog port and thereafter the selected signal is applied to the ANP. Thus, the neural network carries out a forward learning process.

Figure 3B:
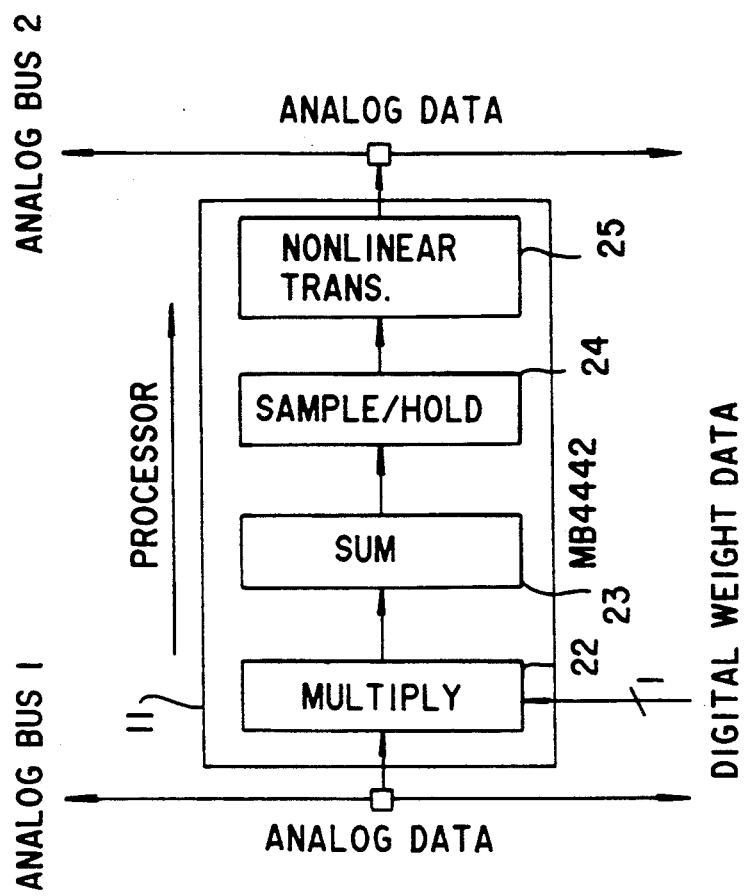
FIG. 3B shows the internal structure of the ANP of the present invention.
Figure 3A:
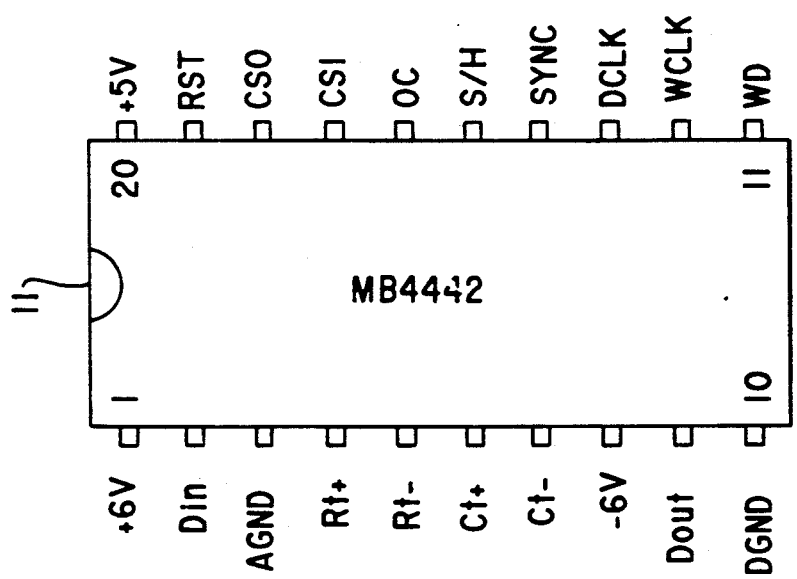
FIG. 3A is a view of a package comprising an analog neuron processor (ANP) of the present invention.

FIG. 3A is a schematic view of a dual-inline package of an analog neuron processor (ANP) 11 formed by a neuron chip provided by the present invention. This package, called MB4442, carries out neuron model processes. The internal threshold value processing unit is obtained by performing a sigmoid function. The analog neuron chip comprises an ANP for inputting and outputting analog data. Respective terminals of ANP 11 shown in FIG. 3A are as follows. The internal structure of ANP 11 comprises an analog circuit unit and a digital circuit unit. Plus-6-volt and minus-6-volt terminals are connected to a power source in an operational amplifier of an analog circuit unit. Terminals $D_{in}$ and $D_{out}$ are for respectively inputting and outputting analog signals. Terminal AGND is for the ground of the analog circuit unit. Terminals Rt+ and Rt− are for a resistor R provided externally to form an integral circuit in the analog circuit unit and terminals Ct+ and Ct− are for a capacitor provided externally to form an integral circuit. Terminal DGND is for the ground of a digital circuit unit. The plus-5-volt terminal is for the power source of the digital circuit unit. The RST terminal is for receiving reset signals for resetting the charge of the capacitor in the integral digital circuit. Terminals CSI and CSO are for respectively inputting and outputting daisy chain control signals. Terminal OC is for receiving offset cancelling control signals. Terminal Sh is for receiving sample/hold control signals. Terminal SYNC is for receiving signals for synchronizing processes of respective layers. Terminal DCLK is for receiving basic clock signals for processing the analog input signal. Terminal WCLK is for a clock for obtaining digital weight data. Terminal WD is for receiving digital weight data for inputting data in bit serial form.

FIG. 3B is a schematic view of the internal structure of an ANP of the present inveniton. As shown, ANP 11 is connected to analog bus B1 and analog bus B2. Analog processor ANP 11 comprises analog multiplying unit 22 for providing the product of the input analog signal and the weight, analog adder unit 23 for providing the sum of the products, sample/hold unit 24 for storing the sum, and nonlinear function unit 25 for outputting the value of the sigmoid function.

Figure 3C:
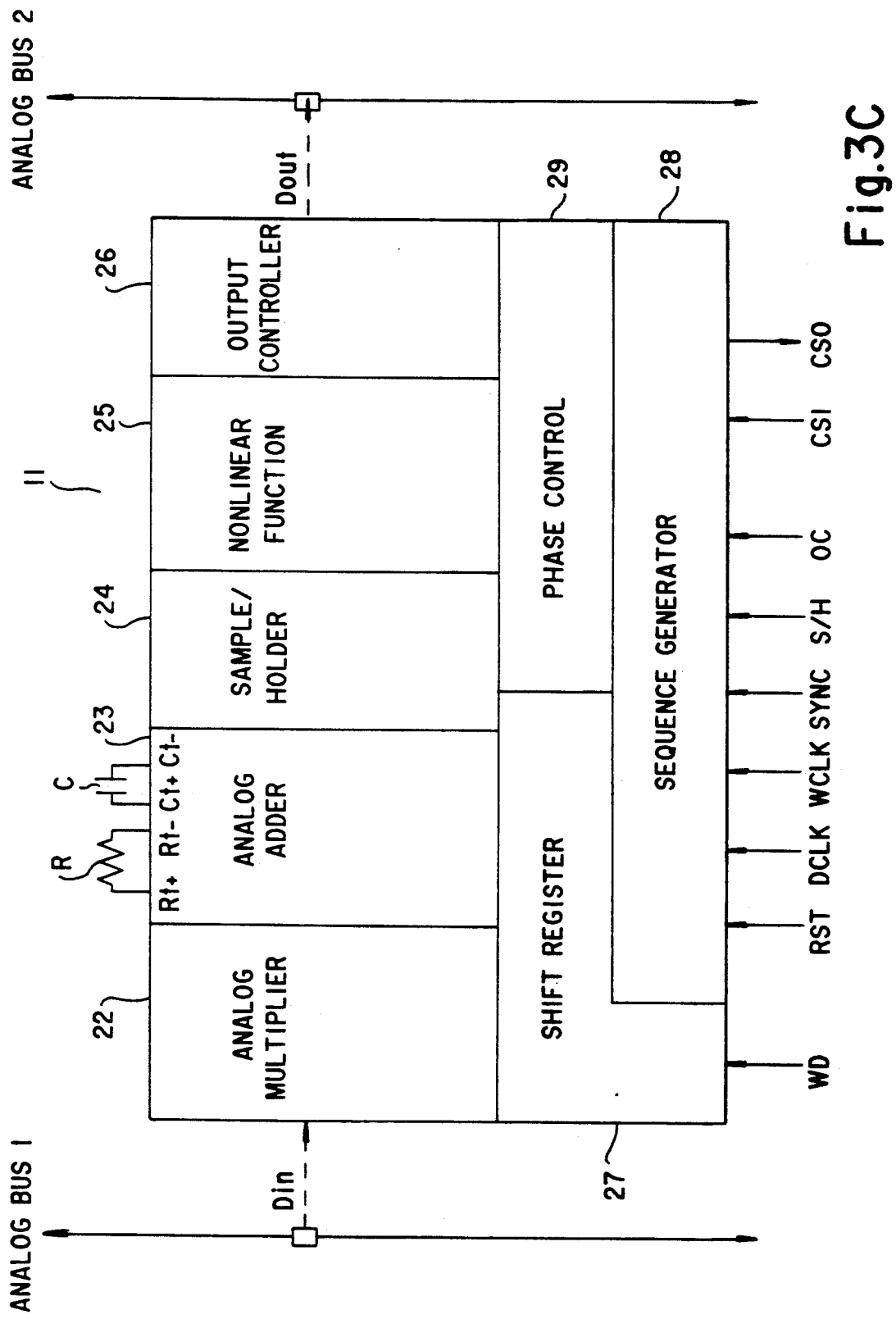
FIG. 3C shows the principle structure of the analog neural processor ANP of the present invention.

FIG. 3C shows the structure of an analog neuron processor (ANP) of the present invention.

Analog input signals transmitted in a time divisional manner from separate ANP's are input to analog multiplier unit 22 in ANP 11 through analog bus B1. Analog multiplier 22 multiplies the analog input data by the digital weight data WD which is received in bit serial form from shift register 27 and is then subjected to a serial-to-parallel conversion, thereby providing a product signal representing the product of the analog input signal and the digital weight data. Analog adder 23 comprises a mirror integrating circuit containing an external resistor R and a capacitor C, and obtains the sum of the respective product signals obtained from the analog input signal transmitted in a time divisional manner from a plurality of ANPs (the position in which each of the ANPs exists is called a node) provided at the previous stage and connected to analog bus B1, and obtained from the analog input signal for a threshold value transmitted from a dummy node. Next, the product signals are held by sample-hold unit 24 for the desired time period and the sampled/held output is converted through non-linear type function unit 25. Output control unit 26 delays the output of non-linear function unit 25 for a predetermined time period under the control of sequence generator 28. The analog output signal DOUT is then output to analog bus B2. Sequence generator 28 produces a control signal to be supplied to the inside of this computer system. Phase control unit 29 controls the phase of a control signal to ensure that the switches connected to the analog circuit portions within the ANP and digital circuit portions are turned on and off. In particular, when the first switch is turned on and the second switch is turned off, the phase of the control signal is controlled to prevent both first and second switches from being turned on simultaneously.

Sequence generator 28 receives signals RST, DCLK, WCLK, SYNC, and CSI from a later described master control block and outputs a CSO, thereby forming a control signal within the ANP.

Neural networks are required to perform high speed operations using parallel processing. The present invention uses time divisional data, but respective ANPs normally perform parallel pipeline processing. An ideal neural network needs connecting wires for connection between respective neurons. Thus, the above structure would require a lot of wires. The present invention deals with time divisional data. Thus, the time required to process a sum-of-the-products in respective ANPs becomes a little long. However, respective ANPs are arranged vertically, namely, in the direction of one layer in parallel with each other, thereby performing parallel processing of ANPs provided within one layer and thus decreasing processing time. In addition, a pipeline process is possible between layers, which further decreases total processing time. When inputs, are received simultaneously and in parallel by, for example, three ANPs connected to an analog bus, the respective ANPs produce products of analog inputs and weights. These products are maintained as electric charges in capacitors of integrators in respective ANPs. In the next time period, respective ANPs produce products of analog inputs from the same analog bus and weights. These products are added to those determined in the previous time period in the capacitors of the integrators.

When the sum of the products of the analog input signals from all the ANPs in the previous stage with the weight are produced, the sum is sampled/held. Thereafter, a sample/hold signal is output through a sigmoid function upon an input of a CSI control signal. Upon completion of the output, the CSI falls down. A CSO then rises after a predetermined delay, thereby providing the use right of the output bus to the ANP of the adjacent neuron chip within the same layer.

Figure 3D:
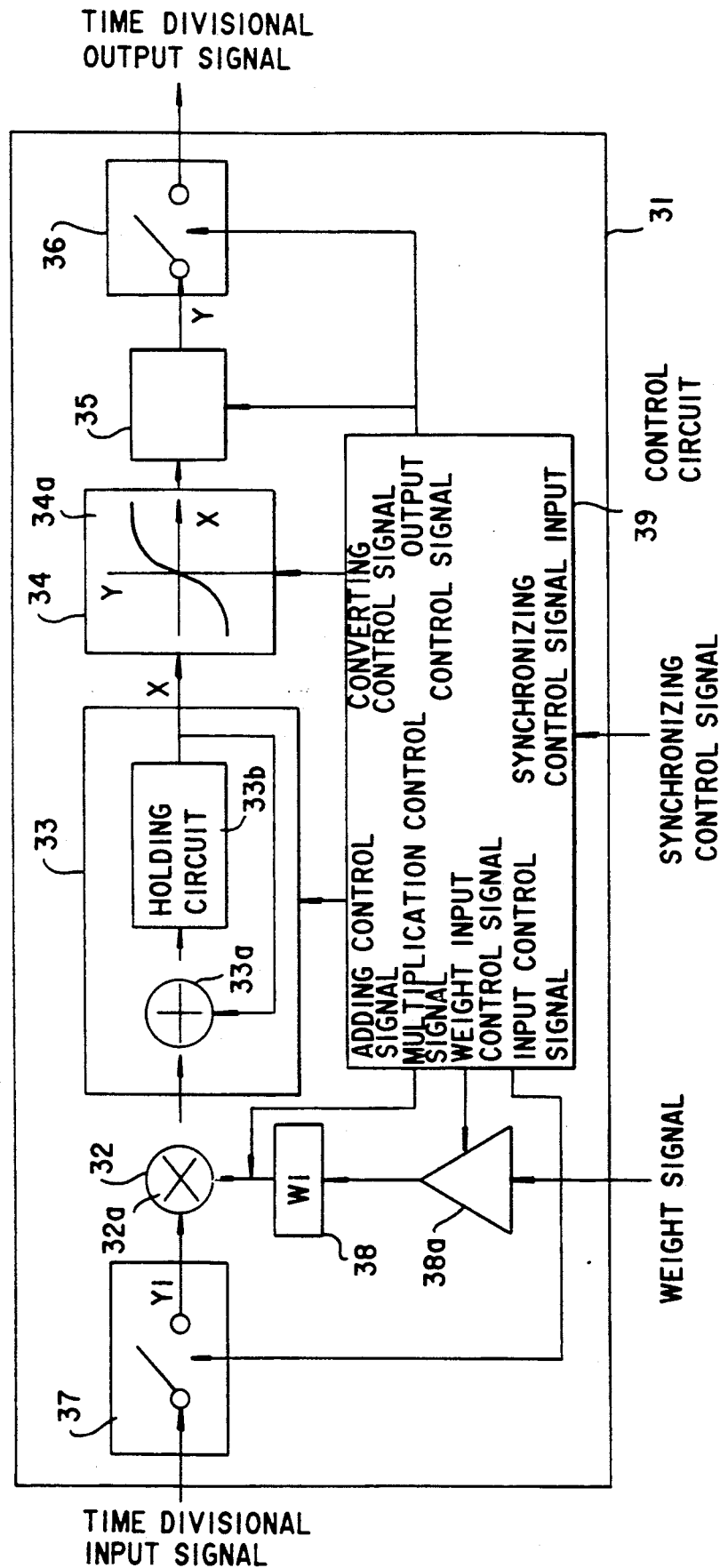
FIG. 3D is a block diagram of an embodiment of the basic unit according to the present invention.

FIG. 3D shows a block diagram of the first embodiment of the basic unit of the neuron chip (ANP). Multiplying unit 32, adding unit 33 and threshold value process unit 34 constitute an execution unit of a continuous neuron model. Output holding unit 35 is also provided. Where a plurality of inputs connected to basic unit 31 is expressed as Yi and the weight determined corresponding to respective connections as Wi, multiplying unit 32 calculates $$Y_i \cdot W_i$$

Adding unit 33 calculates $$X = \Sigma Y_i \cdot W_i - \theta$$

where $\theta$ is a threshold value. Where a final output from threshold value unit 34 is Y, the following equation is calculated.

$$Y = 1/(1 + exp(-X))$$

The weight "$\theta$" is multiplied by the value "+1" input from the dummy node. The result "x−$\theta$" is then output from adding unit 33. Therefore, threshold value unit 34 performs a conversion by using an S character curve.

Multiplying unit 32 comprises multiplying type D/A converter 32a. An analog signal (input through input switch 37) from basic unit 31 in the previous layer or a later described dummy node circuit is multiplied by the weight information (input through the later described weight holding unit 38) of the digital signal and the resulting product is output as an analog signal. Adding unit 33 comprises analog adder 33a (composed of an integrator) and holding circuit 33b (for holding the added result of analog adder 33a). Multiplying type D/A converter 32a receives an analog input signal at a reference voltage terminal of D/A converter 32a and respective bits of the weight at respective digital input terminals as the digital input signal, and multiplies the analog input signal by the weight. Analog adder 33a adds the resulting product output from multiplying type D/A converter 32a to the added value obtained at the previous timing and held in holding circuit 33b, thereby providing a new added value. Holding circuit 33b holds the added value obtained by analog adder 33a and feeds back the held value to analog adder 33a as the previous added value. These adding processes are carried out in synchronization with the adding control signal output from control circuit 39. Threshold value unit 34 is composed of non-linear type function generating circuit 34a comprising an analog function generator. It outputs a non-linear type signal such as a sigmoid function in response to the input. When the accumulation of the multiplied result is completed, including addition of the threshold value ($-\theta$), an operation process of the sigmoid function shown in equation (1) is performed by adding the threshold value ($-\theta$) to the added value x held in holding circuit 33b, thereby providing the analog output value Y. Output holding unit 35 comprises a sample/hold circuit and holds that output value Y of the analog signal from non-linear type function generator 34a which constitutes an output to basic unit 31 in the following stage layer.

The output switch 36 is turned ON for a predetermined period upon receiving an output control signal from control circuit 39. The final output is maintained in output holding unit 35 and processed to be output on analog bus B2. An input control signal from control circuit 39 turns ON input switch unit 37 when an analog output is transmitted from the final output of basic unit 31 in the previous stage layer. Weight holding unit 38 comprises a parallel out shift register. It maintains the weight signal as a bit parallel weight for multiplying unit 32 when the weight signal is bit serially transmitted from the weight memory and passes the gate on opening it (when the weight input control signal is turned on by controlling circuit 39). The bit-parallel weight data is provided to a multiplying unit when the multiplication control signal is provided. Control circuit 39 in the digital circuit unit produces a synchronizing signal for use inside the circuit based on an external synchronization signal and carries out a function of the analog process of the inside of the circuit.

As constructed above, the input and output signals of basic unit 31 with the signal process structure shown in FIG. 3D can be realized by using the analog signal. Multiplying type D/A converter 32a may receive the weight data of the digital signal in parallel or may convert the weight data into parallel data after receiving them as serial data. If the weight data is formed of the analog signal, the analog multiplying circuit may be used instead of the multiplying type D/A converter 32a.

Figures 4, 4A:
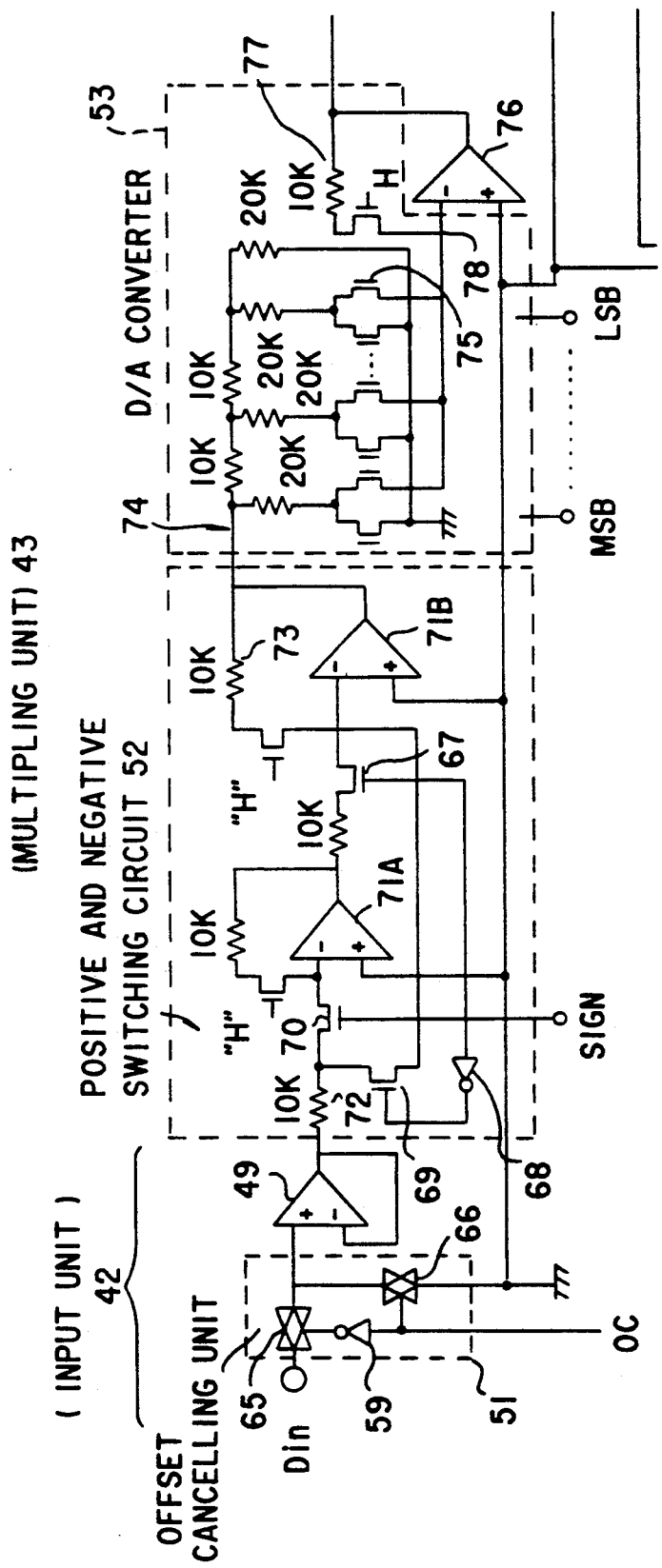
FIG. 4 is a detailed circuit diagram of an embodiment of the basic unit used for the present invention.
Figure 4B:
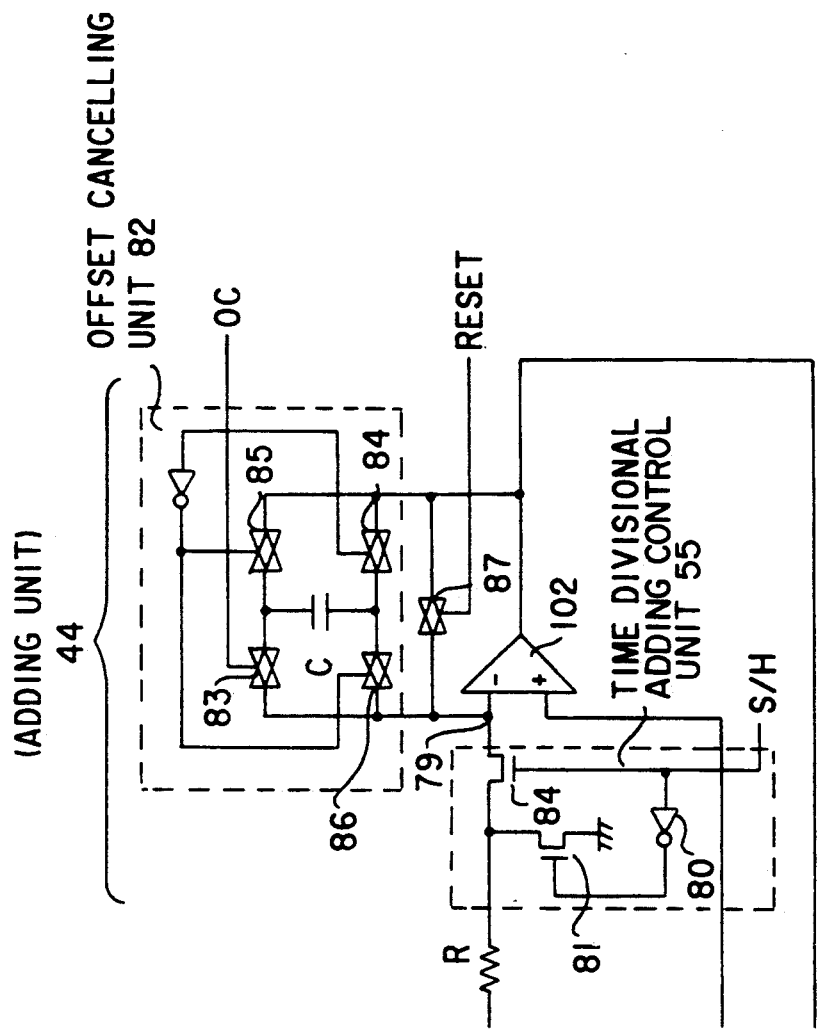
Figure 4C:
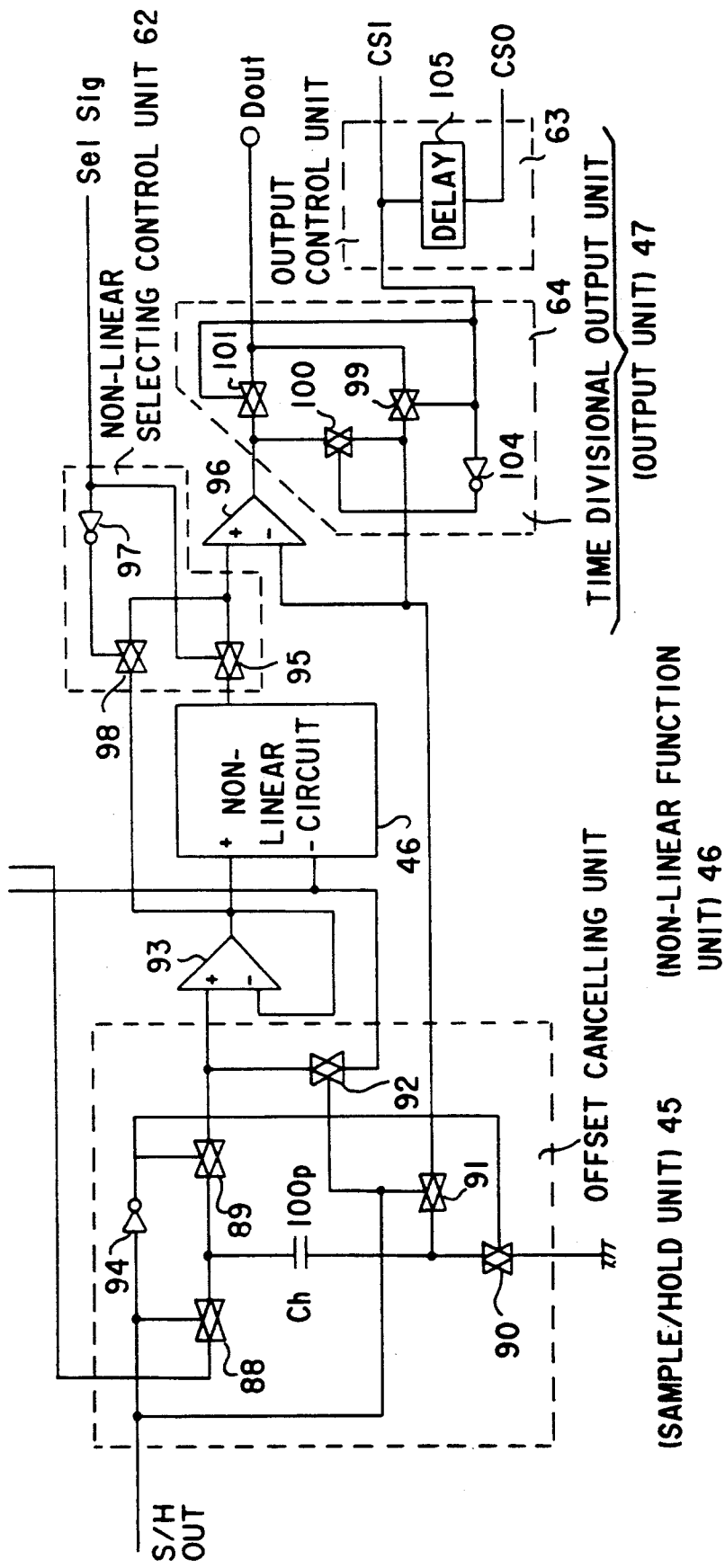

FIG. 4 is a circuit diagram of the embodiment of the neuron chip or analog neuron processor (ANP) of the present invention.

The neuron unit of the present invention comprises input unit 42, multiplying unit 43, adding unit 44, sampling/holding unit 45, non-linear function unit 46 and output unit 47.

Input unit 42 comprises offset cancelling producing circuit 51 and unity gain buffer 49. The output of the operational amplifier is fed back to its minus terminal by unity gain buffer 49 and input voltage is applied to its plus terminal. The data input Din receives a time division analog pulse signal from a common bus B1, as shown in FIG. 3C. OC represents an offset control signal. When it is "1" the analog switch 66 is turned on and "0" volts is compulsorily applied to unity gain buffer 49, that is, to the neuron unit, thereby cancelling the offset voltage produced in the output of the operational amplifier of the circuit in the following stage or the output of the operational amplifiers provided up to the output of the multiplier. However, when offset control signal OC is "0", the analog switch 66 is turned off and another analog switch 65 is turned on, and the data is input to unity gain time buffer 49. Analog switches 65 and 66 control the switching of the OC signal in the positive and negative phases, respectively. A phase control circuit prevents the circuits from being turned on simultaneously. Hereinafter, this will be referred to as OC being subjected to phase control.

Positive and negative switching circuit 52 is formed by combining two amplifying blocks in cascade form. The amplifying block comprises an input resistor (10 kΩ) and a feedback resistor (10 kΩ) to provide a 10/10=1-time reversed voltage. The sign of the analog voltage is determined depending on whether the signal passes through one or two stages of the amplifying block. The control voltage is a sign bit(SIGN) of the digital weight data and this sign bit is connected to the gates of MOS switches 47 and 70. The control signal of sign bit(SIGN) is also subjected to a phase control. When the sign bit(SIGN) is 1, the input voltage from the input block is reversed by the amplifying block containing amplifier 71A in the first stage as switch 70 turns on. It then passes through the amplifying block containing amplifier 71B in the following stage as switch 67 is turned on, thereby providing a positive phase signal. Where the sign bit(SIGN) is 0, switch 69 is turned on by reverse circuit 68. Then, as switches 67 and 70 are turned off, the input signal from the input block is applied to the minus terminal of operational amplifier 71B in the post stage through switch 69. Therefore, an operational amplifier with resistor 72 in the previous stage and resistor 73 for feedback of the operational amplifier constitute an amplifying block which is a unity gain inverter. Namely, the input of the input is negative when the sign bit is negative, and positive when the sign bit is positive. This profives a voltage according to whether the synapse connection is excited or suppressed. An output from positive and negative switching circuit 52 is supplied to a point, namely, a reference voltage terminal 74, of R-2R-resistor circuit network of D/A convertor 53.

The D/A converter of the R-2R system will now be explained. The internal switch is turned on or off depending on the digital weight data from MSB to LSB. When the digital value is 1, the current flows through switch (transistor) 75 into an imaginary ground 78 of operational amplifier 76. This imaginary ground is maintained at the same voltage as the plus terminal of amplifier 76. The plus terminal of amplifier 76 is grounded, so that imaginary ground 78 is imaginary 0. In a D/A converter, R represents 10 kΩ and 2R represents 20 kΩ. A current flows in resistor 2R regardless of the state of the switch. Whether or not the weight current flowing through resistor 2R (20k) flows toward imaginary ground 78 is determined by the value of the digital data. When the current flowing through the right-most resistor 2R is determined to be I, the vertical current flowing in 2R corresponding to LSB located second from the right is provided as $(2R \times I)/2R = I$ by dividing the voltage applied to the right-most resistor 2R by 2R. Therefore, the current 2I flows in the horizontal right most resistor R. The voltage $2R \times I + R \times 2I$ is applied to the vertical resistor 2R third from the right and the voltage is divided by 2R to provide the current 2I. Similarly, the currents through the vertical resistor 2R (20 kΩ) become 4I, 8I, 16I, or higher powers of 2 multiplied by I. The data from MSB to LSB determines whether or not the weight current of the second power of 2 multiplied by I flows into the minus terminal of the operational amplifier 76. Therefore, the current corresponding to the digital weight data flows into the imaginary ground 78 with an amplitude of the second power of 2 1 times I. As the input impedance of the operational amplifier is infinite, and the current flowing toward imaginary ground 78 flows through a feedback resistor 77 of operational amplifier 36, the output voltage V out of the D/A converter is given by, $$V_{out} =$$

$$-(Es/2n) \times (D0 + 2 \times D1 + 2^2 \times D2 + \ldots + 2^{n-1} \times Dn - 1)$$

where Es is the input voltage, DO is the LSB and Dn−1 is the MSB. That is, the output of the multiplying unit 43 is the value obtained by multiplying the input voltage by a weight. The weight coefficient is controlled by the digital value from MSB to LSB.

Adding unit 44 uses a Miller integrator in a time divisional manner, to carry out an accumulation and an adding operation on respective products of the time divisional multiplexing analog signal and the digital weight data. Sampling/holding unit 45 performs sampling/holding of the addition result.

Adding unit 44 is an integrator comprising resistor RT and capacitor CT. The input unit of adding unit 44 contains time division adding control unit 55 and when the sample/hold signal is 1, the output of multiplying unit 43 is input to an imaginary ground 79 of operational amplifier 102. When the S/H signal is 0, inverter 80 turns on switch 81 and the output of multiplying unit 43 is connected to ground through resistor RT. Thus, the input is not added to capacitor CT of adding unit 44 when the S/H signal is 1. The output voltage of multiplying unit 43 is input to the minus terminal of operational amplifier 102 through a resistor RT. The current obtained by dividing the input voltage by resistor RT 38 is input to capacitor CT through imaginary ground 79 to perform an integration.

Thereafter, when the S/H signal becomes 0 and multiplying unit 43 is disconnected from adding unit 44, multiplying unit 43 can multiply the next signal by the weight data. Offset cancelling unit 82 of an integration circuit containing capacitor CT is provided with an offset cancelling function by using four switches. When the sampling hold signal is 0 and the offset control signal OC is 1, switches 83 and 84 are turned on and switches 85 and 86 are turned off, thereby reversing the voltage stored in the capacitor CT. When the offset control signal OC is 0, an input voltage is applied to the data input terminal of data input unit 2 and the corresponding output of multiplying unit 43 is applied to capacitor CT through resistor RT. Then, switches 85 and 86 are turned on and capacitor CT has a minus polarity on the side connected to minus terminal 79 of operational amplifier 102 and has a positive polarity on the side connected to the output of operational amplifier 102. When the offset control signal OC becomes 1, the capacitor which stores the voltage including the offset voltage is reversed. Thus, data input is compulsorily made 0. In this case, if an offset does not exist, even if the input signal is transferred through positive and negative switching circuit 52 and multiplying unit 43, the output of the D/A converter becomes 0. However, as the operational amplifiers are employed and the offset voltage is activated, the offset voltage is added to capacitor CT with a reversed voltage and is consequently stored. This is different from the case where offset control voltage OC is 0, switches 83 and 84 are turned on and the polarity of capacitor C is reversed. Therefore, the offset voltage produced upon receipt of the input signal is controlled by making the offset control signal OC "1" and changing the polarity of the capacitor CT. As a result, the offset voltage is cancelled. The offset voltage occuring after the capacitor CT receives the input signal is cancelled by changing offset control signal OC to "1" to change the polarity of capacitor CT. When offset control signal OC is 0, input voltage is applied to data input Din and the corresponding output from the multiplying block is applied to capacitor CT through resistor RT. The present invention achieves an equivalent offset cancelling function by reversing the polarity of capacitor CT. After the offset is cancelled, offset control signal OC becomes 0 and the capacitor returns to its original state. Switch 87 is controlled by a reset signal. When the reset signal is received, the voltage of capacitor CT is made 0 and the output of the adding block is compulsorily 0 as it is a resetting operation. This offset control signal OC is also subjected to phase control.

The output of adding unit 44 is supplied to sample holding unit 45 and stored in capacitor Ch through switch 88 when the phase-controlled sample hold control signal S/H out is 1. When the S/H$_{out}$ signal is 1, the control signal of switch 90 is turned to 0 by inverter 94 and if one terminal of capacitor Ch is not grounded, the signal of the final output data is applied to capacitor Ch through switch 91. That is, the final output signal at that time is fed back to the lower side of capacitor Ch. Thus, capacitor Ch stores the voltage obtained by subtracting the final output data from the output of adding unit 44. At this time switch 92 is turned on and the plus terminal of operational amplifier 93 is compulsorily made 0, thereby causing the final output data to be an offset voltage. Therefore, capacitor Ch stores the voltage obtained by subtracting the offset voltage from the output of adding unit 44 beforehand. On the other hand, when the S/H$_{out}$ signal is 0, switches 89 and 90 are turned on and the lower side of capacitor Ch is grounded. As a result, the voltage stored in capacitor Ch is applied to the plus terminal of unity gain operational amplifier 93 through switch 89. The offset component is already subtracted from the output signal and thus the offset component is cancelled. The output of operational amplifier 93 is input to sigmoid function unit 46 through operational amplifier 93. As described above, when the S/H control signal is turned to 1, switch 88 is turned on and capacitor Ch receives the difference between the output value from the adding unit and the final output value. Since, at this time, switch 92 is turned on, 0 volts are compulsorily applied to operational amplifier 93. Then, Dout produces an offset voltage ΔV. The offset voltage is applied to the lower side of capacitor Ch through switch 51 through sigmoid function unit 46, operational amplifier 96 and analog switch 100. Therefore, when the S/H$_{out}$ control signal is 0, namely, when switch 89 is turned on and switch 92 is turned off, the voltage stored in capacitor Ch is finally output through amplifier 93 and sigmoid function unit 46 as the value obtained by substracting offset voltage data ΔV from the output of adding unit 44. When the S/H$_{out}$ signal is turned to 1, the offset voltage formed at this timing becomes ΔV. As a result, the offset voltage is cancelled.

The non-linear functional unit 46 for forming a sigmoid function block comprises non-linear selection circuit 62. The phase control SEL SIG signal is turned to 1, switch 95 is turned on and the output of sigmoid function unit 46 is applied to operational amplifier 96. However, when the SEL SIG signal is 0, it forms the control signal of switch 98, made 1 through inverter 97, and the output of the sigmoid function is cut. The output voltage of sample and hold unit 45 is directly input to operational amplifier 96 without having a sigmoid function applied to it. In this case, the neuron unit shown in FIG. 4 can be used as an adaptive filter or as a linear neuron network and further, it becomes easy to test its operational characteristics. Operational amplifier 96 is basically a unity gain operation amplifier for directly feeding back the output to the minus terminal, and is operated as a buffer. It acts as a buffer in making the output impedance 0. Output block 47 is connected to time division output unit 64 and output control unit 63. When $CS_{in}$ is "1", switches 99 and 91 are turned on. The final output operational amplifier 96 outputs the final output at data output DATA-OUTPUT. This output is then fed back to the minus terminal of operational amplifier 96 and simultaneously input to sample/hold unit 45. On the other hand, when $CS_{in}$ is 0, switch 100 is turned on and switch 101 is turned off. Therefore, the output of amplifier 96 is not produced on a Dout data line. However, as switch 100 is turned on to provide unity gain buffer voltage, the following operation of operational amplifier 96 is not disturbed, but is carried out. Output control circuit block 63 determines whether the output pulse voltage is transmitted by control signal $CS_{in}$ for a daisy chain operation. $CS_{in}$ is then output as $CS_{out}$ through a delay circuit 105 and the timings of the output analog signals to the other adjacent neuron unit in the same layer is determined. Therefore, the present invention transmits an analog signal in a time divisional manner from output unit 47 to common bus B2 shown in FIG. 3C. This does not conflict with other output signals from other neuron units.

Figure 5:
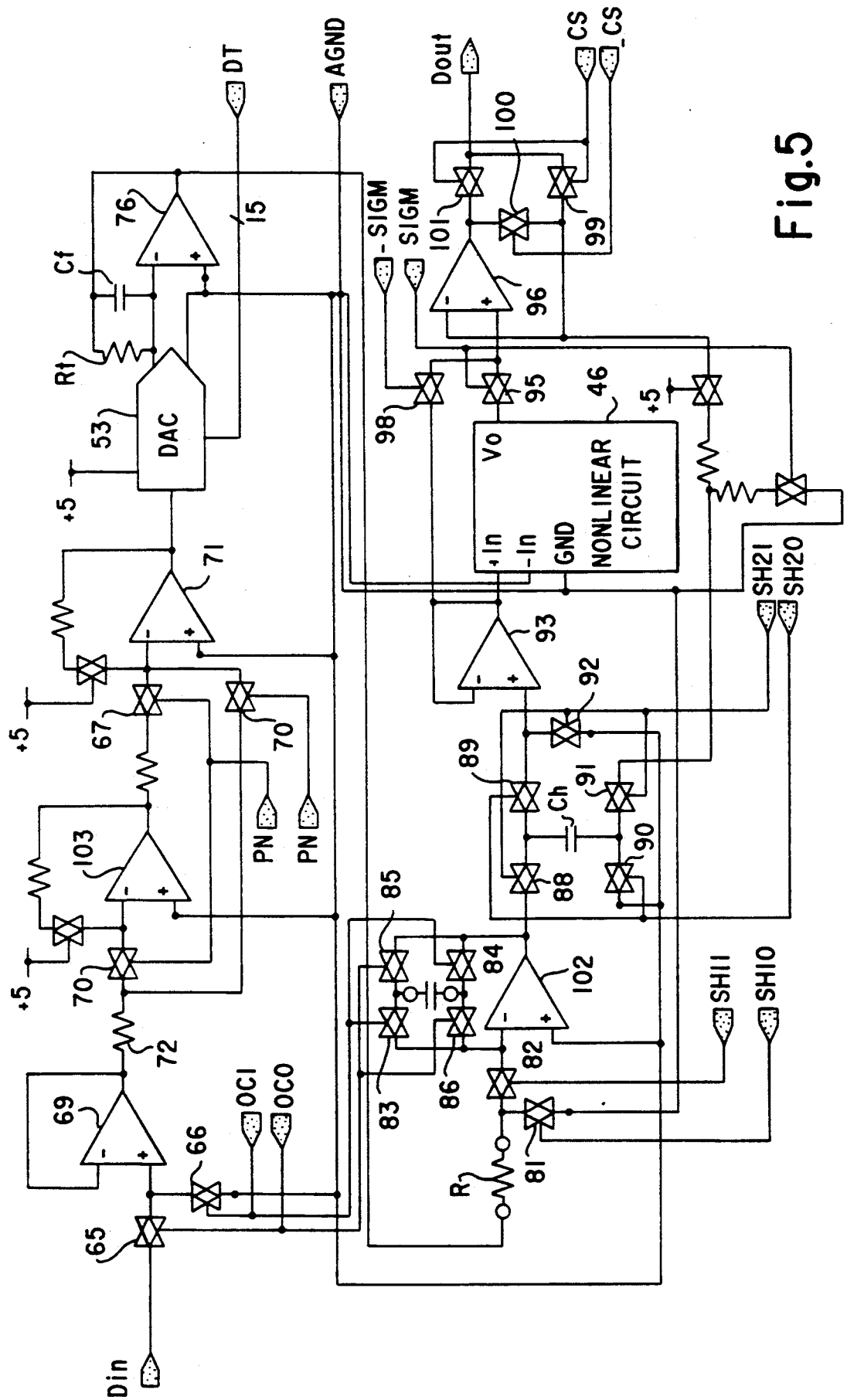
FIG. 5 is a detailed circuit diagram of another embodiment of the basic unit used for the present invention.

The phase control shown in FIG. 5 is realized by forming offset cancellation OC; sign SIGN; sample hold S/H; sample hold $S/H_{out}$; sigmoid selection signal SEL SIG; daisy chain signal CSI in FIG. 4 by two signals, namely, OC0 and OC1; PN and minus PN; SH11 and SH10; SH21 and SH20; minus SIGN and SIGN; and CS and minus CS; respectively. One control signal is formed by two signals comprising a positive phase and a negative phase, and is shifted by shifting the phase of respective signals so that the positive phase of the control signal does not turn the switch on at the same time as the negative phase of the control signal turns on a different switch. The Rf connected to the output terminal of D/A converter 53 makes the feedback signal from operation amplifier 76 match the operation speed of D/A converter 53, and D/A converter 53 receives digital input from the DT terminal. Parts in FIG. 5 which are the same as those in FIG. 4 are given the same numbers, and therefore, an explanation thereof is omitted.

Figure 6:
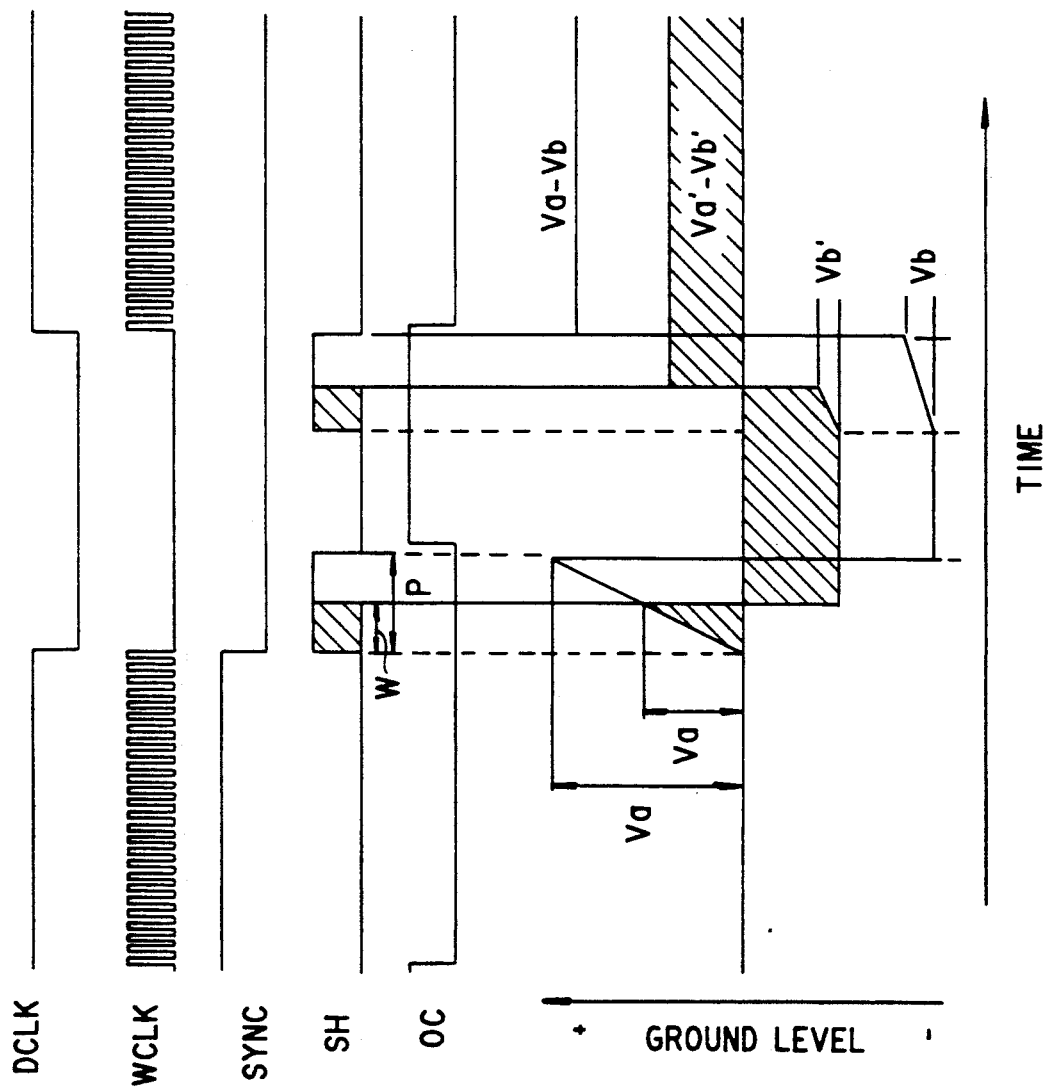
FIG. 6 shows a view for explaining the timing of an integrator used in the basic unit in the present invention.

FIG. 6 shows a timing chart for an integrator operated based on an error absorbing system for correcting a weight in accordance with the present invention. Data clock DCLK and weight clock WCLK are basic operation clocks. When data clock DCLK is high, a high-speed weight clock WCLK is output during a half period of the data clock DCLK. Weight clock WCLK is a synchronizing clock for inputting serial weight data to the integrator. Data clock DCLK is a basic clock for processing an analog input signal. Synchronizing signal SYNC can achieve synchronization of respective analog neuron units within respective layers. The operation of the output voltage of the integrator is shown by a triangular waveform in the lower part of the drawing. The integrated waveform is controlled by a pulse signal of sample/hold control signal S/H. During the period of high sample/hold S/H control signal, an integration is carried out. Namely, a charge is applied to capacitor CT of the integrator path. During the period in which the sample/hold control signal S/H pulse is high, this charge is gradually accumulated in the capacitor CT in order to increase the voltage. When the sample/hold S/H control signal pulse is low, the charging operation is terminated. Therefore, only the charged quantity during the scope of the integration time is important. Thus, the pulse width of the sample/hold control signal is controlled to expand or compress the scope of the integration period. Therefore, even if the input signal is the same, the output of the integrator becomes charge voltage Va when the sample/hold control signal S/H has a pulse width P and it becomes charging voltage Va' when the sample/hold control signal S/H has a pulse width W.

When sample/hold control signal S/H is low and offset control signal OC is high, the polarity of capacitor CT of the integrator is changed and the integration output, to which an offset component is added, is reversed. When offset control signal OC is high and sample/hold control signal S/H is also high, offset voltage Vb (Vb') is added to capacitor CT. When the S/H signal becomes low again, and the offset cancelling signal becomes low, the polarity of the capacitor is again reversed to have an original polarity and the integral output value Va−Vb (Va'−Vb'), in which the offset component is cancelled, is subjected to a sample/hold operation. After the output of the integrator has been reversed the polarity of the integrator's output is returned to its original state.

The integration time should be made variable, for example, for the following reasons. The multiplier in the ANP of MB4442 is a D/A converter with a fixed decimal point arithmetic operating system. The fixed decimal point arithmetic operation has a fixed position for the decimal point and can only express a number with a limited number of digits. When the fixed decimal point method is adopted, for example, the decimal point is positioned in the left-most digit position of a 10-bit numerical value. Thus, numbers greater than "1" cannot be expressed. That is, the multiplier cannot multiply the input voltage by a number greater than "1", and thus cannot produce an output obtained by multiplying the input voltage by 2. Thus, such a multiplier increases the input voltage but cannot make it greater than "1". If the position of the decimal point is lowered, only numbers up to and including 2 can be expressed. Therefore, it is necessary to control the gain of an integrator in accordance with the position of the fixed decimal point. If there are many input voltage numbers, and these input voltage numbers are added sequentially, then the integrator overflows. Thus, the integrator may control the integration time period. Namely, when the integrator cannot operate efficiently depending on the weight data, the S/H pulse is controlled to change the integral time period and the gain of the integration is changed adaptively in an equivalent manner. Therefore, it is possible to prevent the overflow of the integration and it becomes possible to increase the number of bits of the weight data equivalently.

When the ANP receives an analog input voltage and the number of neurons on the receiving side is large, the number of weight data increases. Namely, when the number of neurons in the previous layer is large, the weights are determined for respective and individual neurons in the previous stage. Thus, the number of weight data becomes equal to the number of neurons observed in the previous stage. However, sometimes the number of neurons which can be observed in the previous stage is not always equal to the number of weight data because of the special structure in which a dummy node for producing "1" to control the threshold voltage exists. By providing the weight to the dummy neuron, the non-linear function may be slid horizontally. If a dummy node is provided in the previous stage, the number of input voltages is counted including the number of dummy nodes when the number of input voltages is observed by the following layer.

Therefore, when the method of changing the time period of the integration is utilized in the present invention, overflow of the analog integration may be avoided.

The following also becomes possible. As the time constant RC of the integrator itself can be manufactured by an external part, the accuracy of elements such as R and C may vary. Thus, even with the same integration time period, these variations cause a different voltage to be produced from different neuron chips. This voltage difference must be eliminated. The present invention intentionally extends or shortens the pulse of a sample/hold control signal S/H so that all the neuron chips have the same integration gain. For example, when the same input is applied to different neuron chips, the contents of their control pattern memories are controlled by the digital control means to produce integration outputs of the same voltage, thereby making the pulse width of the sample/hold control signal S/H.

In the present invention, voltage errors resulting from variations in the neuron chips can be absorbed and serious problems caused by the saturation of the analog voltage can be avoided. The weight data is determined based on the consideration of the network as a whole and errors in local parameters other than the above may be absorbed within or near the ANP chip itself.

Figure 7A:
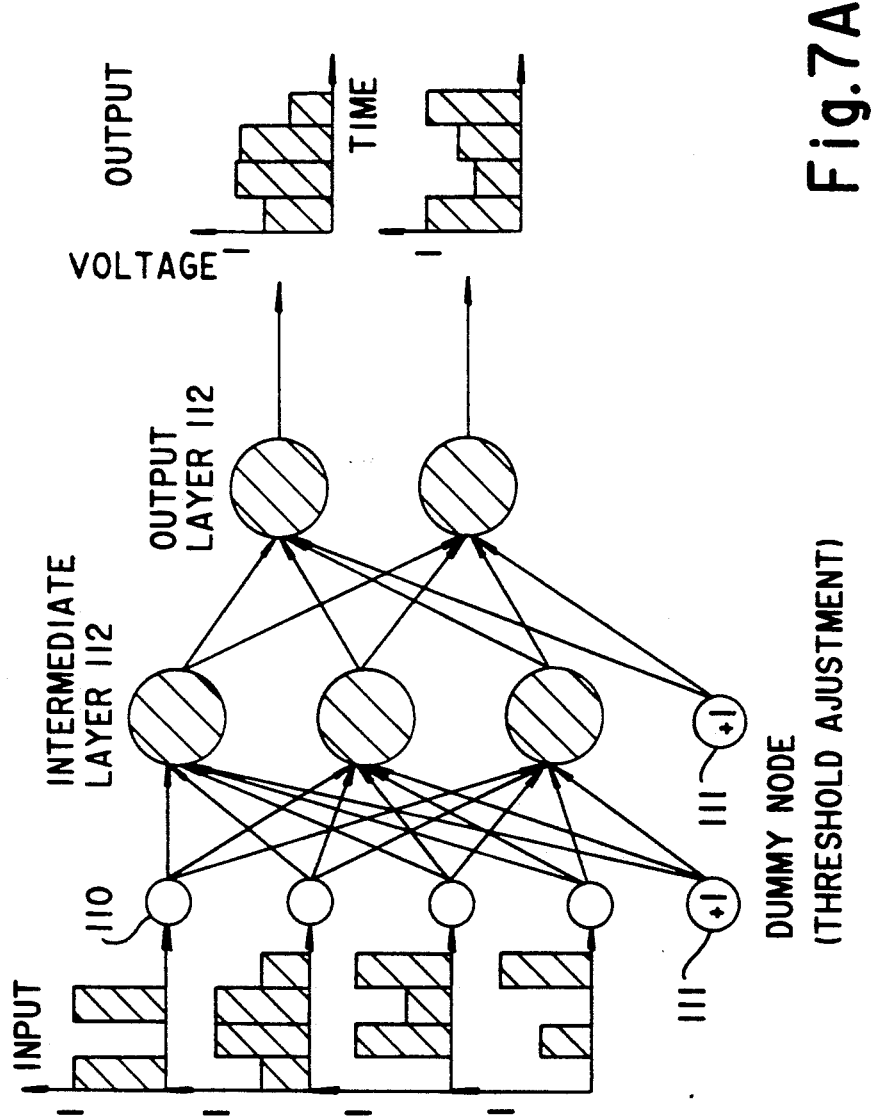
FIG. 7A shows a conceptual view of a layered type network.
Figure 7B:
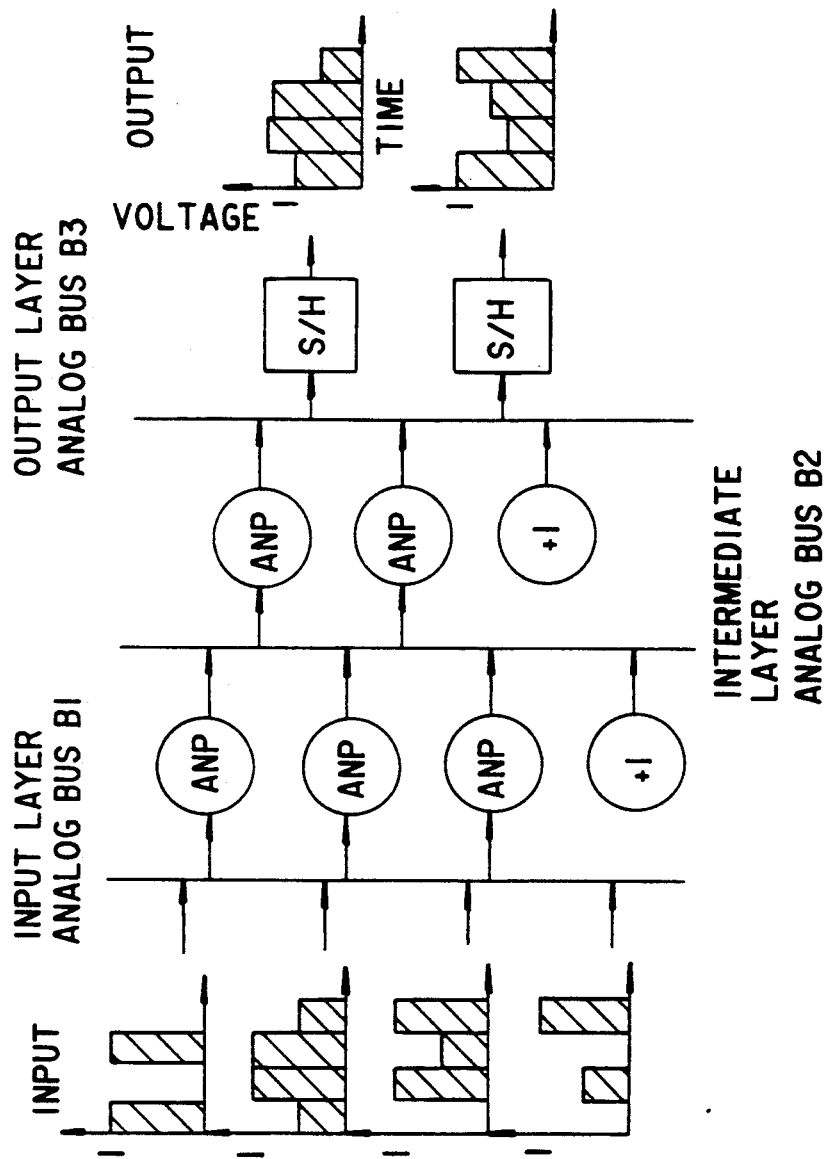
FIG. 7B shows a conceptual view of a layered type neural network in a slightly different manner from that of FIG. 7A.

Next, a layered type neural network is explained. FIG. 7A is conceptual view of a layered type network. In this network, the input data enters input node 110 of the input layer on the left side and is sequentially processed in the rightward direction. Respective neurons 112 of the intermediate or hidden layer receive output from the previous layer including dummy node 111, forming a complete connection between two layers. If there are four input nodes 110 in the input layer, one dummy node 111 is added to it. Thus, it is observed from respective neurons 112 in the hidden layer that the input layer has five neurons. Dummy node 111 controls the threshold value and adds the constant value "$-\theta$" to the value x obtained by the result of the sum-of-the-products and included in the following sigmoid function, and then shifts a waveform defined by the following equation in a positive direction along the x axis, thereby providing the function $f(x-\theta)$.

$$f(x) = \frac{1}{1 + \exp(-x)}$$

This is equivalent to a change in the weight corresponding to dummy node 111 within the neuron and the constant value $\theta$ is produced by the later described maximum value node circuit. Therefore, if the weight corresponding to the dummy is prepared, the threshold value may be expressed by the weight. Thus, it is observed by neuron 113 in the output layer that the intermediate layer has four neurons. The input data applied to the input layer is subjected to the sum-of-the-products arithmetic operation by using the weight data in intermediate layer neuron 112 and output layer neuron 113, resulting in the production of the output data.

The layered structure shown in FIG. 7A is expressed by using the ANP of the present invention. Independent analog buses B1, B2 and B3 are provided between respective layers, namely, between the input layer and the intermediate layer, and between the intermediate layer and the output layer, and at the output layer. All the vertical ANPs operate in parallel. A sample hold circuit S/H is provided at the output of the output layer.

Figure 8B:
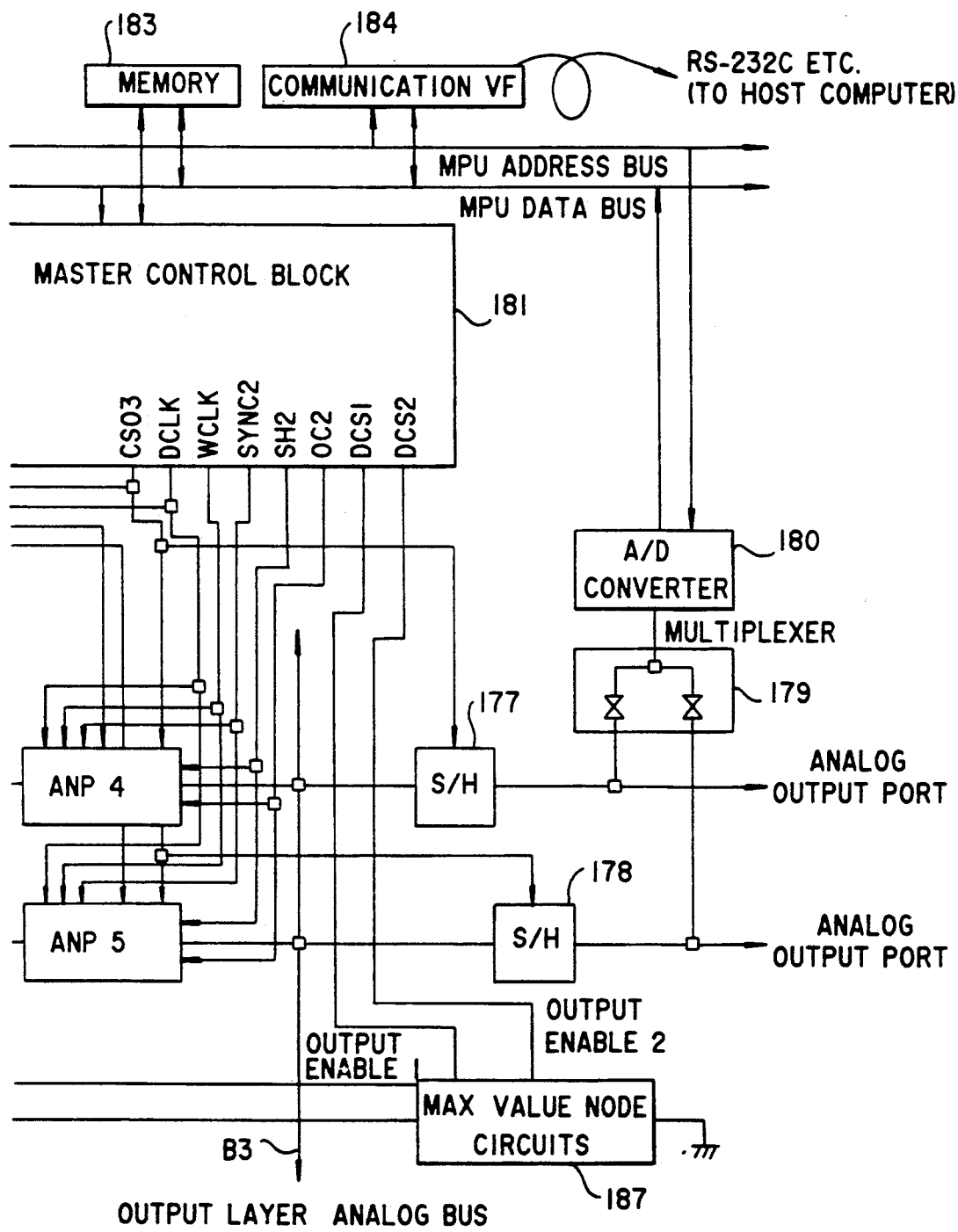
FIG. 8 is a detailed block diagram of an embodiment realized by a layered type neural network by using the ANP of the present invention.

FIG. 8 is a block diagram of the layered neuron network of the neuron computer of the present invention. Analog neuron processors ANPs 1 to 5 comprising neuron chips, are provided in parallel in respective layers and analog buses B1, B2 and B3 are independently provided between two layers. In FIG. 8, the intermediate layer is formed by ANPs 1, 2 and 3 and the output layer is formed by ANPs 4 and 5. The input state does not have any ANPs, but has daisy circuits 171 and 172 for inputting the analog input signal in good timing. The circuits designated by S/H are sample/hold circuits 173 and 174. ANPs 1 to 5 need logic signals for control and many control signal lines are connected to respective layers from master control block (MCB) 181. Data clock DCLK is applied to daisy circuits 171 and 172 at the input side of all the ANPs and constitutes a basic clock for analog processing. A weight clock WCLK is applied to all the ANPs and daisy circuits 171 and 172 at the input side. This provides a high speed clock for the weight data. The weight data is input to respective ANPs 4 and 5 and ANPs 1, 2 and 3 from weight memory block 185 and 186 in synchronization with the weight clock WCLK. The synchronization clock SYNC1 is applied to the ANPs in the intermediate layer and the synchronization signal SYNC2 is applied to the ANP at the output layer for the synchronization clock. SH1 and OC1 represent the sample/hold control signal and offset control signal, respectively, for the ANPs in the intermediate layer, and SH2 and OC2 represent these signals for the ANPs in the output layer.

Daisy circuits 171 and 172 of the blocks on the left side are the input side circuits corresponding to the input layer. In order to realize the input node, namely, the neurons in the input layer, the analog input signal applied to the analog input ports 0 and 1 should be applied to the daisy circuits in a time divisional manner at the same timing as an ANP produces the analog signal. Namely, a basic operation is constructed when ANPs 4 and 5 in the output layer receive analog signals from ANPs 1, 2 and 3 in the previous intermediate layer in a time divisional manner through analog bus B2. The relationship described above exists between the intermediate layer and the input layer. This relationship should be such that the ANPs in the input layer exist before the ANPs in the intermediate layer. Therefore, the output should be provided to analog bus B1 from analog input ports 0 and 1 upon receiving the analog input signal at the same time as the ANPs in the intermediate layer output the analog signal to analog bus B2. In other words, the input signals from the analog input ports 0 and 1 are applied to analog bus B1 in a time divisional manner. The analog signal from the analog input port 0 is applied to the analog bus B1 at an appropriate timing. The next analog input signal from analog input port 1 is applied to the analog bus B1 after the analog signal from analog input port 0 is applied to the same analog bus B1. In order to achieve the above synchronization, the input control signal CSI output at a constant timing is applied to daisy circuit 171 and after a certain period, daisy circuit 171 produces output control signal CSO. The CSI is produced by CSO1 of master control circuit 181. Daisy circuits 171 and 172 form a kind of delay circuit. When daisy circuit 171 receives input control signal CSI from master control unit 181 it transmits the CSO signal to the vertically lower adjacent daisy circuit 172 so that the analog output signal is output from analog input port 1 to the analog bus of the input layer. This operation is called a daisy control.

When the output CSO1 of master control circuit 181 rises, switch 175 is turned on and the analog input signal of analog input port 0 held in sample/hold circuit 173 is applied to analog bus B1. As CSO1 is the CSI of daisy circuit 171, a CSO rises a predetermined time after the fall of the CSI. This CSO is the CSI for daisy circuit 172, and simultaneously turns switch 176 on. Thus, the analog input signal of analog input port 1 held in sample/hold circuit 174 is applied to bus B1. The present layered structure needs such a daisy control. That is, the analog input signal is applied to analog bus B1 through the analog input port 0 and sample hold circuit 173. The next analog input signal is output to the same analog bus B1 through the analog input port 1 and the sample hold circuit 174. From the viewpoint of respective neurons in the hidden layer, the analog input signal of analog input port 0 and the following analog input signal from analog input port 1 are sequentially input in a time divisional manner.

Daisy circuits 171 and 172 output the output control signal CSO by delaying the input control signal CSI by a predetermined period to avoid a bus competition on the analog bus B1.

When ANP1, for receiving the output control signal CSO2 from master control block 181 as CSI, provides the analog signal, CSO is applied to ANP2 as CSI and thereafter ANP2 outputs CSO. ANP3, which receives CSO of ANP2 as CSI, next produces the analog signal. In summary, ANPs 1, 2 and 3 produce outputs in turn, thus completing the daisy operation in the intermediate layer. In parallel with this operation, master clock control block 181 for managing all the operations provides CSO3 to ANP4 in the output layer and then ANP4 produces the output. After completion of the output, ANP4 provides CSO to ANP5 and ANP5 produces the output.

Outputs from ANPs 4 and 5 in the output layer are subjected to a sample/hold operation by sample/hold circuits 177 and 178, respectively, under the control of CSO3 from master control block 181 and daisy chain output control signal CSO. The output voltage is output as the analog output signal from analog output ports 0 and 1 and selected by analog multiplexer 179. An A/D conversion is thus applied to the output of multiplexer 179 by A/D converter 180 and then the output of A/D converter 180 is transmitted to digital control circuit means comprising MPU182, memory 183 and communication interface 184. The output signal is compared to a teacher signal stored in the MPU during learning to determine whether or not the output signal is the desired one. The weight data of the later described weight memory is changed based on this comparison. Maximum value node circuit 187 applies dummy node control signals DSC1 and DSC2 from master control block 181 to output enables 1 and 2 and the output terminal is connected to analog buses B1 and B2.

Figure 9A:
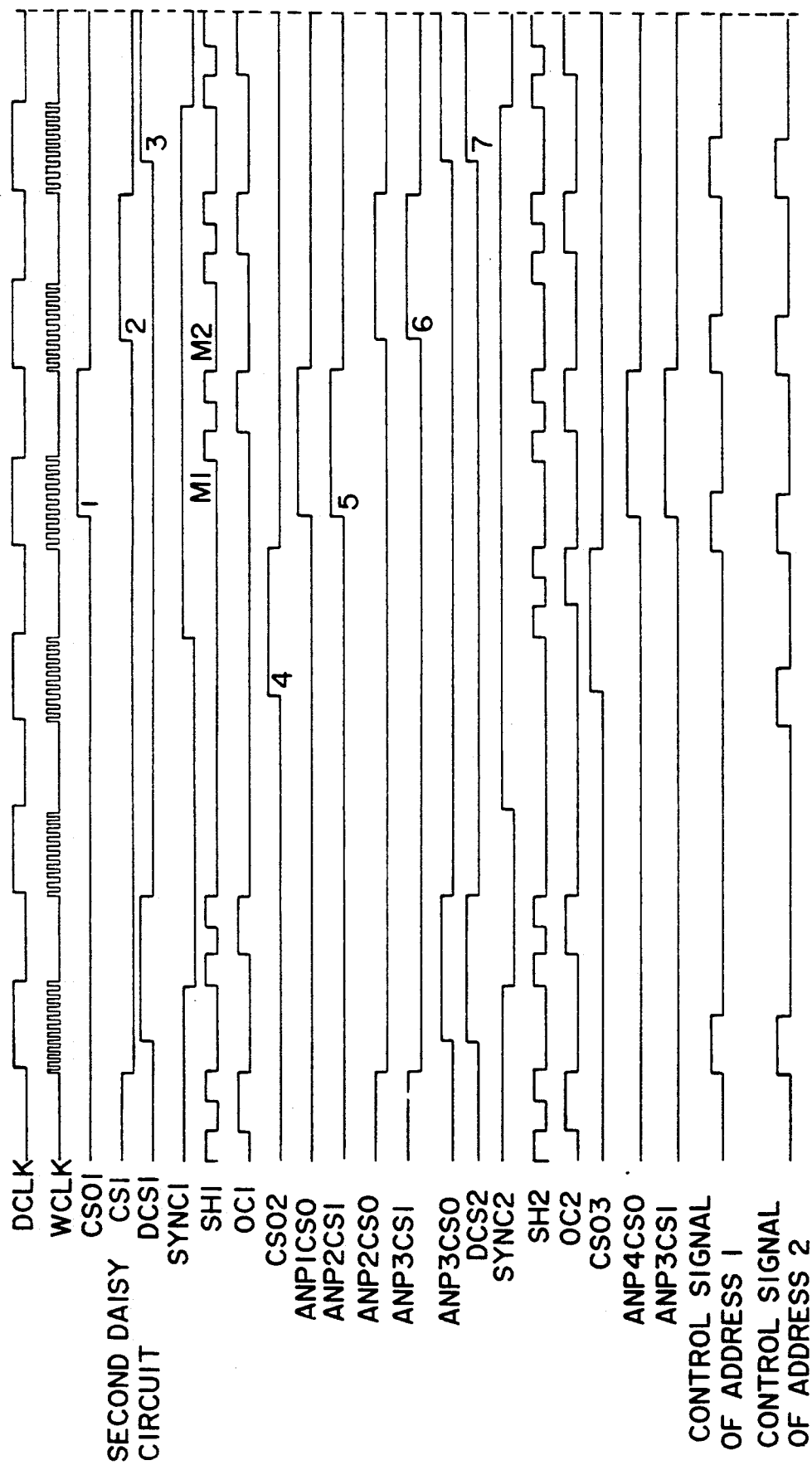
FIGS. 9A and 9B show a timing chart of the signal process shown in the detailed circuit shown in FIG. 8.

FIG. 9A shows a timing chart of a layered neuron computer according to the embodiment shown in FIG. 8. A control signal line is extracted every layer. The data clock DCLK, i.e., the basic operational clock, and weight clock WCLK are simultaneously applied to daisy circuits 171 and 172 on the input sides of all ANPs in the same layer.

Weight clock WCLK is a serial synchronizing pulse for transmitting the serial digital weight and for reading the weight from the weight memory block. The control signal determines at which timing the input data is received. In the timing chart of FIG. 9A, CSO1 is a busy daisy chain control signal output from the master control block 181, namely, the daisy chain control signal CSI applied to daisy circuit 171. In daisy circuit 171, CSI outputs the first analog input signal to analog bus B1 through analog input port 0 and sample/hold circuit SH173. In the timing chart shown in FIG. 9A, at time ①, the analog signal is output to analog bus B1. At this moment, the voltage is applied to analog bus B1 and ANP1, ANP2 and ANP3 perform a parallel sum-of-the-products operation for this analog signal. The CSO passes daisy circuit 171 and the next CSI rises at timing ②, a predetermined time after CSO falls. The next CSI is a control signal applied to second daisy circuit 172 in the input layer. During the high CSI period, the analog input signal is applied to ANP1, ANP2 and ANP3 through sample/hold circuit SH174, thereby executing a sum-of-the-products operation. DSC1 from master control block 181 is a control signal to be applied to a dummy node. Respective layers receive signals from the dummy node as well as input signals. The number of nodes is equal to the number of neuron nodes plus one. Therefore, the input layer has two inputs, although it seems to have three inputs when observed from the ANPs provided in respective intermediate layers. Therefore, a control signal block comprises two CSIs and one DCS1. The input cycle starts from the initial CSI and ends at the input to the dummy node DSC1. The dummy node is provided by the maximum value node circuit 187 and the circuit outputs a threshold value voltage fixed on the analog bus while CSI is being input As shown at time ③, from the beginning of the rise of DSCI and while the output voltage is being output respective ANPs in the intermediate layer perform the sum-of-the-products operations as for the ordinary input. The fixed value voltage of a high CSI signal is added to the sum-of-the-products of the previous two analog input signals, thereby enabling an addition to be conducted after multiplication. SYNC1 becomes high at a falling edge of DCLK before the rise of CSO1 and thus becomes low at the falling edge of the following DCLK after the rise of DSC1. SYNC1 is a synchronizing signal for the input layer. When WCLK is input, the analog input is multiplied by the weight data. Sample/hold signal SH1 input to the ANP at the intermediate layer, provides two high portions M1 and M2 and the product is obtained a little before the first high portion M1 and the sum is produced during the high portion M1 and then held. At the next high portion M2, the offset voltage Vb is subtracted from the held voltage (as indicated in FIG. 6) and that is subjected to a sample/hold operation. This process is repeated for the analog signal to be input, thereby computing the sum-of-the-products. In this case, respective ANPs in the intermediate layer perform the sum-of-the-products operation three times, including the one for the dummy node. Thus, the processes of respective ANPs in the intermediate layer are completed and the addition of the products for three inputs is completed.

In the timing chart shown in FIG. 9A, when DCLK is high immediately after the fall of DCSC1, the result of the sum-of-the-products operation of three signals obtained from analog input ports 0 and 1, and the dummy node is held in capacitors (Ch in a sample/hold unit 45 in FIG. 4) of respective ANPs 1, 2 and 3. This operation is basically repeated. The rise in the CSO2 signal determines when the output signal of ANP1 is output to the analog bus B2 provided between the intermediate layer and the output layer.

Offset control signal OC1 shown below SH1 performs an offset cancel within an ANP. Respective ANPs use analog signals including an operational amplifier therein and thus the circuit itself has an offset which is cancelled by the control signal of the OC1 signal. As shown by OC1, every time one sum-of-the-products operation is carried out, one pulse is output to perform an offset cancelling inside the ANP. In the timing chart, as shown by time ④, when CSO2 rises, the signal held in ANP1 is output to the analog bus B2, and ANP4 in the output layer forms a sum-of-the-products operation during the high CSO2 period. The rise of CSO2 shown by time ④, designates a timing, when the sum-of-the-products result obtained as a result of the preceding input signal, is output.

Figure 9B:
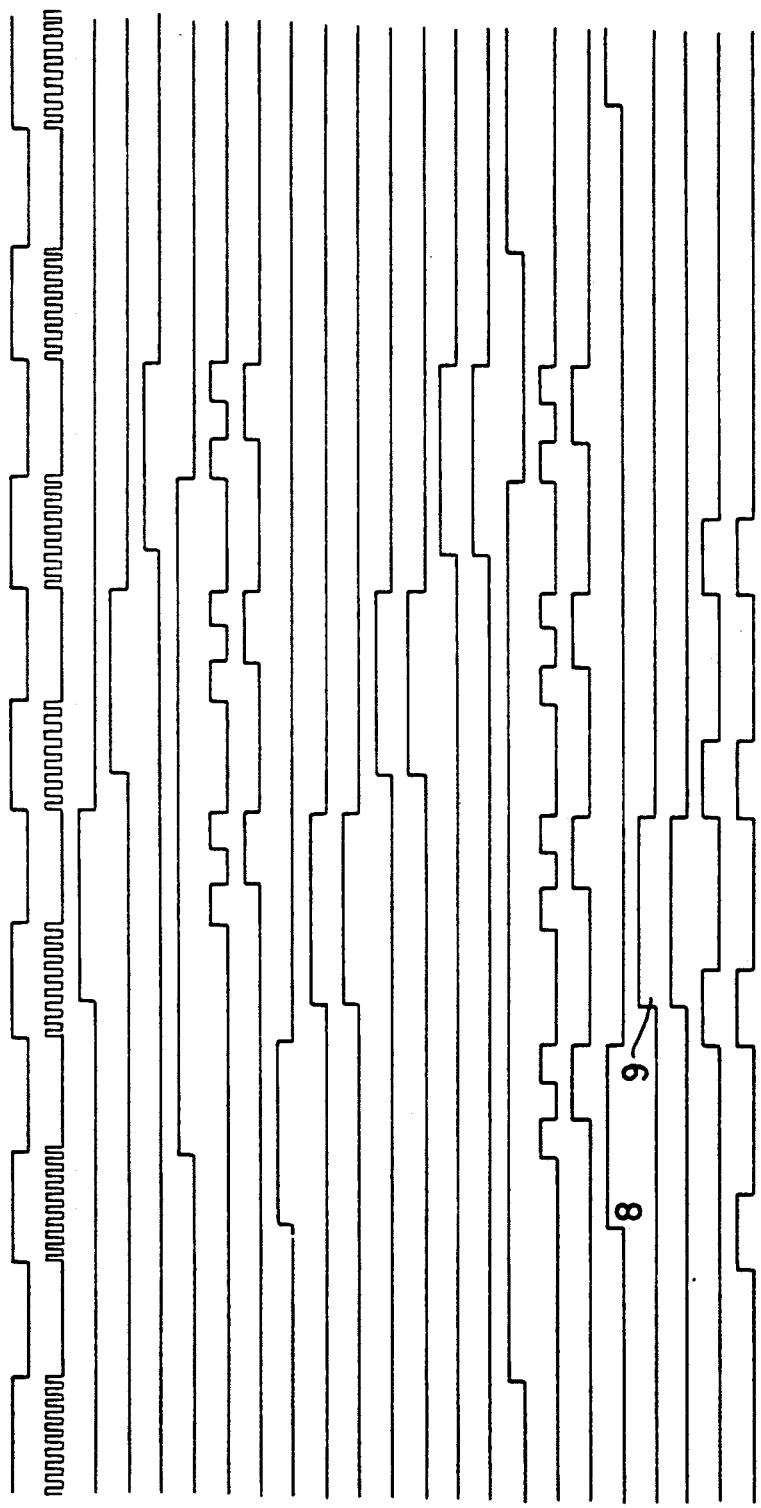

The timings in the intermediate layer and the output layer are explained by referring to FIGS. 9A and 9B. The analog signal is produced in synchronization with outputs ④, ⑤, ⑥, and ⑦, of the daisy chain control signal from the hidden layer and outputs ⑧ and ⑨ from the output layer and it is produced on the analog bus as the result of the previous process cycle for the analog signal in accordance with the daisy chain control signal outputs ①, ② and ③ from the input layer. The execution of the pipeline process is explained later. Upon the rise of CSO2, shown by time ④ in the timing chart, ANP1 produces the output. Two pulses are output as shown by the signal SH2. Signal SH2 is input to the first ANP4 in the output layer in the block diagram shown in FIG. 8. Namely, one sum operation in ANP4 is carried out on two high portions of the SH2 signal. Three neurons comprising ANPs 1, 2 and 3 are shown in the intermediate layer. In addition, the dummy node is added to it by maximum value node circuit 187, thereby providing four neurons in total. Accordingly, a pulse comprising two high portions of SH2 signal is produced four times starting at time ④. The analog signal in the hidden layer is input to ANP4 in timings of four pairs of high portions of the SH2 signal to perform the sum-of-the-products operation. This operation is naturally conducted simultaneously with the timing when the ANP in the hidden layer performs the sum-of-the-products operation on the input signal, thereby conducting pipeline processing. The CSO signal for ANP1 provided in the intermediate layer is shown below CSO2 and is CSI for ANP2 in the same intermediate layer. This is shown by the portion designated by time ⑤. The CSO for ANP2 is shown below ANP2, CSI and the CSI for ANP3 is shown below ANP2, CSO and the CSI for the dummy node is shown below the CSI for ANP3, and DCS2, output from the master control block, becomes high at time ⑦. The CSI is input to ANP1, ANP2 and ANP3 in the intermediate layer and max inner value node circuit 187 for the dummy node, in the sequence of times ④, ⑤, ⑥ and ⑦. During this period, signal SH2 produces four pulses, each having two high portions. The neuron of ANP4 provided in the output layer adds the products of input analog signals and weights four times. At time ④, when CSI is input to ANP1, the analog signal from ANP1 is output to the analog bus between the intermediate layer and the output layer and is input to ANP4. At the same time, corresponding weight data is input to ANP4 and the multiplications are carried out and the products are added at the first high portion of the SH2 signal and the sum is subjected to a sample/hold operation at the second high portion. Upon completion of the calculation, the CSO signal from ANP1 rises, thereby providing CSI of ANP2 at time ⑤. Then, the weight data is multiplied by the analog data, so that the sum can be calculated. A predetermined period after the fall of the state shown by time ⑤, the CSI to ANP3 becomes high and the sum-of-the-products operation is carried out by ANP4, as shown by time ⑥. The fixed voltage output from the maximum value node circuit 187 is then input to ANP4 and added to the result accumulated up to this point through the sum-of-the-products operation.

The above operation is applied in parallel to ANP5 in the output layer, thus realizing simultaneous processing.

When CSO3 output from master control block 181 rises, the result of the sum-of-the-products operation calculated by ANP4 is output to analog bus B3 connected to the output layer. The control signal according to which max value node circuit 187 provides the output to analog bus B2 is DCS2 and this corresponds to time ⑦. The operation up to DCS2 shown in the timing chart of FIGS. 9A and 9B is for outputting the calculation result from the hidden layer. The same operation will be applied to the signal designated below DCS2 in the timing chart. This signal defines the operation of the output layer side connected in cascade to the intermediate layer. Upon a rise of CSO3, the result of the sum-of-the-products operation calculated by ANP4 is output. ANP4 and ANP5 in the output layer produce the output. For example, the rise in CSO2 at time ④ enters ANP1 and this rise is delayed from DCLK. This is because, where the multiplication of the analog input signal and the digital weight data is performed, the digital data read by WCLK is serial. This serial data is converted to parallel data and thus the rise in CSO2 is delayed by the time required to convert the serial data to parallel data and the time taken for the analog input signal to arrive at the D/A converter, namely, the multiplying process unit. That is, the rise in CSO2 is delayed from the rise in DCLK by the time required to read the serial data. When some data, for example, 16 cycles of WCLK, pass after the rise of the DCLK, data set is completed. When 8 cycles of WCLK pass after the rise in CSO2, the analog multiplication starts.

Figure 10:
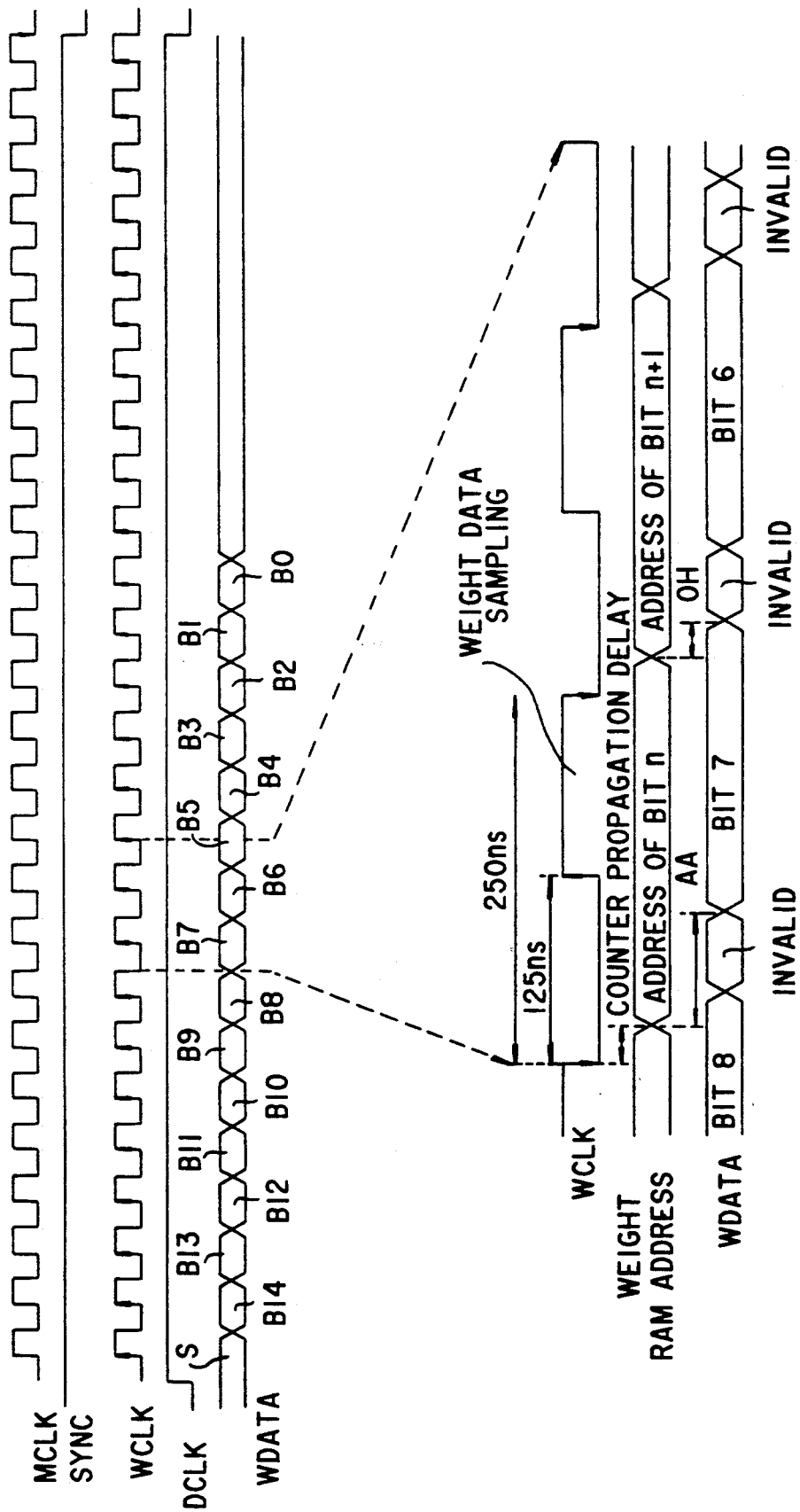
FIG. 10 shows a timing chart of the process upon reading the digital weight data.

FIG. 10 shows a timing chart designating a reading of the digital weight data. It shows the master clock MCLK, synchronizing signal SYNC, weight clock WCLK, data clock DCLK and actual weight data WDATA. The weight data WDATA is read out from the weight memory in a bit serial manner and 16 bit data is input serially. S indicates a sign bit and B14 to B0 show numerical value bits. In FIG. 10, the portions B7, B6 and B5 of the weight data WDATA are shown in the lower part of FIG. 10 to indicate their relation with the weight clock WCLK. The period of weight clock WCLK is 250 nsec and the duty ratio is 50%. After the propagation delay of a counter for updating the address provided in the sequencer passes from the fall of WCLK the address is provided to the weight memory. The address of bit n of the weight memory (RAM) stores bit 7 of weight data WDATA. When period tAA has passed after the determination of this address, bit 7 is read out. The change from bit 7 to bit 6 is determined by the change in the clock to the next period and bit 6 is read from the weight memory at the next period. 16 bits of weight data are input to ANP and the product of the 16-bit weight data and the analog voltage input to ANP are calculated by the internal D/A converter. The input of the analog voltage starts after the rise of the data clock DCLK. Therefore, it takes time for the analog input voltage to reach the D/A converter. It is necessary to control this time and the time required for setting the digital weight data and to input the analog voltage so that the arrival time of the analog voltage complies with that of the weight data.

For example, the analog input voltage complies with that of the weight data.

For example, the analog input voltage rises at bit 7 of the weight data and at bit 0 of the weight data. Thereafter, all the weight data are determined. The multiplication of the weight data and the analog value starts and the addition can be conducted during the period and DCLK becomes low at the next timing.

Operational timing of ANP is defined by SYNC signal, WCL, and data DCLK. There is an error in time when the analog input voltage is transmitted from an input terminal of the ANP to the D/A converter and CSI rises after DCLK rises, taking into account the possible difference in rising time between CSI and DCLK.

FIG. 11A shows the structure of master control block 181, which controls all the control signals. The main structure element comprises external bus interface circuit 200, control pattern memory 201, micro-program sequencer 202, micro-code memory 203 and address forming unit 204. External bus interface circuit 200 is connected to address line 205, data line 206 and control signal line 207 through an interface connected to the MPU. Upper address comparing circuit 208 and D-FF 209 of the register in external bus interface circuit 200 decodes the upper address given by the MPU. When the upper address is the same as the predetermined one, the lower address and data are set in D-FFs 209 and 211 by using a latch signal from timing circuit 214 as a trigger. The address and data are input through respective bus drivers 210 and 212, and through the internal address bus and the internal data bus. The address is used to refer to micro-code memory 203 and to write micro-code into micro-code memory 203 from the MPU side through the data bus. The lower address is applied to micro-program sequencer 202 through bus driver 210 and the MPU can refer to control pattern memory 201 by using a predetermined address.

The data from the MPU main memory is latched by D-FF 211 to data line 206 and is applied to separate I/O RAM 213 in micro-code memory or separate I/O RAMs 215 and 216 in control pattern memory 201 through bus driver 212. The data strobe signal from the MPU or the memory is added to timing circuit 214 through control signal line 207 and the acknowledge signal is returned, thereby controlling the transmission and receiving the address and data. Timing circuit 214 controls a latch timing to D-FF 211 and D-FF 209 and controls the writing timing to micro-code memory 203 and control pattern memory 201 through the WR signal.

One period of each of the "1" and "0" patterns of a control signal given to the neuron chip, as shown in the timing charts of FIGS. 9A and 9B, are stored in control pattern memory 201 and read out from control pattern memory 201 in accordance with the control of micro-program sequencer 202, thereby producing one period of the patterns. For example, reset signal RESET, data clock DCLK, weight clock WCLK, CSO1, CSO2, CSO3, SYNC1, SYNC2, SH1, SH2, OC1, OC2 are read from the first separate I/O RAM 215 and the control information accompanied by the pattern, namely, the sequence control flag, is read from second separate I/O RAM 216. Where the pattern "1000110001" is stored in control pattern memory 201, the address of control pattern memory 201 is controlled to repeat the bit comprising "1 and 0" and the repeated pattern is read out from control pattern memory 201. As the control signal patterns are extremely complex, they are prestored in separate I/O RAM 215 and the bit pattern is sequentially output by designating the address of separate I/O RAM 215 under control of micro-program sequencer 202. Thus, a plurality of the same patterns is repeated, as determined by the address control. One pattern period is called an original pattern. In order to repeat the original pattern, specific information is fed back to micro-program sequencer 2 from control memory 201. The sequencer control flag within the second separate I/O RAM 216 is input to micro-program sequencer 202, so that the addressing is returned to the head address in which the original pattern is stored in the first I/O RAM 215. Thus, the original pattern is repeated. Micro-program sequencer 202 transmits an address signal to separate I/O RAM 215 through general purpose port output line 202-1 until the required condition is satisfied. Normally, the address is incremented but the address signal is returned to the head address in which the original pattern is stored. As a result, a predetermined control pattern is repeatedly output from separate I/O RAM 215.

Figure 11B:
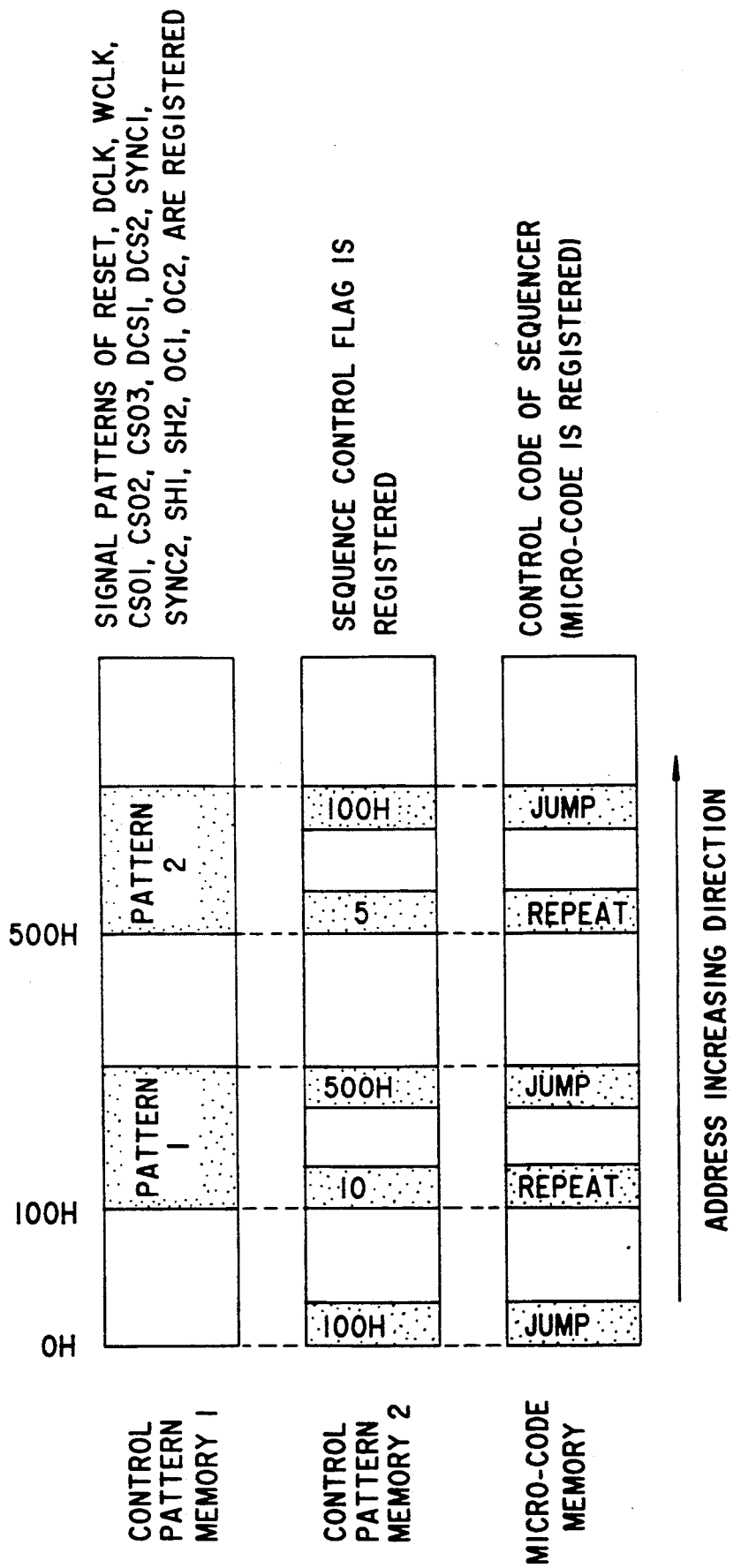
FIG. 11B shows a structure of a control pattern memory and micro-code memory.

FIG. 11B shows the relationship between the information of memories 201 and 203 for controlling master control block 181. In FIG. 11B, control pattern memory 1 corresponds to the first separate I/O RAM 215 and control pattern memory 2 corresponds to the second separate I/O RAM 216. The control code of sequencer 202 is stored in micro-code memory 203, which stores mainly jump commands and repeat commands. Repeat commands are stored in a predetermined address and the number of the control pattern repetition in the control pattern memory is stored in the corresponding address of control pattern memory 2 in accordance with the repetition command. When this number reaches "10", ten repetitions are carried out. In this way, the address increases until it reaches a jump command in micro-code memory 203 and the address jumps to 500H by the second jump in micro-code memory 203, thereby producing pattern 2. These addresses jump to "100H" again, the third jump within the micro-code memory 203, thereby outputting pattern PAT1. Thus, the original pattern is repeated and read out from control pattern memory 1.

WCLK is formed in synchronization with the reading clock of the address referred to by control pattern memory 201 and information is read out from weight memories 185 and 186 in sychronization with WCLK. The addresses of weight memories 185 and 186 are accessed by the address signal output from addresses 1 and 2 of address forming unit 204. Addresses 1 and 2 are separated, address 1 being for the hidden layer and address 2 being for the output layer. The weight data applied to the ANP in the hidden layer is read out from weight memory 185 designated by address 1. The weight data applied to the ANP in the output layer is read out from weight memory 186 designated by address 2. The contents of weight memories 185 and 186 are stored bit by bit in the increasing direction of the address and it is necessary to apply a count control signal to address counters 217 and 218 from micro-program sequencer 202. Incrementing addresses are applied sequentially to weight memories 185 and 186 through bus drivers 219 and 220 from address counters 217 and 218. A plurality of weight data is read out from weight memories 185 and 186. WCLK from the first separate I/O RAM 215 and a counter control signal from micro-program sequence 202 are applied to AND circuits 221 and 222 in address forming unit 204. When the counter control signal is high, the address counter is updated by WCLK. Address counters 217 and 218 are incremented from 1 to 16 bits of WCLK. The remaining 17 to 26 bits of WCLK are inhibited by turning the counter control signal low and stopping incrementing address counter 217 and 218. A counter reset signal is transmitted to AND circuits 221 and 222 from micro-program sequencer 202 in synchronization with SYNC1 and SYNC2 and reset address counters 217 and 218. The address is returned to the head address of weight memories 185 and 186. The mode signal output from master control block 181 comprises a mode designating an ordinary use of the weight memory, namely, separating the weight memory from the MPU data bus to apply the weight data to the ANP and a mode in which the weight memory is connected to MPU data bus and is referred to by the MPU.

The LSB of the data from the MPU to flip-flop 224 is used by a trigger signal and an AND signal is output from AND circuit 223 when a bit of the lower address and write signal WR from timing circuit 214 are applied to AND circuit 223. When the mode signal is 0, the weight memory is for an ordinary use.

Write signal WR and a bit of the internal address bus are input to a clock terminal flip-flop 224 through AND circuit 223 and the LSB of the internal data bus is input to the data terminal of flip-flop 224. The upper address signal is input to comparing circuit 208 and it is determined whether master control block 181 is selected. If it is, the lower address and data are applied to DFFs 209 and 211. This interface operation is applied to the other devices connected to the MPU and the weight memory supplies the weight data to the ANP during a normal period, and if the weight memory is directly connected to the data bus of the MPU, bus competition is caused. To prevent this, the mode is determined as 1 when the LSB of the data bus is supplied to the flip-flop, thereby preventing the weight memory from being chip-selected and producing the data on the data bus from weight memory. The internal address bus designates the addresses of either micro-code memory 203 or control pattern memory 201 by using the internal address bus. The desired data is written into the accessed address to the internal data bus. Thus, the program stored in micro-program sequencer 202 is selected, and the programs stored in micro-code memory 203 and separate I/O RAM 216 are changed and the control pattern stored in separate I/O RAM 215 is changed.

Figure 12A:
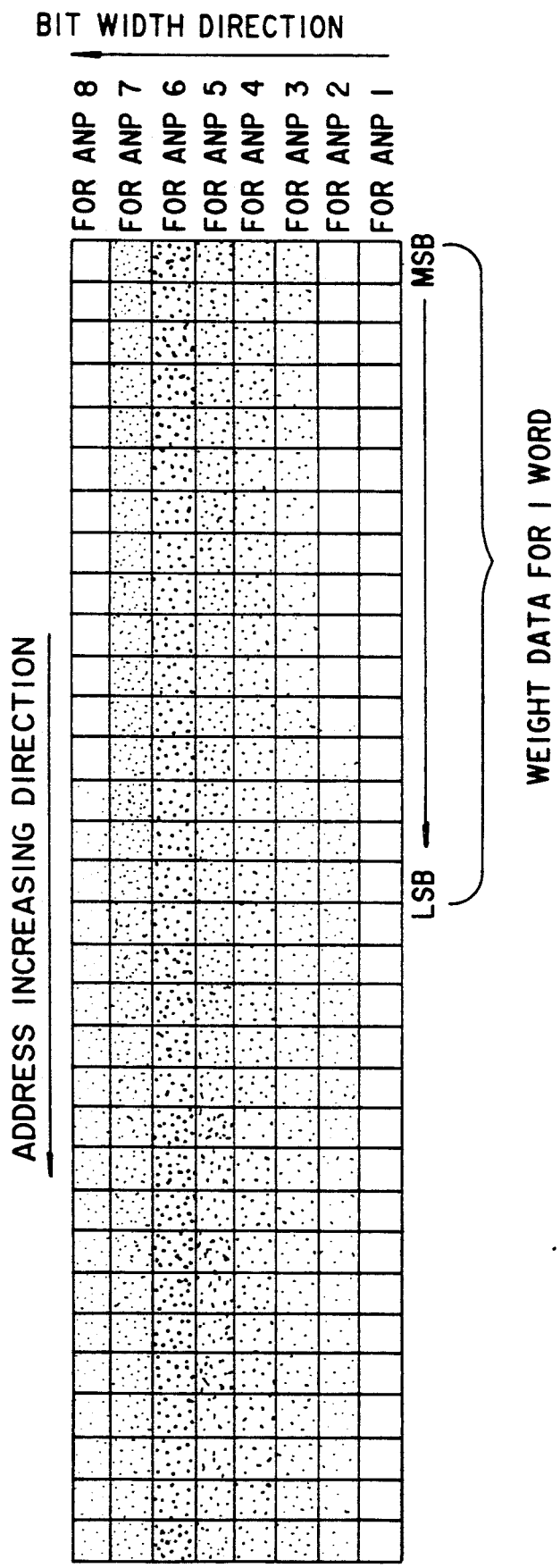
FIG. 12A shows how the data is stored in the weight data memory.

FIG. 12A shows the data storage structure of weight data memory 230. The 8 bits in a column direction are the 8-bit data stored in the same address and thus, bits 1, 2 ... 8 are for ANP1, ANP2 ... ANP8, respectively. In the row direction, the addresses are different and increase from right to left. The weight data comprises 16 bits including the sign bit and these bits are stored in addresses from the small address value to a large address value. MSD is the sign bit and the other 15 bits are numerical value bits. When the address provided by micro-program sequencer 202 increments in synchronization with WCK, one word of the weight data, namely 16 bits, is read out from MSD to LSD, and is thereby applied simultaneously to 8 ANPs. As the data is stored in an increasing direction of the address, the address count is conducted for the weight data. Namely, one word of weight data from MSD to LSD are counted then one item of weight data is provided under the control of the weight data memory. Control is also conducted by micro-program sequencer 202.

Figure 12B:
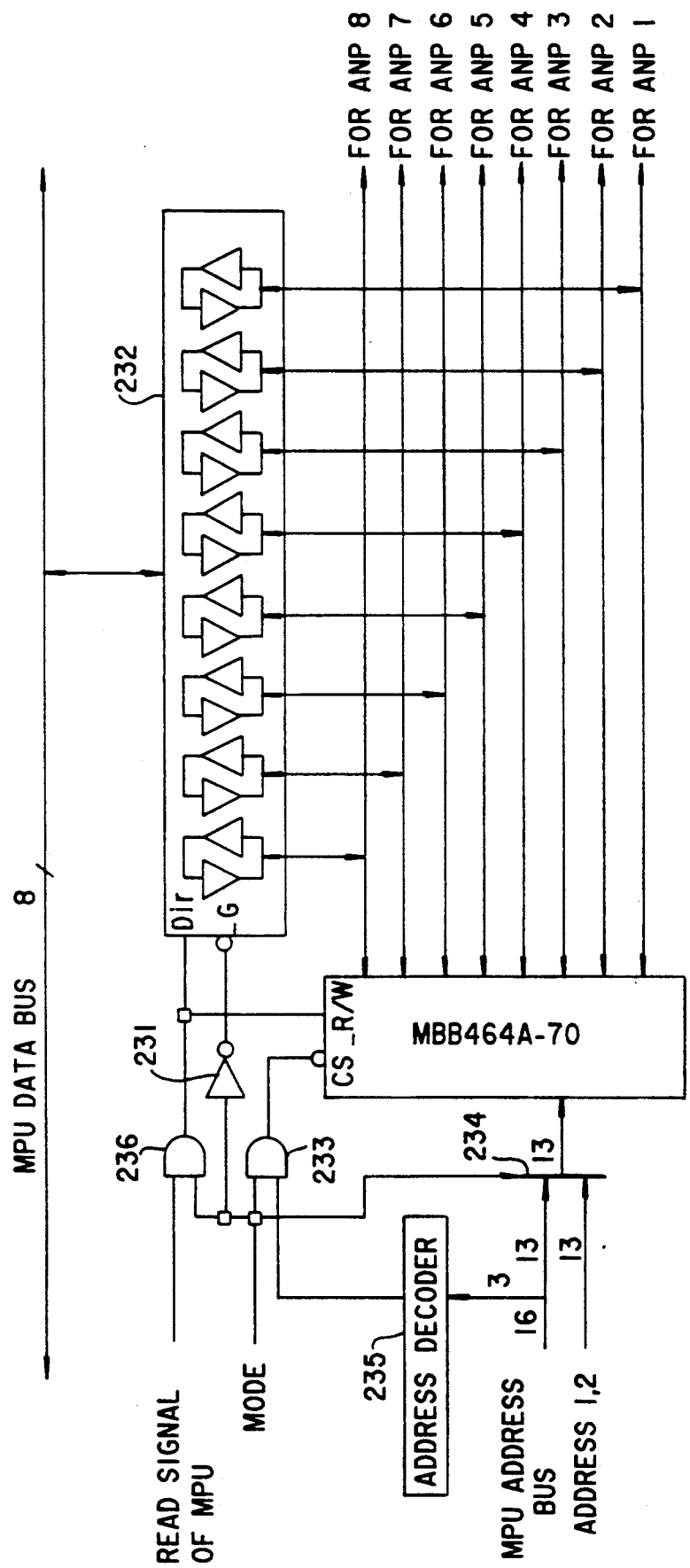
FIG. 12B shows the detailed circuit structure of the weight data memory.

FIG. 12B shows a circuit of weight memory blocks 185 and 186. Memory 230 comprises a RAM named MB8464A-70. The output comprises 8 bits corresponding to ANP1 to ANP8. Basically, either the bus signal line viewed from the MPU bus or addresses 1 and 2 viewed from master control block 181 are used. Addresses 1 and 2 are the same as addresses 1 and 2 in FIG. 11A. They are input, incrementing in synchronization with WCLK. 8-bit data is simultaneously read out and respective bits are simultaneously applied to ANP1 to ANP8.

When the mode signal is 0, weight memory 230 is chip selected through AND gate 233. Addresses 1 and 2 from micro-program sequencer 202 become effective at the multiplexer 234. The weight data from weight memory 230 are transmitted to ANPs 1 to 8. On the other hand, the output of the reverse circuit 231 is high, thus enabling tri-state bus transceiver 232 and preventing the weight memory 230 from being output to the MPU. If the data is output to the MPU, the mode signal is turned to 1 and memory 230 is chip selected through address decoder 235 according to appropriate address information from the MPU and memory 230 receives an address signal from the MPU. When the mode signal is 1, memory 230 is chip selected through address decoder 235 by appropriate address information from the MPU. When the mode signal "1" is read by the MPU bus or written in RAM memory 230 of the bus, the direction of the read and write is determined by that read signal on the data line transmitted from the MPU through AND gate 236.

The learning algorithm will now be explained.

Figure 13A:
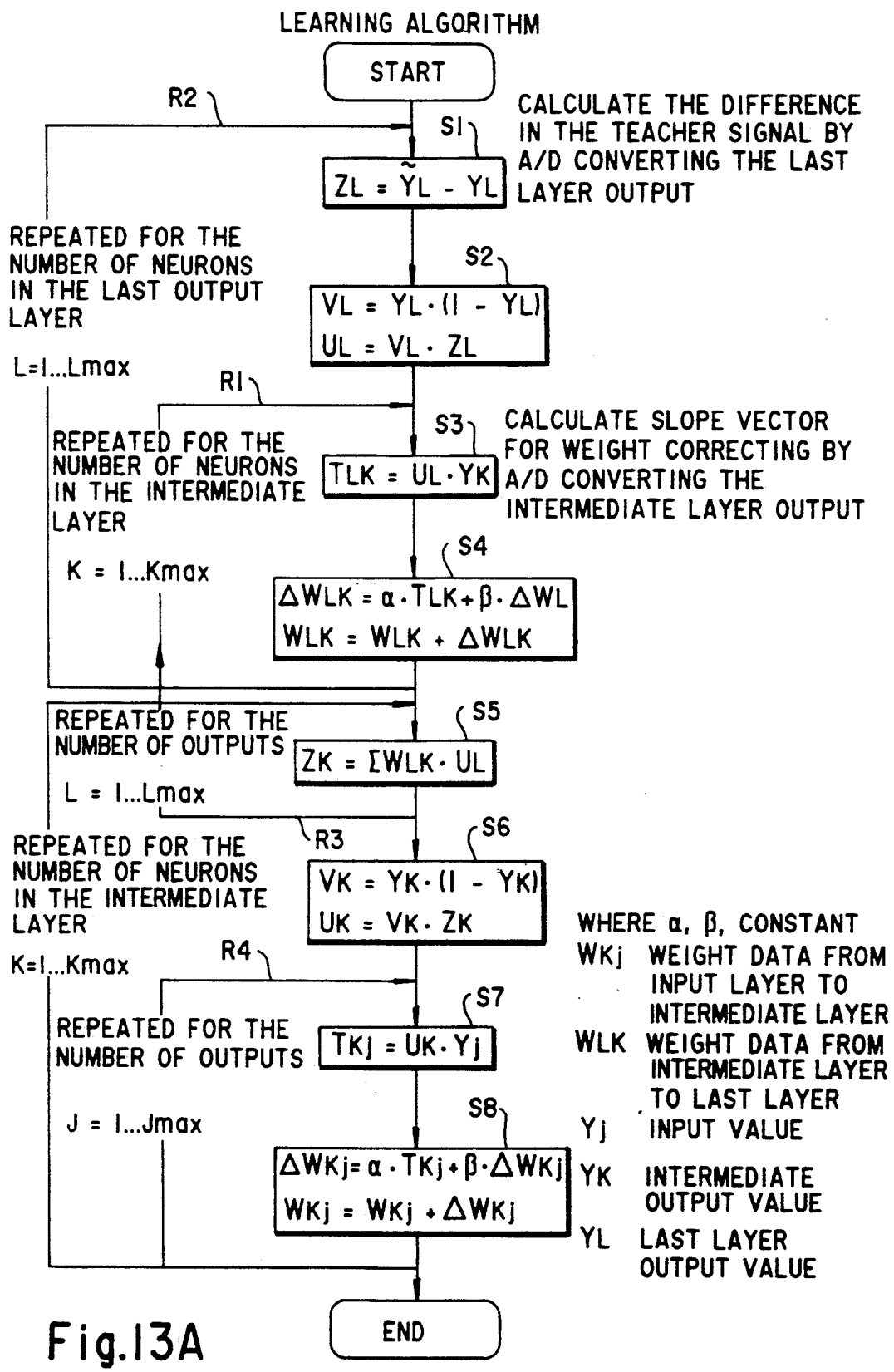
FIGS. 13A and 13B show flowcharts designating a learning algorithm according to the present invention.
Figure 13B:
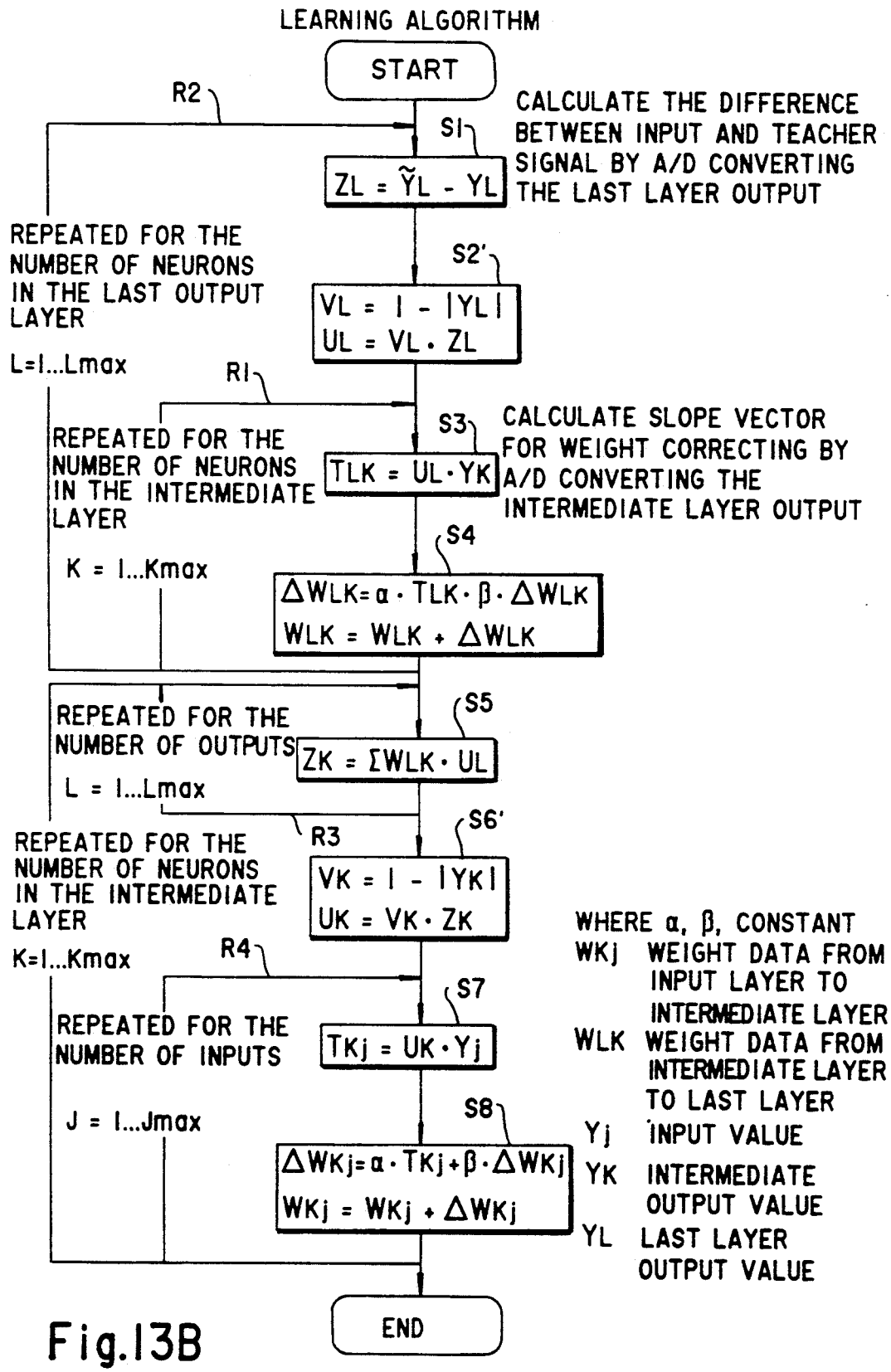

FIG. 13A shows a flowchart of a learning algorithm using back propagation utilized in the present invention. The learning is conducted as follows. All the information to be learned is input to a neural network, namely, a layered type network constituted of ANPs, through an input control circuit, not shown, from the MPU. The input signal is provided at the network output through the input side circuit, the hidden layer and the output layer. It is further applied to the MPU through an A/D converter. The learning algorithm exists in the main storage on the side of the MPU. The teacher signal is obtained from main storage and transmitted to the MPU and the error between the output of the network and the teacher signal is examined. If the error is large, the MPU changes the weight data representing the strength of the network's connection to a direction such that the right output is produced by the network. The weight data is applied to ANPs in respective layers through weight memory 230.

When the weight data is updated in accordance with the learning algorithm, the learning process is carried out in accordance with the learning algorithm of the back propagation shown in FIG. 13A. When the learning algorithm starts, the MPU obtains the error between the teacher signal YL and the current output YL at the L-th neuron ANPL in the output layer and inserts it into ZL. The output YL is the output of the neuron ANPL if the sigmoid function is used as a non-linear element. The output YL is provided as the output value of a non-linear function. Therefore, in the neuron ANPL, error ZL must be propagated into the input side of the non-linear function. When this error propagation is conducted, the energy function, namely, the second power of the error signal multiplied by $\frac{1}{2}$, provides the following energy equation.

$$E_L = \tfrac{1}{2}(Y_L - Y_L)^2$$

The partial differentiation of the non-linear type function input $X_L$ is as follows.

$$\delta = -\frac{\partial E_L}{\partial X_L}$$

The above equation can be changed to the following equation.

$$\delta = -\frac{\partial E_L}{\partial X_L} = -\frac{\partial E_L}{\partial Y_L} \cdot \frac{\partial Y_L}{\partial X_L}$$
$$= (Y_L - Y_L) \cdot f(X_L)$$

If non-linear function $f(X_L)$ is a sigmoid function, it is expressed as follows.

$$f(X_L) = \frac{1}{1 + e^{-X_L}}$$

Differentiation $f'(XL)$ of the sigmoid function yields the following equation.

$$f'(X_L) = Y_L(1 - Y_L)$$

This equal VL shown in S2 in the flowchart. Accordingly, $\delta$, namely, the partial differentiation of non-linear function input XL, is VL×XL. This provides UL shown in step S2. The error $\delta$ for the non-linear function input of the energy is back-propagated to the hidden layer.

The k-th neuron in the hidden layer is designated as AK.

The output of AK is YK. Linear function input XL of neuron ANPL in the output layer is expressed by the sum-of-the-products obtained by multiplying the output (Y1 ... YKMX) of the neuron in the hidden layer by the respective weight WLK. Accordingly, the partial differentiation of XL with regard to WLK is output.

$$\frac{\partial X_L}{\partial W_{Lk}} = \frac{\partial}{\partial W_{Lk}} \cdot \sum_k W_{Lk} Y_k = Y_k$$

On the other hand, the change in the weight WLK for energy EL is provided by the following equation.

$$\frac{\partial E_L}{\partial W_{Lk}} = -\frac{\partial E_L}{\partial X_L} \cdot \frac{\partial X_L}{\partial W_{Lk}} = U_L \cdot Y_k$$

Namely, TLK at step S3 expresses the following item.

$$-\frac{\partial E_L}{\partial W_{Lk}}$$

This is the partial differentiation of the energy with regard to the weight. Accordingly, $T_{LK}$ may be determined as the variation $\Delta W$ of the weight and in order to speed up the conversion, the following recurrence formula is used. This corrects the weight by adding the second term of the first equation shown in step S4.

$$\Delta W_{LK} = \alpha T_{LK} + \beta \cdot \Delta W_{LK}$$

$$W_{LK} = W_{LK} + \Delta W_{LK}.$$

where $\alpha$ and $\beta$ are constants. A special neuron ANP in the output layer is noted and all the neurons in the hidden layer are supposed to be corrected. Thus, it is necessary to repeat k from 1 to kmax with regard to respective ANPLs. This is conducted by a repetition shown by R1 in the flowchart and it is necessary to repeat k, the number of repetitions being equal to the number of neurons kmax in the hidden layer. When this repetition is ended, back propagation for the special neuron ANPL is completed. Accordingly, the above operation should be applied to all the neurons (ANP1, ANP2 . . . ANPLmax) in the output layer. Thus, as shown by R2 in the flowchart, L is repeated from 1 to Lmax. Therefore, the process is repeated, the number of repetitions being equal to the number Lmax of the neurons in the output layer.

Next, the learning is conducted from the hidden layer to the input layer. The algorithm is almost the same as that described above, but the error signal cannot be expressed by the difference between the teacher signal and the output voltage and can be shown at step S5. Namely, ZK is the k-th neuron in the hidden layer and corresponds to the output error signal AK. This is clarified by the following equation.

$$\sum_L \frac{\partial E_L}{\partial X_L} \cdot \frac{\partial X_L}{\partial Y_k} = -\sum_L \frac{\partial E_L}{\partial X_L} \cdot \frac{\partial}{\partial Y_k} \sum_K W_{Lk} Y_k$$
$$= -\sum_L \frac{\partial E_L}{\partial X_L} \cdot W_{LK}$$
$$= \sum_L W_{Lk} \cdot U_L$$

Accordingly, the process is repeated from 1 to Lmax to obtain the index error of $Z_k$ at step S5 and is therefore repeated through a route R3, the number of repetitions being equal to the number of outputs. Thus, the error signal $Z_K$ is in the hidden layer. Thereafter, the algorithm is the same as that between the hidden layer and the output layer. First, the differentiation value VK of the sigmoid function is output and UK, namely, a change for the non-linear function input of the energy, is obtained at step S6. At step S7, the product $T_{KJ}$ of the UK and the output YJ of the input layer is obtained. As the main portion of the change in weight, the second term is added to speed up the conversions, as shown in step S8. ΔWKLJ is obtained and added to the previous value of WKJ, thereby providing a new WKJ. This is a process for updating the weight. This process is repeated, the number of repetitions being equal to the input number Jmax (R4), namely, the process is repeated from J equals 1 to J equals Jmax and the weight between the input layer and hidden layer is updated. Zk of step S5 corresponds to the error signal of the output from the hidden layer and this ZK can be expressed such that the partial differentiation UL of the energy of the output layer for the function input value is expressed and WLK is finally determined in the hidden layer and in the output layer. Namely, the calculation for updating the weight starts from neuron ANPL at the output layer and moves to neuron ANPK in the hidden layer. The weight change ΔW cannot be calculated at neuron ANPK in the hidden layer if ΔW in the previous stage cannot be obtained. This is called the back propagation method as the learning becomes possible only when the process goes back to the input layer.

In the back propagation method, the learning data is input as complete information. The method includes a forward operation for outputting the result of learning and a backward movement for strengthening all the connections to minimize the error.

This forward operation is also necessary. The analog neural network unit of the present invention can be effectively utilized in the forward operation. The back propagation of the output value is carried out by the MPU. If the non-linear function is different from the sigmoid function, the differential value of the non-linear function is different from that of the sigmoid function. For example, for the function tan H(X), the learning algorithm is as shown in FIG. 12D and the differential result of the non-linear function can be expressed as $VL = 1 - YL$ in the output layer S2' and $VK = 1 - YK$ (S6') in the hidden layer.

As the process is designated by the same reference numbers as in FIG. 12C, the explantion is omitted.

Figure 14A:
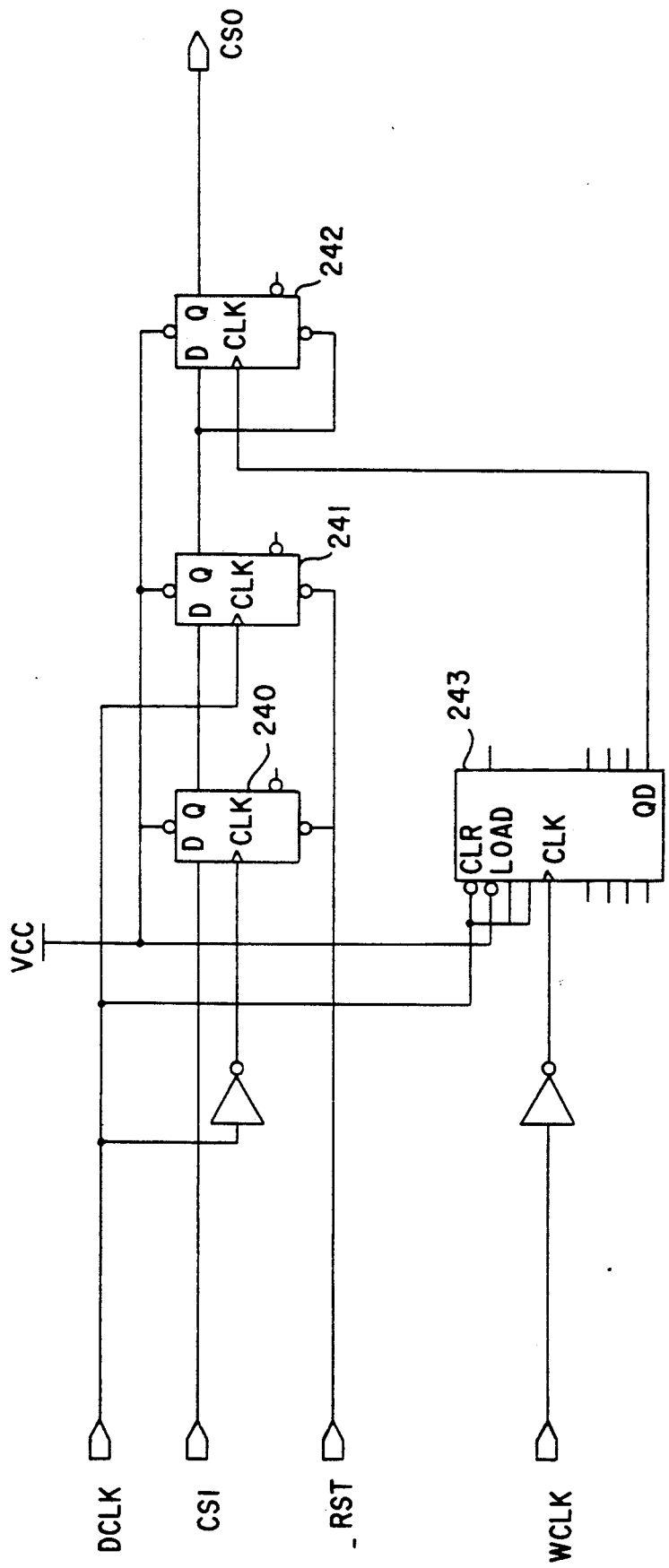
FIG. 14A shows a block diagram of the daisy circuit used in the embodiment of the present invention.

FIG. 14A shows the structure of the input side daisy circuits 173 and 174. 240, 241 and 242 are D-type flip-flops. The data input to the D terminal is selected by the write of the DCLK signal and the output Q is turned to the state "1". The first flip-flop 240 sets the CSI signal at the fall of DCLK and in the next light of DCLK, the output signal is set in the second flipflop 241. The output of the second flip-flop is applied to the D terminal of the third flip-flop 242. The clock signal for setting the input is output from 4-bit counter 243. Counter 243 is triggered at the fall of WCLK and cleared at the fall of DCLK. Therefore, at the fall of DCLK, counter 243 becomes all 0. The fall of WCLK is input 8 times and thereafter the QD signal of the upper bit becomes high, thereby enabling a high signal to be output as a CSO from flip-flop 242. The output of flip-flop 241 becomes 0, thereby clearing CSO. In accordance with such operation, the daisy operation is conducted, in which CSO is output at a predetermined time corresponding to 8 pulses of WCLK after CSI falls.

Figure 14B:
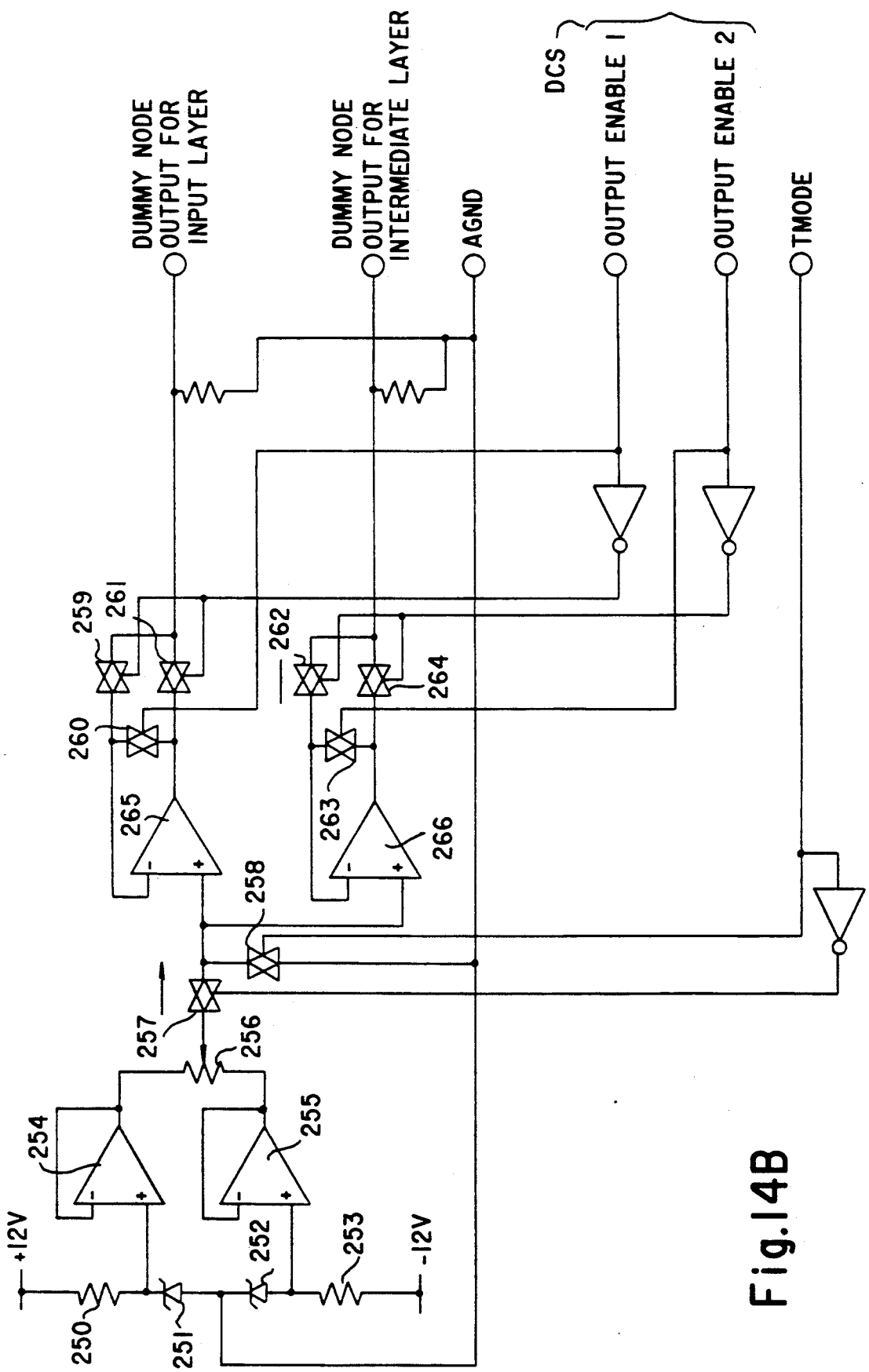
FIG. 14B shows a block diagram of a max. value node circuit used in the present invention.

FIG. 14B shows max. value node circuit 187 forming a neuron of the dummy node. Register diodes 251 and 252, resistor 253, and voltage followers 254 and 255, form a circuit for providing a constant voltage. When a current flows between 12 volts and −12 volts through resistors 250 and 253 and Zener diodes 251 and 252, then +7 volts and −7 volts are respectively formed at the input of voltage followers 254 and 255. This voltage is output to output resistor 256, forming voltage followers 254 and 255. The operation is controlled by using analog switches 257 through 264 such that two constant voltages are output in a time divisional manner. When the T-mode signal is 0, a constant voltage is supplied to the next voltage follower 265 through analog switch 257 when the T-mode is "1". Namely, in T mode, the output of analog switch 257 is suppressed so that the analog ground and "0" volts is input to voltage follower 265. In the test mode, the offset on the bus is notified to the MPU. Voltage follower 265 is enabled by the switch control at the output portion. When the output enable is turned to "1", analog switch 260 is turned on and operated as the voltage follower and produces the output. However, at this time the dummy node does not produce an output. Conversely, when the output enable is 0, an output is produced at the dummy node. Analog switch 260 and the switch control of the output are controlled by output enables 1 or 2 and is "0" enable. When output enable 1 or 2 is 0, a constant voltage is output at a dummy node. The upper dummy node output is for the input layer and the lower dummy node output is for the intermediate layer. The output voltages of these dummy nodes are fixed to the appropriate value and can be used as threshold voltages. Zener diodes 251 and 252 produce constant voltages during the reversed prior state. These constant voltages can be changed from +7 volts to −7 volts. The enable states of output enables 1 and 2 are determined by dummy node control signal DCS from master control block 181 to avoid a collision between the output voltages from this and other ANPs connected to the analog bus.

Figure 15:
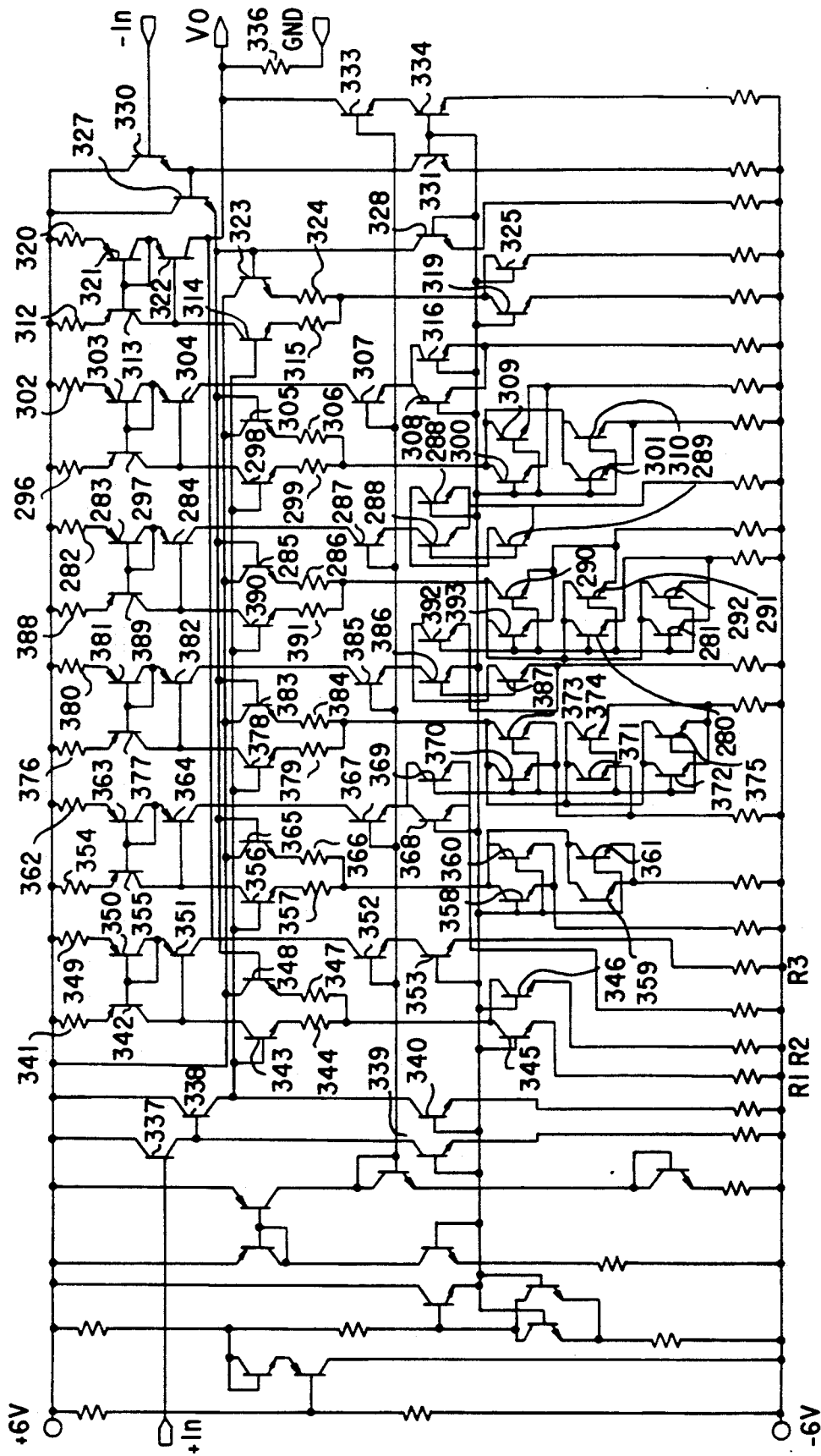
FIG. 15 shows a detailed circuit diagram of the sigmoid function realizing circuit used in the basic unit of the ANP of the present invention.
Figure 16:
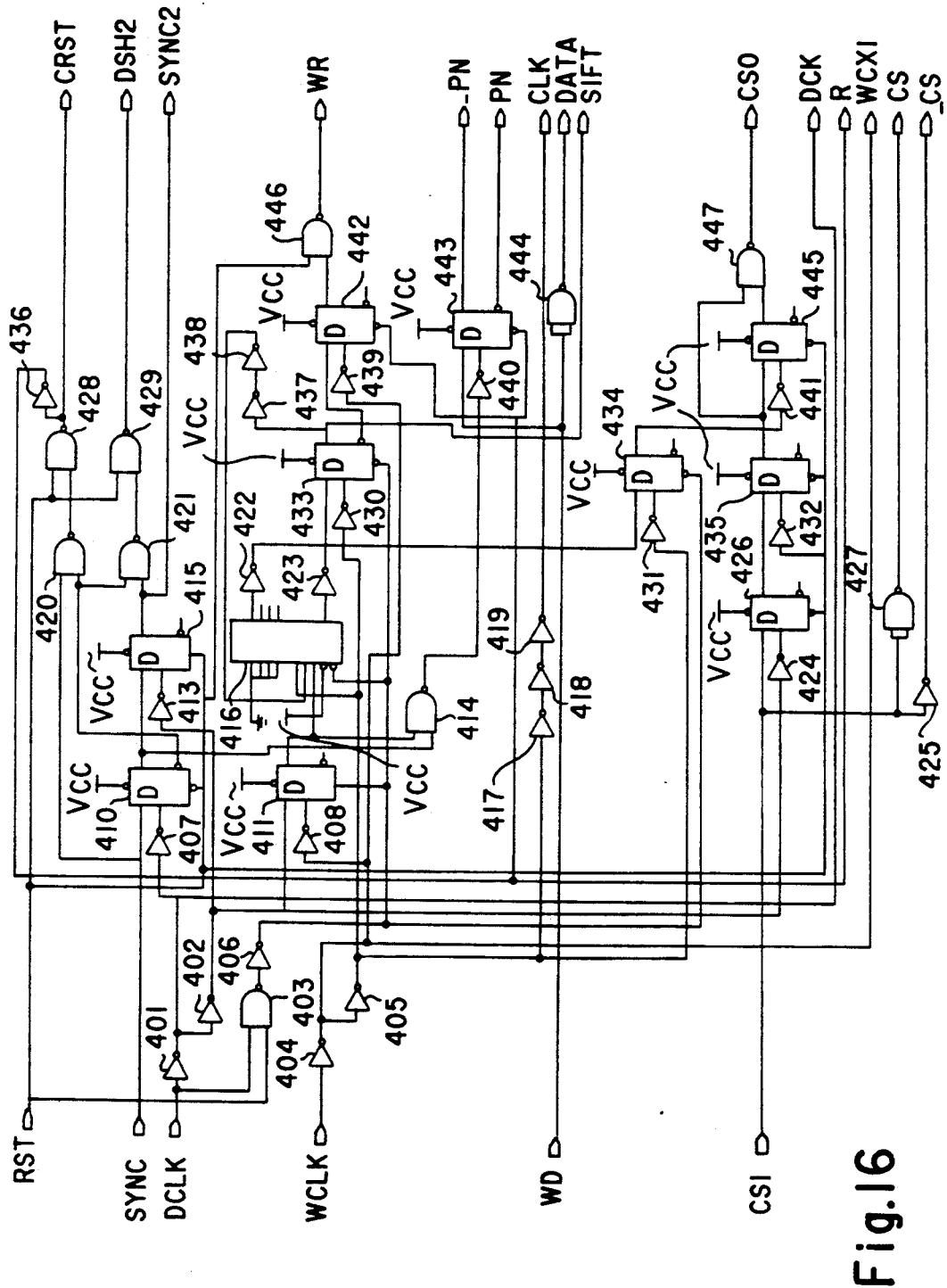
FIG. 16 is a detailed circuit diagram of the sequence generator used in the present invention.
Figure 17:
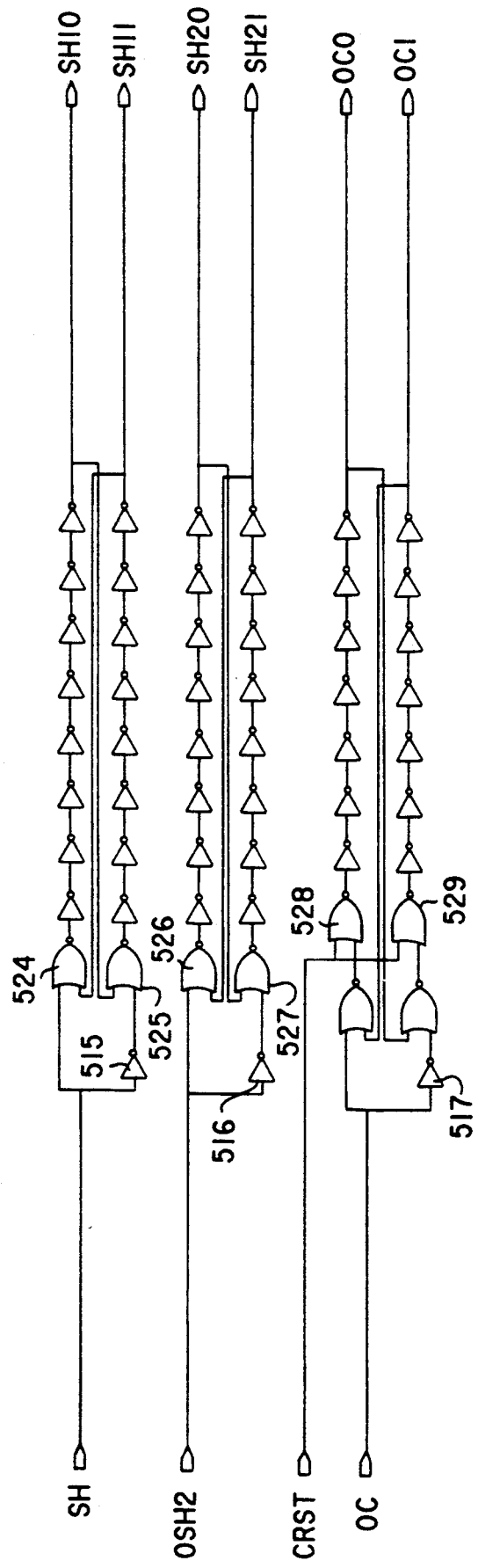
FIG. 17 shows a detailed circuit diagram of the phase control circuit used in the present invention.
Figure 18B:
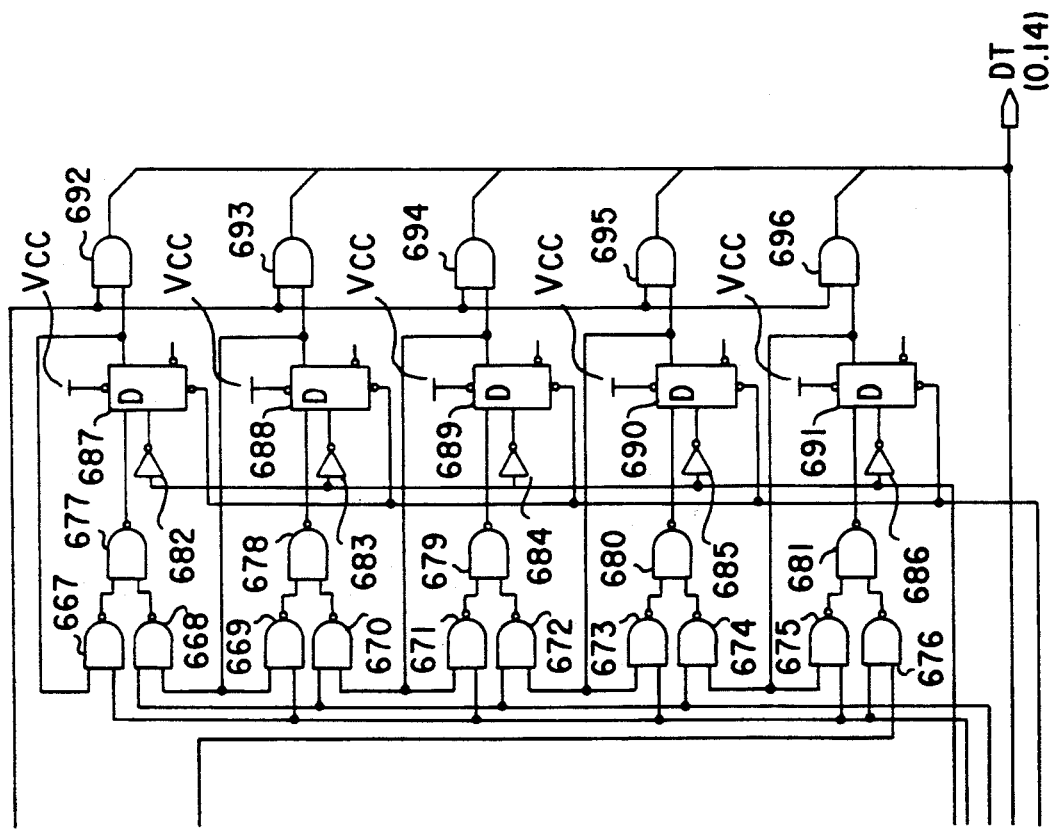
FIG. 18 shows a detailed circuit diagram of a shift register used in the present invention.

FIG. 15 shows a non-linear function generating circuit and FIGS. 16, 17 and 18 show hardware on the digital logic side of the ANP.

FIG. 15 shows a transistor circuit for realizing a sigmoid function. The sigmoid function represents a monotonously decreasing function but does not exclude a linear function. Transistors 343, 356, 378, 390, 298 and 314 and transistors paired with them form differential amplifiers and the transistors connected to the collector side of the differential amplifiers constitute current mirror circuits. The collector current flowing through the collector of the transistor on the left side of the differential amplifier is the output current. The current mirror circuit changes the direction of the current and outputs it. The current enters resistor 336 connected to the output VO, which changes the voltage into current. Since driving capability is lacking, an operational amplifier with a high impedance is provided at the output. The circuit provided on the input side of transisters 337 and 339 constitute a bias-circuit. A division linear method is used to realize a sigmoid function. The slopes of respective divisions of the sigmoid function are determined by the ratio of emitter resistor 344 connected to the emitter of the differential amplifier to output resistor 336. In this instance, the emitter resistors of transisters 343 are also included. The gains of respective differential amplifiers are different. The break point relating to a variation in respective division lines utilizes such saturation characteristics of the transistor. The saturation characteristics of all the transistors are different. The saturation characteristics of respective amplifiers are changed so that the value of the sum of the currents output from respective operational amplifiers forms a sigmoid function at the output point VO. Transistor 345 and resistor R1 constitute a current source. Transistor 346, resistor R2, transistor 353 and resistor R3 are the current source for supplying the same currents.

Namely, the resistor is determined so that the current value of the current source becomes the same. The collectors of transistors 345 and 346 are connected to each other and the sum of their currents flows through the crossing point of resistors 344 and 347. The collector currents of transistors 343 and 348 become the same when the current is balanced. Transistor 351 is provided to improve the characteristic of the current mirror. Transistor 350 is diode connected. The change in current means that drawing the current from the output is changed to delivering the current to the output and vice versa. As shown in FIG. 15, the current flows from the collector of transistor 351 of the current mirror circuit to the output. The transistors whose emitters and collectors are connected to the same point form a single transistor. For example, transistors 358 and 360 form a single transistor which is the same as transistor 345. Transistors 359 and 361 form a single transistor which corresponds to transistor 346. Transistors 348 and 369 form a single transistor which correspond to transistor 353. The same relationship is applied to the other transistors shown in the lower part of the circuit. Therefore, there are provided 6 circuits in which an operational amplifier with a constant current source and driven by the same current, changes the direction of the current in accordance with the polarities of the output voltages. Transistors 337 and 338 form a level shift and transistors 330 and 327 also form a level shift circuit. The level shift circuit makes the scope of the operation the same between the positive and negative area of the sigmoid function. Transistor 352 is for a correction such that the collector current of transistor 351 becomes the same as the collector current of transistor 353. The operations of the transistors 367, 385, 287 and 307 are the same.

FIG. 16 shows a detailed circuit of a sequence generator 28 (FIG. 3C) for forming a pulse signal applied to the neuron chip. Inverters 401, 402, 404 and 405 form a clock signal. The clock signals are separately formed for a rise of a latch signal of flip-flop FF and a fall of a latch signal of flip-flop FF. The flip-flop in FIG. 16 performs a latching at a rise of a clock and the inverter and flip-flop FF. Thus, the inverter and flip-flop form a flip-flop circuit for a latching. For example, when DCLK passes one inverter 401, it forms a clock signal for performing a latching of the data at the fall of DCLK. When DCLK also passes inverter 402, it forms a clock signal for performing a latching at a rise of DCLK. Similarly, the output of inverter 404 forms a fall of WCLK and inverter 405 forms a rise of WCLK. Flip-flop 410 latches the SYNC signal at the fall of DCLK. Flip-flops 410 and 415 delay SYNC signal by one cycle of DCLK to form SYNC2. Therefore, SYNC signal and the signal delayed by one clock from SYNC signal form a pulse of one $\tau$. After a rise of SYNC signal, the pulse of $1\tau$ (one period of DCLK) enables the integration capacitor in the differential amplifier to perform a discharge. Namely, CRST is a reset signal for the capacitor. Signal DSS2 is formed by obtaining a pulse of $1\tau$ of the DCLK period from the fall of the SYNC signal and is for forming a sample hold signal of the capacitor within the AND circuit.

In flip-flop 411, WCLK is the clock and DCLK is data. Thus, flip-flop 411 performs a latch of the DCLK signal at WCLK. Thereafter, the SYNC signal becomes high at NAND gate 414 and WCLK, coming immediately after DCLK becomes high, is used as a trigger signal to form a clock of flip-flop 443. Flip-flop 443 receives a sign bit of the digital weight data WD at the first WCLK after the SYNC signal becomes high. The sign bit is MMB of serial digital weight data. Flip-flop 443 latches the sign bit at a timing of flip-flops 411, 414 and 440. Binary counter 426 counts the number of WCLK. As the 16-bit digital weight data is received, the digital weight data is counted 16 times upon a completion of a counting operation. Thus, the output becomes high and is entered into inverter 423. The input to inverter 423 designates that the count of the 16 bits is completed. Thus, this signal ensures that the weight data input serially to the ANP is transmitted into shift register 27 (FIG. 3C). The LSB bit of counter 416 is input to inverter 422. The output of inverter 422 forms a CSO signal. CSO is a control signal of the daisy chain circuit. It comprises a delay circuit for carrying out a daisy operation such that the next CS is produced after the CS of the previous timing falls to prevent a competition of signals output from two ANPs in the previous stage. The delay time for the delay circuit is formed by counting WCLK and the value of the counter. When counter 416 completes the count, the designation signal for notifying a completion of the count to flip-flop 433 is latched to inverter 423 at 7 WCLK. The latch signal is returned to counter 416 and to inverters 437 and 438, thereby preventing counter 416 from executing an incrementing operation. When the output of inverter 438 becomes low the output Q of flip-flop 433 is input to flip-flop 442, thereby forming a gate signal for the output of shift register 408. Shift register 408 sequentially shifts 16 digital weight data and when the numerals of 15 bits (except the sign bit) are arranged in parallel, they are output The gate signal WR prevents an output during the period of shifting and produces one upon receiving all the 15 bits. The content of the shift register 408 is applied to a multiplier in the ANP. The signal output from flip-flop 433 is divided to be used for the enable signal and for the shift register.

A daisy chain circuit is shown in the lower part of FIG. 16. The output of counter 416 is delayed by flip-flop 434 and flip-flop 445 triggers the delayed signal. Therefore, DCLK is shifted by 1* with the head portion of the DCLK pulse cut. The CSI signal itself sometimes does not have the same period as that of DCLK. Then, in order to form CSO from CSI, the beginning part, for example, the waveform corresponding to two microseconds, is cut. The waveform is then delayed by that amount and thereafter the DCLK signal is formed. Gates 425 and 427 form a buffer gate of the CSI and respectively operate as positive and inverter buffers.

FIG. 17 shows the phase control circuit 29 shown in FIG. 3C for forming a sample/hold S/H signal and an OC signal. The S/H signal is divided to be input to inverter 515 and gate 524. The OC signal is similarly divided. When the S/H signal is input to gate 525 through inverter 515, 8 inverter stages are provided. One signal with the same phase as the S/H signal and another signal with the opposite phase are formed. Several stages of inverters are connected in cascade and the output of one cascade line is input to the other cascade line, thereby avoiding a situation in which the outputs from both the first and second lines of the cascade are simultaneously "1". That is, the sample/hold S/H signal forms two signals comprising S/H0 and S/H1 to avoid the situation in which both become "1". Thus, the inverter chain is a delay circuit for avoiding a concurrent ON state of both S/H signals. The delay time is determined by the length of the inverter chain and the output of one inverter chain turns on several stages after the other is turned on. The same process is applied to SHD0 and SHD1. The circuit relating to the OC signal operates in basically the same manner as recited above, and the CRST signal is input to gates 528 and 529 and in the case of CRST=1, both output from the two chains are compulsorily turned to "1". The situation in which both OC0 and OC1 are simultaneously turned to "1" is avoided, but only when CRST is "1", do both OC0 and OC1 turn to "1". Therefore, the reset function for charging a capacitor of an integrator through a control of the analog switch is realized.

FIG. 18 provides shift register 27 (FIG. 2) of 15 bits. Gates 602, 603 and 614 and flip-flop 627 correspond to one bit and are used for the following explanation. As the output from flip-flop 627 at the previous timing is input to gate 603, this is the input from the previous bit and becomes a data signal for shifting. The other signal input to gate 603 is SHFT, namely, an inverted signal of the shift signal. This is a shift control signal and if it is varied, a shift instruction is carried out. The output of flip-flop 627 is input to gate 602. Thus, the output of flip-flop 627 is fed back to the input of gate 602. The inverted SHFT signal is applied to the other input of gate 602 and this phase is different from that of the signal input to gate 603. Therefore, if the shift is invalid, the present output is maintained. The clock signal is entered independently from a shifting. The shifting operation is not carried out even if the clock is received. The previous bit is shifted and input through gate 603 only when a period of the shift signal SHFT is effective, thereby performing a shift operation. A WR signal is input to AND gates 632 and 633, and forms a selection signal to determine whether the outputs for respective bits are produced and forms a control signal to determine whether or not the data stored in the shift register is transmitted to the multiplier. Inverter 620 provides a reset signal to 5 out of 15 flip-flops and gate 626 provides a reset signal to 10 flip-flops. Shift register 608 has a function of a shift enable SHFT and output enable WR.

Next, the neuron computer of the present invention is explained by referring to a feed-back type network.

Figure 19A:
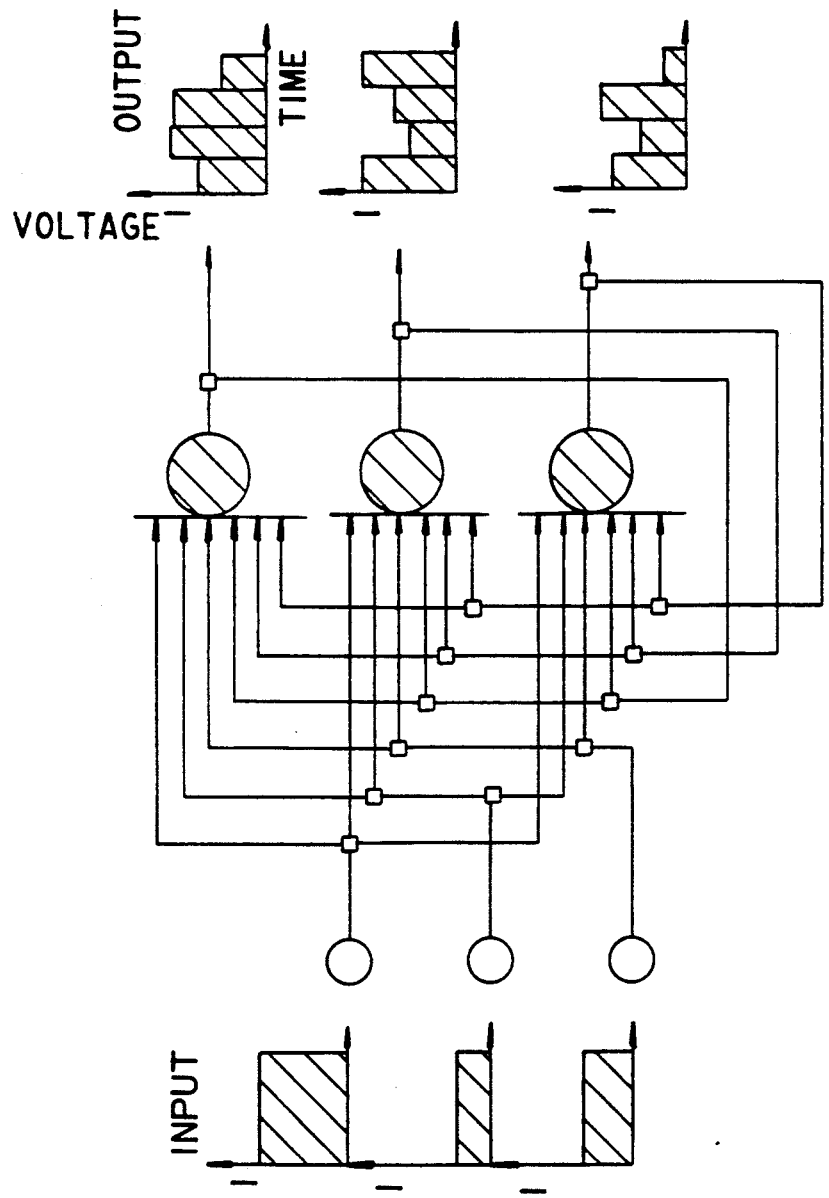
FIG. 19A is a conceptual view for explaining a feedback type network.

FIG. 19A is a conceptual view of a feedback type network. In this type of network, input exists basically and the feedback path through which the signal is output from the self part is returned. The feedback type apparatus is used for the first case in which one layer in the layered type neural network is used in a time divisional multiplexed manner or for the second case in which a so-called Hopfield type neural network is used.

In the first case, the input and output signals of the ANP are provided in a time divisional manner and the output data of the same ANP are sequentially output at every constant sequence cycle at the output of respective ANPs and one of the sequence cycles operates sequentially as the input layer, the intermediate layer and the output layer. In the second case, the output voltage is fed back to the input until the output of the ANP reaches a predetermined value, that is, becomes stable. When the fed-back result is output the cycle is repeated until the fed-back result complies with the previous data, namely, the data output by itself previously, and the state is converged if a stable solution is reached.

Figure 19B:
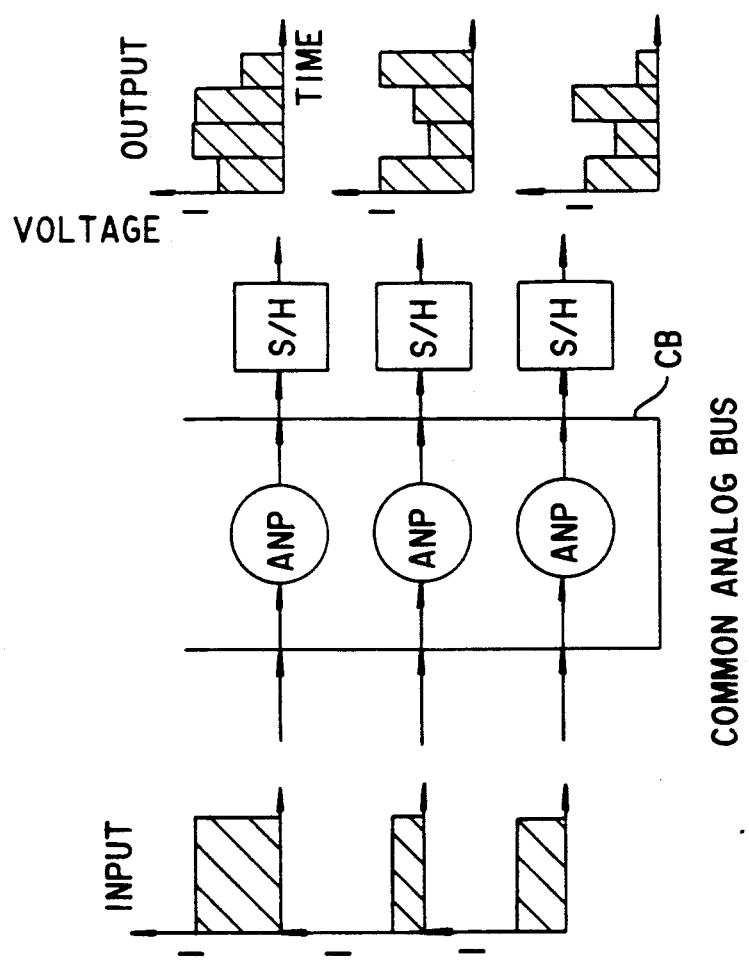
FIG. 19B shows an example in which a feedback type network can be realized by the neuron computer of the present invention.

According to the embodiment of the present invention, as shown in FIG. 19B, the feedback type is realized by the common analog bus CB, thereby forming a feedback path. The output obtained by the calculation of the self ANP is fed back to respective ANPs through the feedback path, and this feedback operation is repeated.

Figure 20:
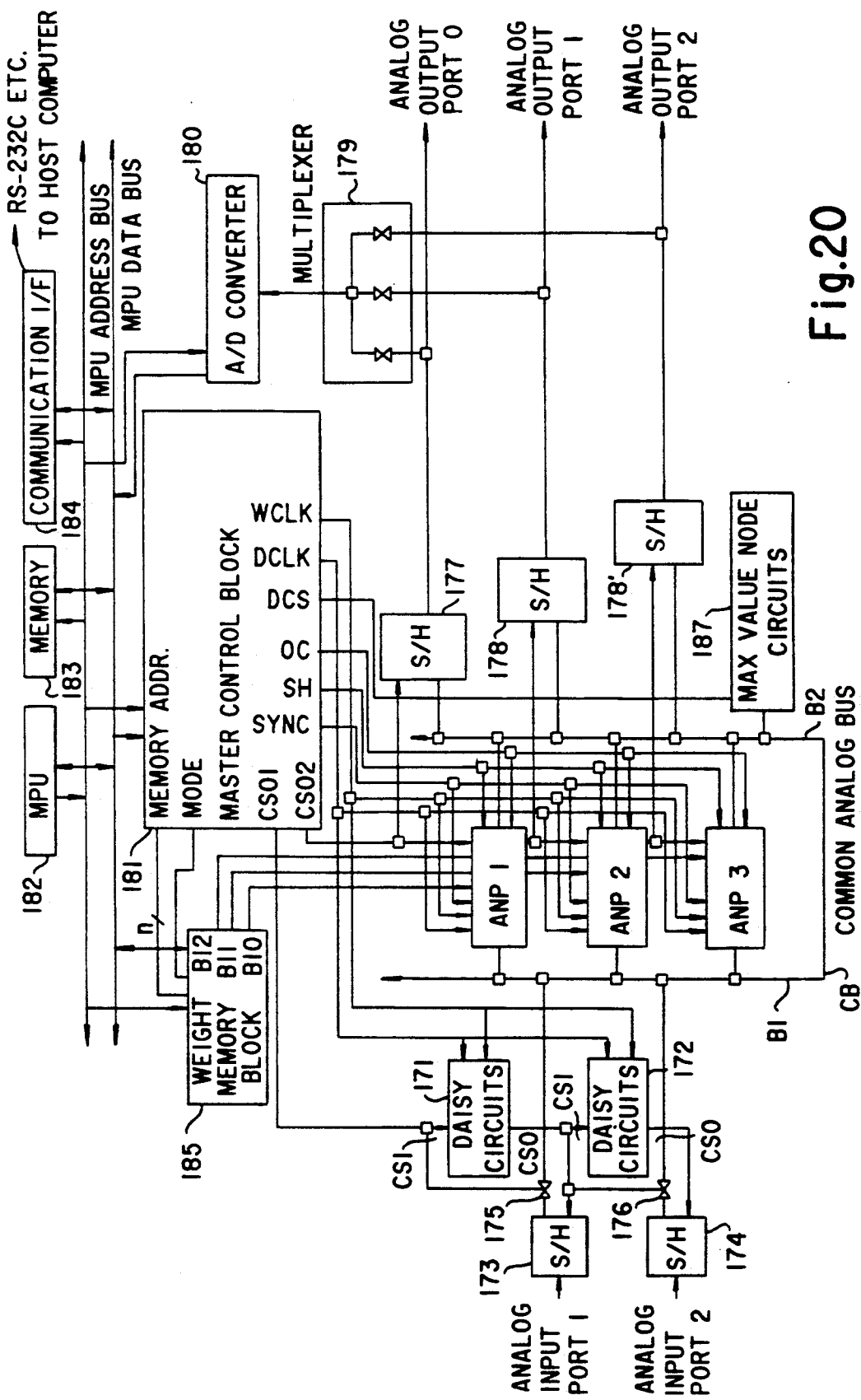
FIG. 20 shows a detailed block diagram of one embodiment for forming a first feedback type network in accordance with a neuron computer of the present invention.

FIG. 20 shows an embodiment of a neuron computer of the present invention which is realized by a feedback type network which operates as a layered type network. The sum-of-the-products operation is carried out for the time divisional analog input signal from analog input ports 1 and 2 in ANPs 1, 2 and 3 and ANPs 1 and 2, and operates as the intermediate layer. Output is produced in a time divisional manner from ANPs 1, 2 and 3 to analog bus B2. The output signal is fed back to analog bus B1 through analog common bus CB of a feedback part and again the sum-of-the-products operation is applied to the feedback signal at ANPs 1, 2 and 3. ANPs 1, 2 and 3 are made to operate as the output layer, thereby realizing a layered type network. Max. value node circuit 187 receives DCS output of the master control block and produces a dummy signal to analog bus B2. DCLK and WCLK are respectively input to daisy circuit 171 and the master control block to define the timing of the rise and fall of the CSI signal.

Figure 21A:
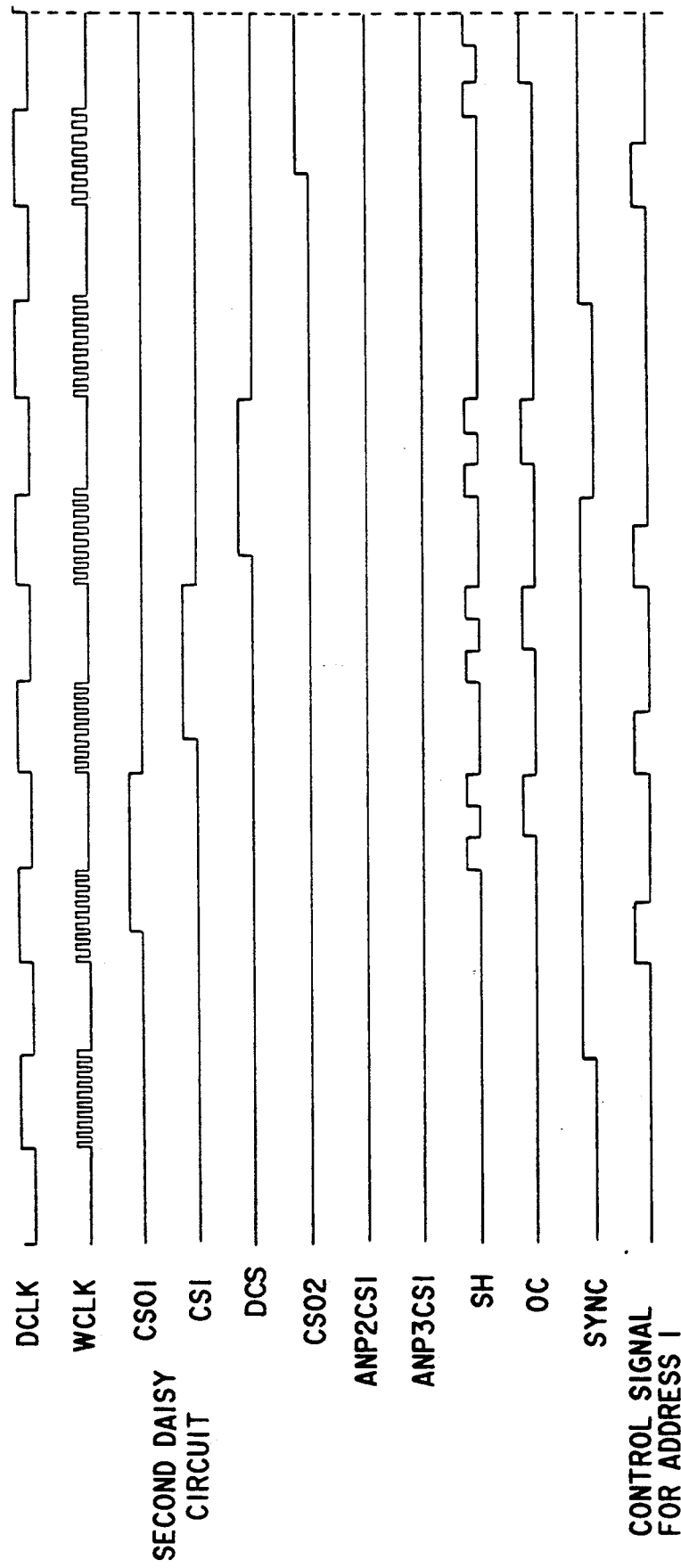
FIGS. 21A and 21B show timing charts for signal processing in the embodiment shown in FIG. 20.
Figure 21B:
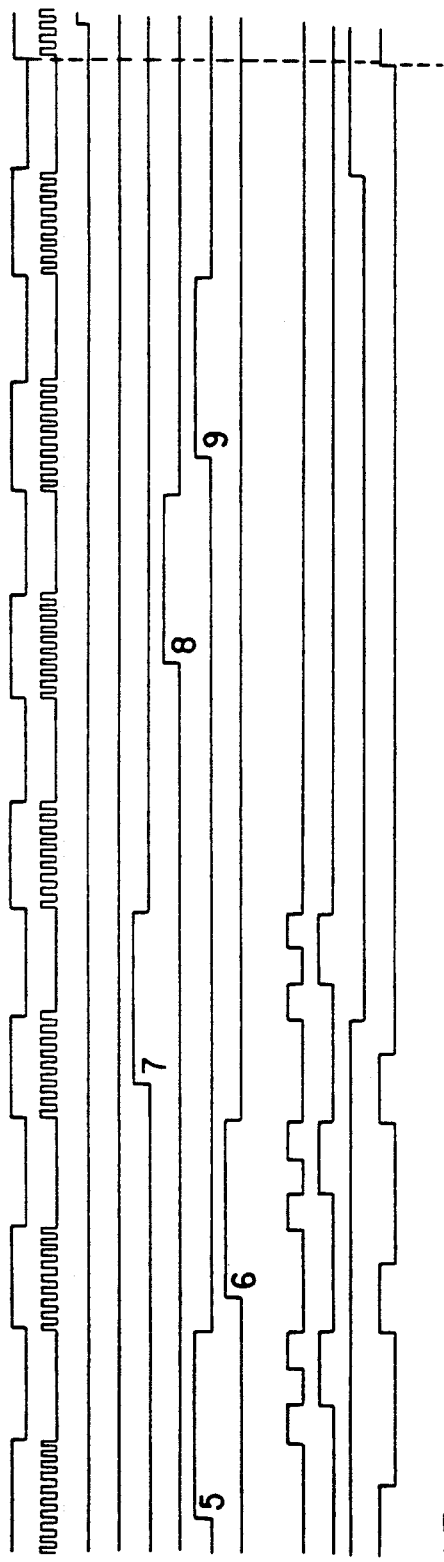

FIG. 21A shows a timing chart of the feedback type layered network. WCLK is produced only during the rise of DCLK. After the rise of DCLK, the analog signal is made constant and the weight data is input serially. CSO1 from master control block 181 is input to daisy circuit 171 at a timing before they are arranged in parallel and, as shown by 1, the signal rises. At this time the analog signal held in the sample hold (S/H) circuit after the analog signal is input from analog input port 1, appears on the analog bus B1 through analog switch 175 and the sum-of-the-products operation is conducted at ANPs 1, 2 and 3. Upon the input of the next DCLK, the CSI to daisy circuit 171 rises as shown by time ②. The signal from the sample/hold S/H circuit for holding the input signal from the analog input port appears on the analog bus B1 through the analog switch and the second sum-of-the-products operation is conducted at ANPs 1, 2 and 3. Further, after DCLK is input in the next timing, the dummy signal DCS is produced from the master control block shown by time ③ and the third sum-of-the-products operation for the fixed voltage is carried out at ANPs 1, 2 and 3. While the next SYNC signal rises, the sum-of-the-products operation is carried out by ANPs 1, 2 and 3 for the output layer. Only during the high period of the address count inhibiting signal applied to address 1 of the weight memory, WCLK for counting the address counter is enable and the count of the address counter is prohibited at times other than those recited above. Next, when CSO2 is applied to ANP1 from the master control block, ANP1 produces the result of the previous sum-of-the-products to the analog bus B2 and the result is fed back to the analog bus B1 through analog common bus CB. Then, as shown in time ④, the sum-of-the-products operation is again carried out at ANPs 1, 2 and 3. After CSO2 is delayed by a predetermined period in a daisy chain circuit in the ANP, the input signal CSI is applied to ANP2 as shown by time ⑤, and this time the output signal from the ANP is applied to ANP1 again through analog bus B2, common bus CB and analog buses A1 and B1, thereby performing the sum-of-the-products operation. Similarly, after CSO from ANP2 is delayed by the predetermined period, the delayed CSO becomes a CSI signal of ANP3. When the CSI signal rises as shown by time ⑥, the output signal of ANP3 is again fed back to ANPs 1, 2 and 3 through analog bus B2, common bus CB and analog bus B1, thereby performing the sum-of-the-products operation. Similarly, as shown by time ⑦, when the signal DCS from the dummy node rises, the sum-of-the-products operation is carried out for the fixed voltage in ANPs 1, 2 and 3. Upon the following rise of the CSO2 signal, the output is produced from ANPs 1 and 2 through the S/H circuit as shown by times 8 and 9. Analog input port 2 does not produce the signal.

ANPs 1, 2 and 3 operate as the intermediate layer in times ①, ② and ③ and as the output layer in times 4, 5 and 6. Accordingly, only one layer of ANPs 1, 2 and 3 form a layered type network.

Figure 22:
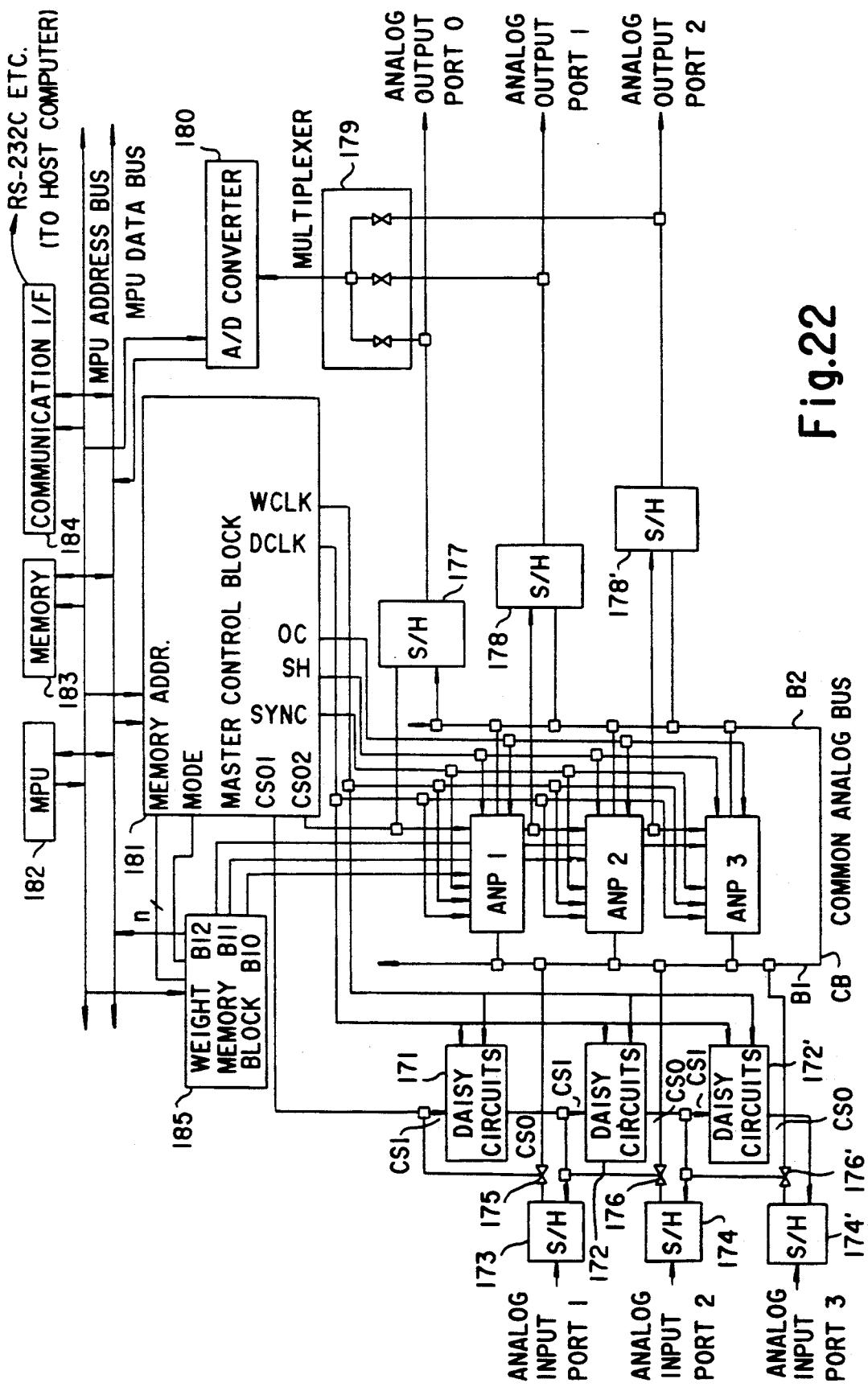
FIG. 22 shows a detailed block diagram of the second feedback type network which is formed by the neuron computer according to the present invention.

FIG. 22 shows an embodiment in which an analog neuron computer is formed by a Hopfield type feedback network.

Figure 23B:
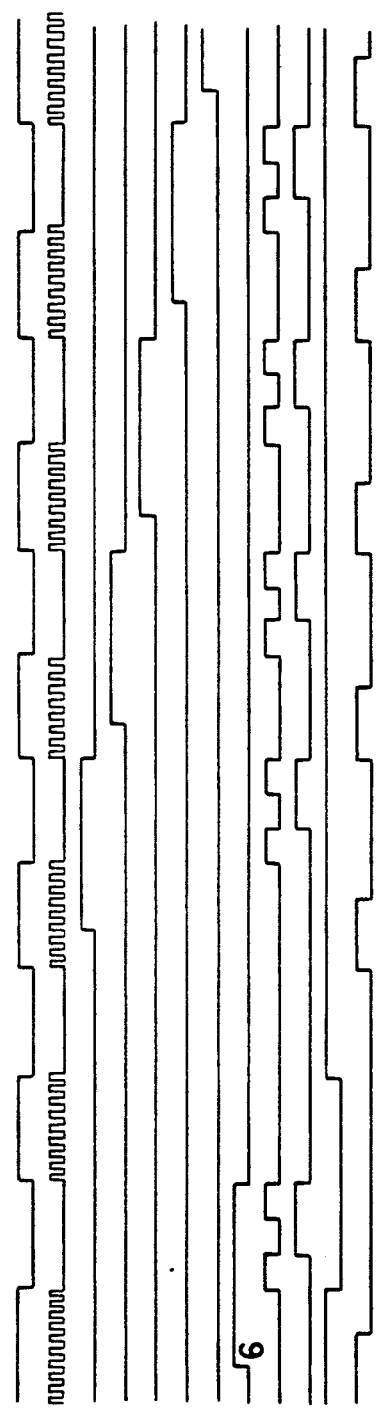
FIGS. 23A and 23B show a timing chart for signal processing in the embodiment of FIG. 22.
Figure 23A:
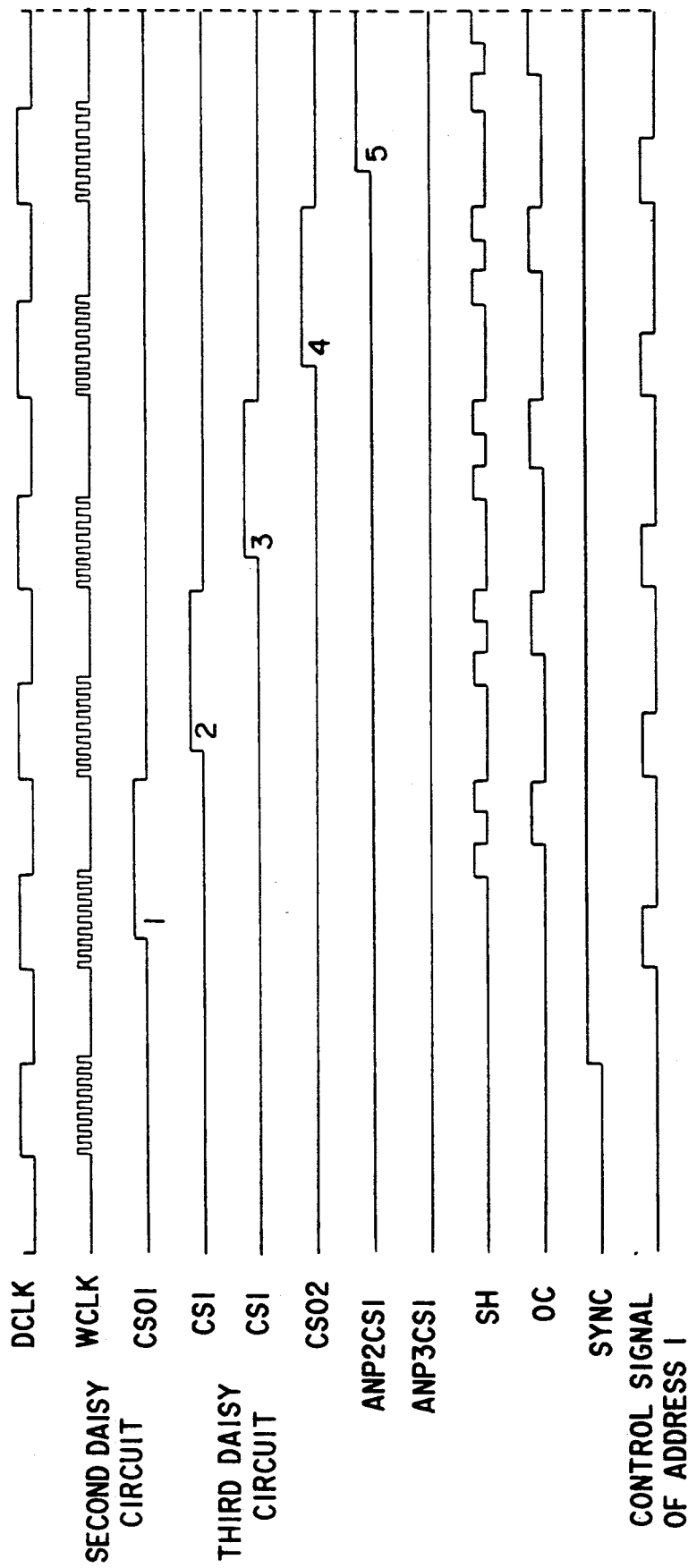

FIGS. 23A and 23B show a timing chart of the embodiment shown in FIG. 22. The output from the memory address terminal and mode terminal of master control block 181 is added to weight memory block 185 and B10 of the data output from weight memory block 185, which is connected to ANP1. B11 is connected to ANP2 and B12 is connected to ANP3. The output signal from the terminal for CSO1 of master control block 181 is applied to daisy chain circuit 171 and analog switch 175. The output from sample/hold circuit 173 from the analog input port 1 is provided to analog bus B1. This signal is then delayed for a predetermined period by daisy chain circuit 171 and CSO output is produced. This output is applied to daisy chain circuit 172 as CSI. The signal of sample/hold circuit 174 connected to analog input port 2 is provided on analog bus B1 through switch 176. The output signal CSO of daisy chain circuit 172' simultaneously opens the output switch 176' of sample hold circuit 174', which is connected to analog input port 3, and the signal output from the output switch 176' is provided on analog bus B1. ANP1 performs a single product and sum operation during the period of a DCLK signal and when the DCLK signal is high, the weight clock is driven and the digital weight data is input in synchronization with the weight clock, which is multiplied by the analog input signal. When the latter part of the DCLK is low, the sample/hold signal S/H becomes high, enabling a capacitor integrator to perform a summing operation. During period 1, when CSO1, namely, the CSI of daisy chain circuit 171, is high, ANPs 1, 2, and 3 perform a product and sum operation on the analog signal on bus B1. When the OC signal from the master control block 181 becomes high, ANPs 1, 2, and 3 perform an offset cancellation and a sample hold operation. This results in a completion of one cycle of the product and sum operation. Next, when input signal CSI reaches the second daisy chain circuit 172, it becomes high as shown by 2, and ANPs 1, 2 and 3 perform a product and sum operation on the input signal from the analog input port. When the product and sum operation period is completed, the CSI signal is input to daisy chain circuit 172' and the output signal is produced from sample/hold circuit 174' and, as shown by 3, the third product and sum operation cycle is cut.

Next, CSO2 signal 4 is produced from master control block 181 and the signal formed in the previous product and sum cycle from ANP1 is fed back to analog bus CB. The product and sum operations are simultaneously conducted by ANPs 1, 2 and 3 for the feedback signal. Next, after being delayed for a predetermined period, the CSO output signal from ANP1 is applied to ANP2 as shown by ⑤. The signals stored in the timing of the product and sum cycle of the previous timing are output from ANP2 in a daisy-chain-like manner. The signal is fed back to ANPs 1, 2 and 3 through analog bus CB and the product and sum operation is facilitated as shown by 5. Simultaneously, after delaying the signal period for a predetermined period, the CSO of ANP2 is added to ANP3 as shown by 6, and the output from ANP3 is fed back to ANPs 1, 2 and 3 through the analog bus CB to perform a product and sum operation at 6. As shown in FIGS. 23A and 23B, the feedback type network and the outputs from 3ANPs, perform six product and sum operations the results of which are output to analog output ports 0, 1, 2, and 3 through sample/hold circuits 177, 178 and 178'. The output signals from sample/hold circuits 177, 178 and 178' are selectively output by multi-analog multiplexer 179 and supplied to the digital control circuit comprising MPU182, memory 183, and communication interface 184 through A/D converter 180. MPU 182 determines whether the neuron output state at the present time is the same as the neuron output state of the previous time. If they are in the same time status, the system can be considered to have become stable. Therefore, the operation is carried out by using a single common analog bus CB through the feedback operation and is repeated to reach a stable resolution which is deemed as a final output.

Figures 24, 24A:
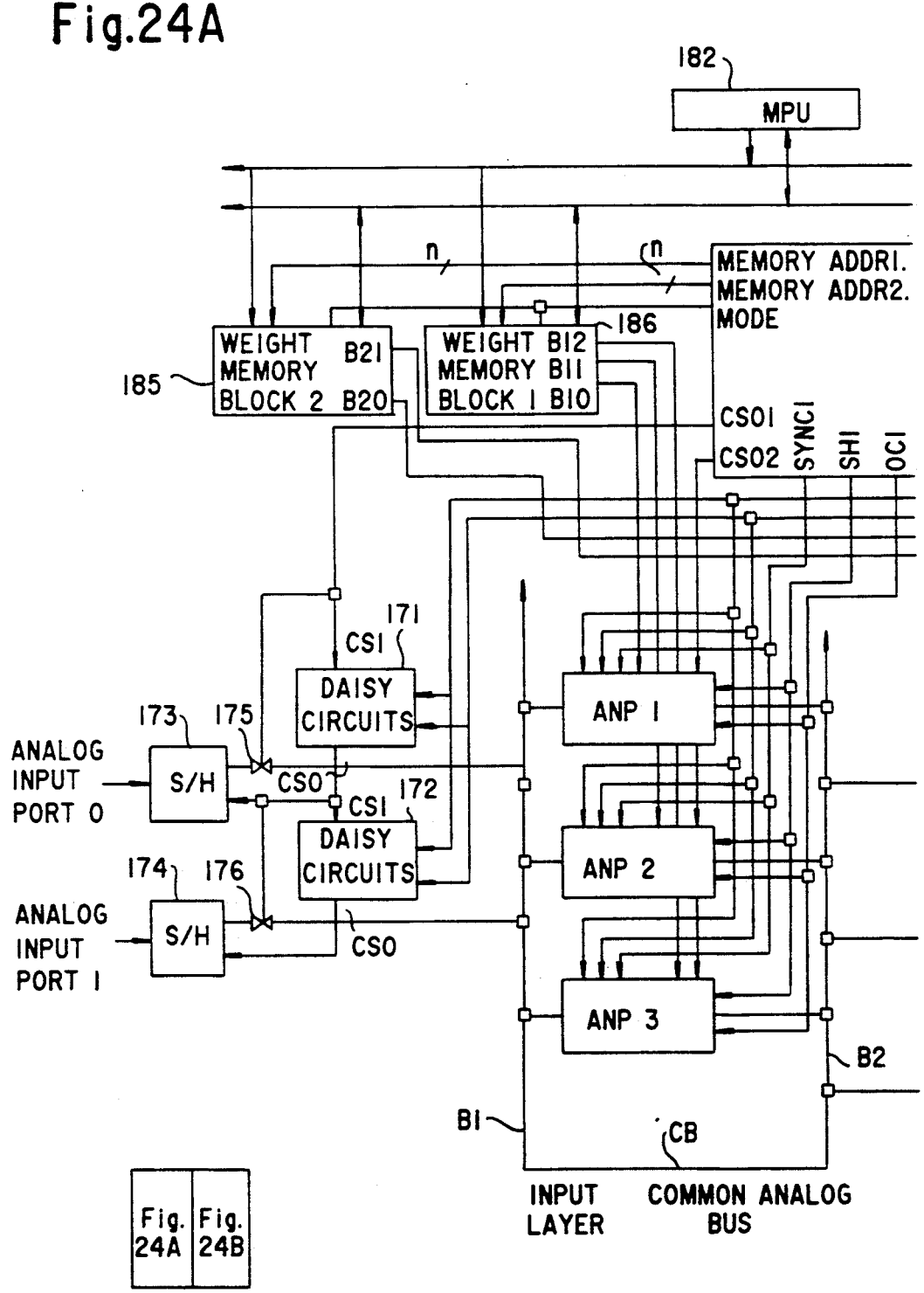
FIG. 24 is another detailed block diagram of another embodiment in which a layered type neuron computer is combined with a feedback type neuron computer.
Figure 24B:
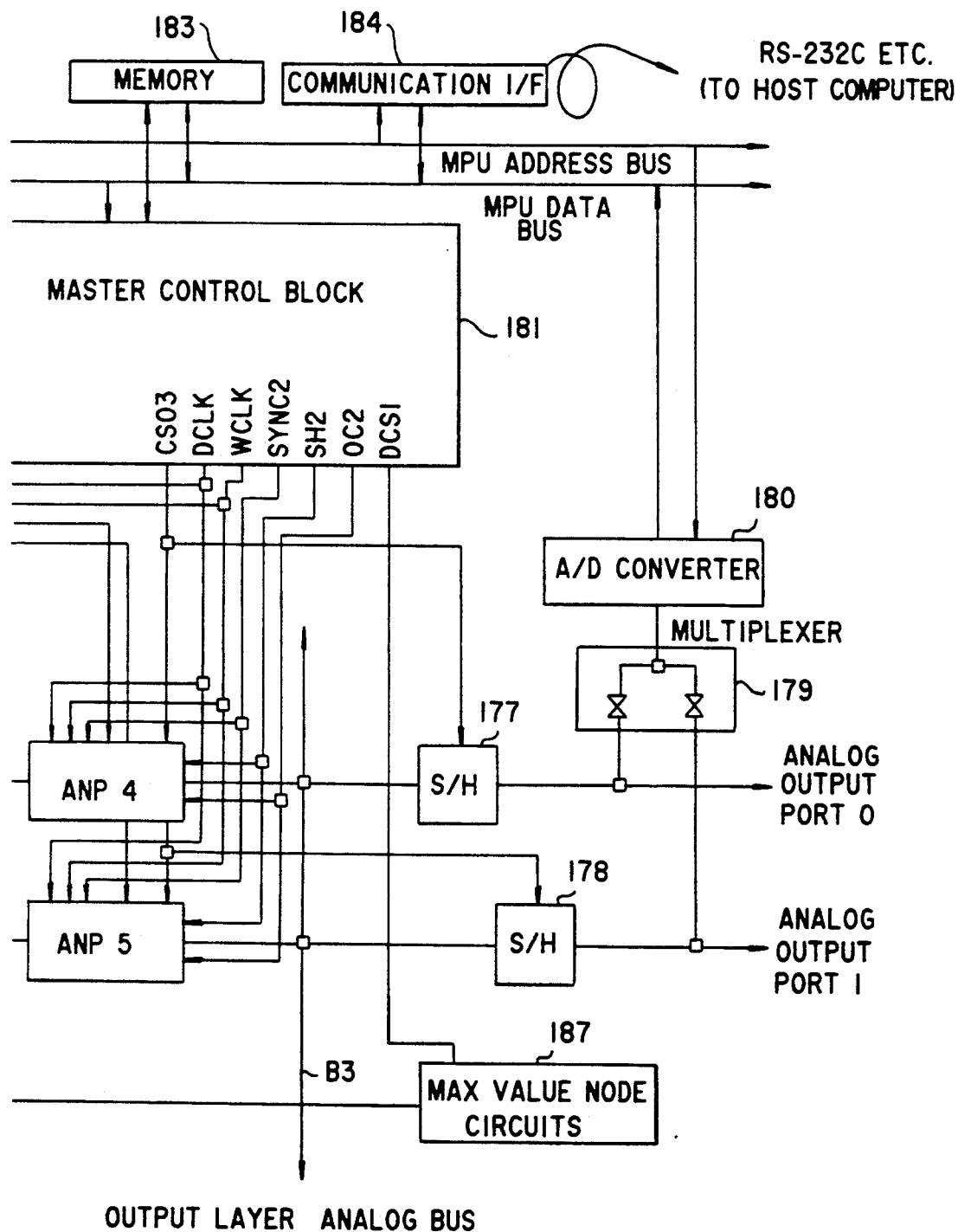
Figure 25A:
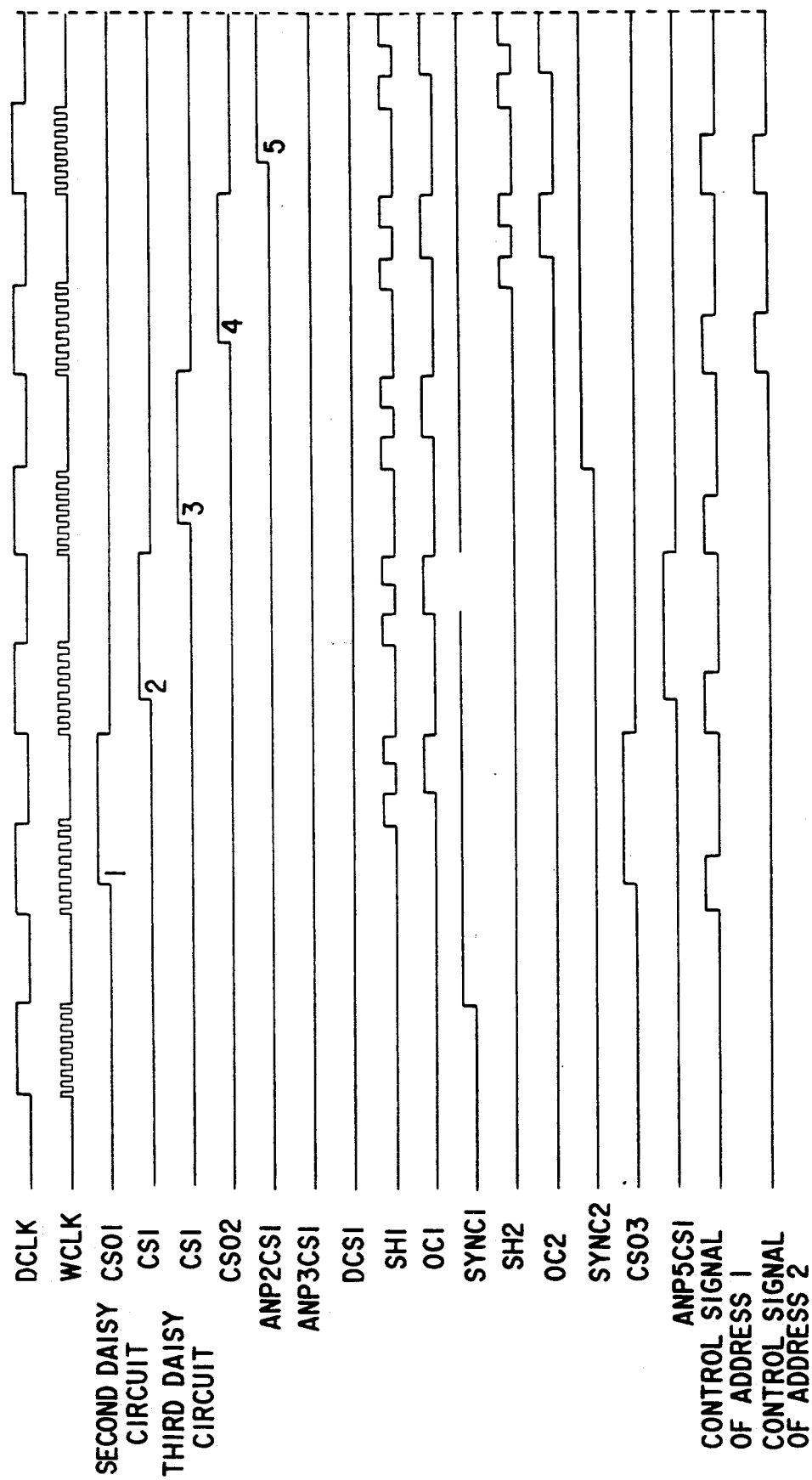
FIGS. 25A and 25B show a timing chart for processing a signal in an embodiment of FIG. 24.
Figure 25B:
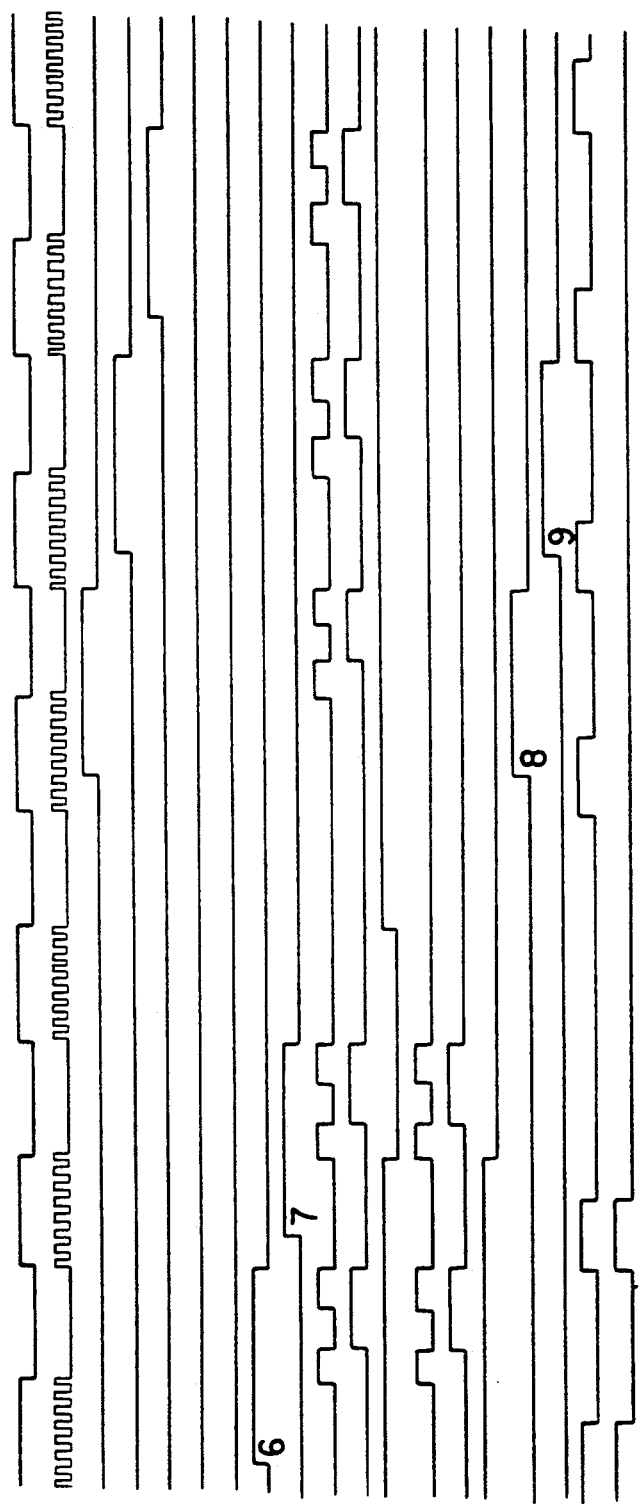

FIG. 24 shows an embodiment in which a feedback type network is combined with a layered network. A daisy circuit is provided as an input layer, ANPs 1, 2 and 3 are provided at the intermediate layer and ANPs 4 and 5 are provided at the output layer. The outputs from ANPs 1, 2 and 3 in the intermediate layer are fed back to analog bus B1 through analog bus B2 and common analog bus CB. Max. value node circuit 187 is connected to analog buses B1 and B2 as a dummy node. The outputs of ANPs 4 and 5 forming the output layer are output from analog output ports 0 and 1 through sample/hold circuits 177 and 178, respectively. P3 is the output layer analog bus. An operation of the neural network shown in FIG. 24 is explained by referring to FIGS. 25A and 25B.

DCLK and WCLK are input to daisy circuit 171 and ANPs 1, 2, 3, 4 and 5 through master control block 181. Master control block 181 inputs CSO1 to first daisy circuit 171 as a CSI, as shown by time ①. Then the signal from analog input for 0 appears on analog bus B1 through sample/hold circuit 173 and switch 175 and a sum-of-the-products operation is conducted in ANPs 1, 2 and 3 under the control of SH1 and CS1. Next, a predetermined time after the fall of CSO1, the CSI signal to be input to the second daisy circuit 172 rises as shown by time ②. Then the signal is input from analog input port 1 to sample/hold circuit 174 and switch 176 and the sum-of-the-products operation is carried out in ANPs 1, 2 and 3 in analog bus B2, as shown in SH1. Similarly, a predetermined time after the fall of the CSO signal, the CSI signal to be input to the third daisy circuit rises as shown by time ③. Then the sum-of-the-products operation is carried out at ANPs 1, 2 and 3 and the intermediate layer. The outputs of ANPs 1, 2 and 3 in the intermediate layer rise to be output to analog bus B2 when CSO2 rises, as shown by time ④, and is applied to ANP1. The output of ANP1 is fed back to analog bus B1 through the common analog bus CB. Thus, ANPs 1, 2 and 3 perform the sum-of-the-products operation again under the control of SH1 and OC1. The output of ANP1 appears on the analog bus B2. The sum-of-the-products operation is carried out in ANPs 4 and 5 under the control of SH2 and OC2, respectively. Therefore, in this embodiment ANPs 1, 2 and 3 in the intermediate layer and ANPs 4 and 5 in the output layer perform the sum-of-the-products operation simultaneously. Next, a predetermined time after the fall of CSO2, the CSI signal is input to ANP2 in the intermediate layer, as shown by time ⑤, and the output signal of ANP2 is fed back to analog bus B1 through ANP2 common bus CB. Therefore, the sum-of-the-products operation can be conducted again in ANPs 1, 2 and 3. The sum-of-the-products operation can be carried out at the same time.

Further, as shown in ⑥, when the CSI signal is input to ANP3, ANP3 produces an output signal on the address bus B1, thus enabling a sum-of-the-products operation to be carried out simultaneously in ANPs 1, 2 and 3 in the intermediate layer and in ANPs 4 and 5 in the output layer.

Next, when dummy signal DSCI is input to max. value node 187 at time ⑦, a fixed voltage is input to analog bus B at time ⑦. This output voltage is fed back through common bus CB and analog bus B1 and ANPs 1, 2 and 3 perform the sum-of-the-products operation on it. Sum-of-the-products operations can also be conducted in output layer ANPs 4 and 5.

SYNC1 is high during the period in which the sum-of-the-products operation is carried out in the intermediate layer and during the period in which the sum-of-the-products operation is performed in the intermediate layer and in the output layer. SYNC2 is high during the period in which the sum-of-the-products operation is performed in the intermediate layer and in the output layer. When CSO3 is output ANP4 produces an output at time ⑧. A predetermined time after a fall of CSO3 signal, ANP5 produces the output at time ⑨. WCLK is prevented during the period in which address 1 and the enable signal are made low. According to the present invention, the pre-stage layer comprises n neuron chips and the post-stage layer comprises m neuron chips, and thus the number of wirings, as in the conventional art, is nm. However, this number can be greatly decreased as a single analog bus is used in this embodiment. When the analog signal is input to a layer comprising n neuron chips, data can be simultaneously input through the analog port as in a broadcast method. In a neuron chip, one layer can be operated in parallel. Further, a pipeline process can be performed in respective layers, thereby increasing operation speed.

As the neuron chip is manufactured by using an analog circuit, it can be made small, thereby decreasing its power and enabling the neuron computer to be composed of many neuron chips. Further, the number of neuron chips can be easily increased by changing the control pattern stored in the control pattern memory in the master control block.

Figures 26, 26A:
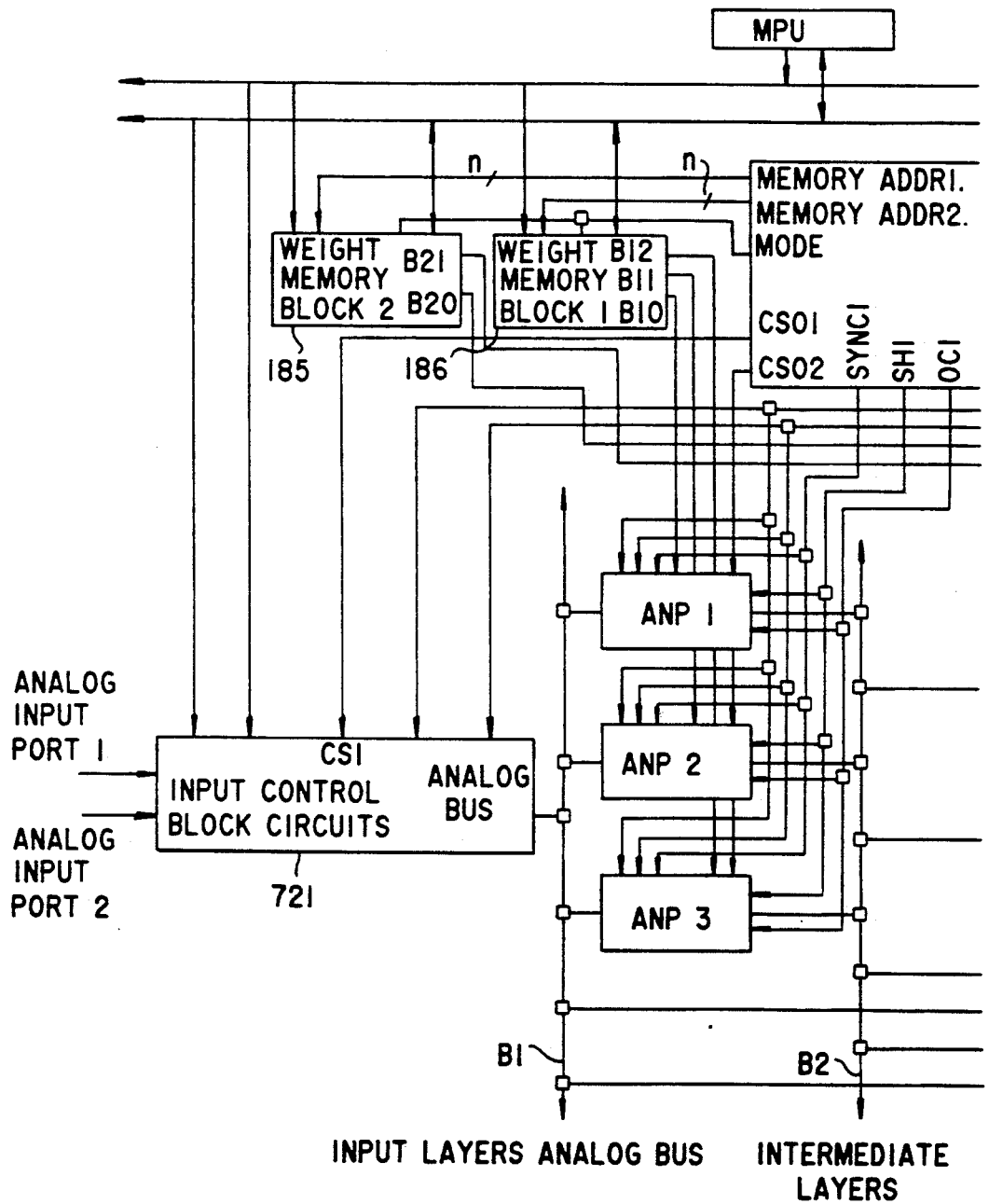
FIG. 26 is a block diagram of a layered type network for carrying out a learning algorithm according to an embodiment of the present invention.
Figure 26B:
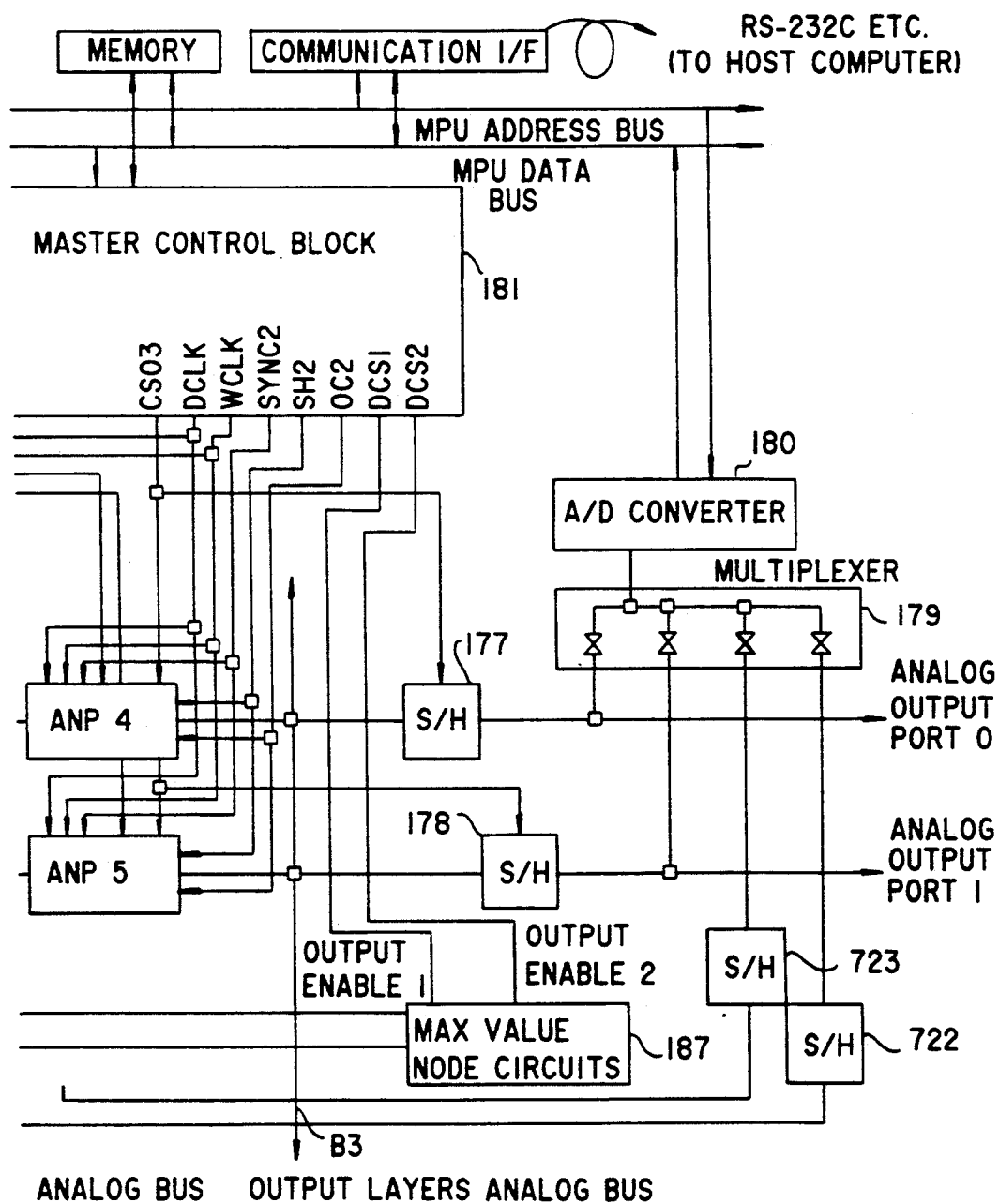
Figure 27B:
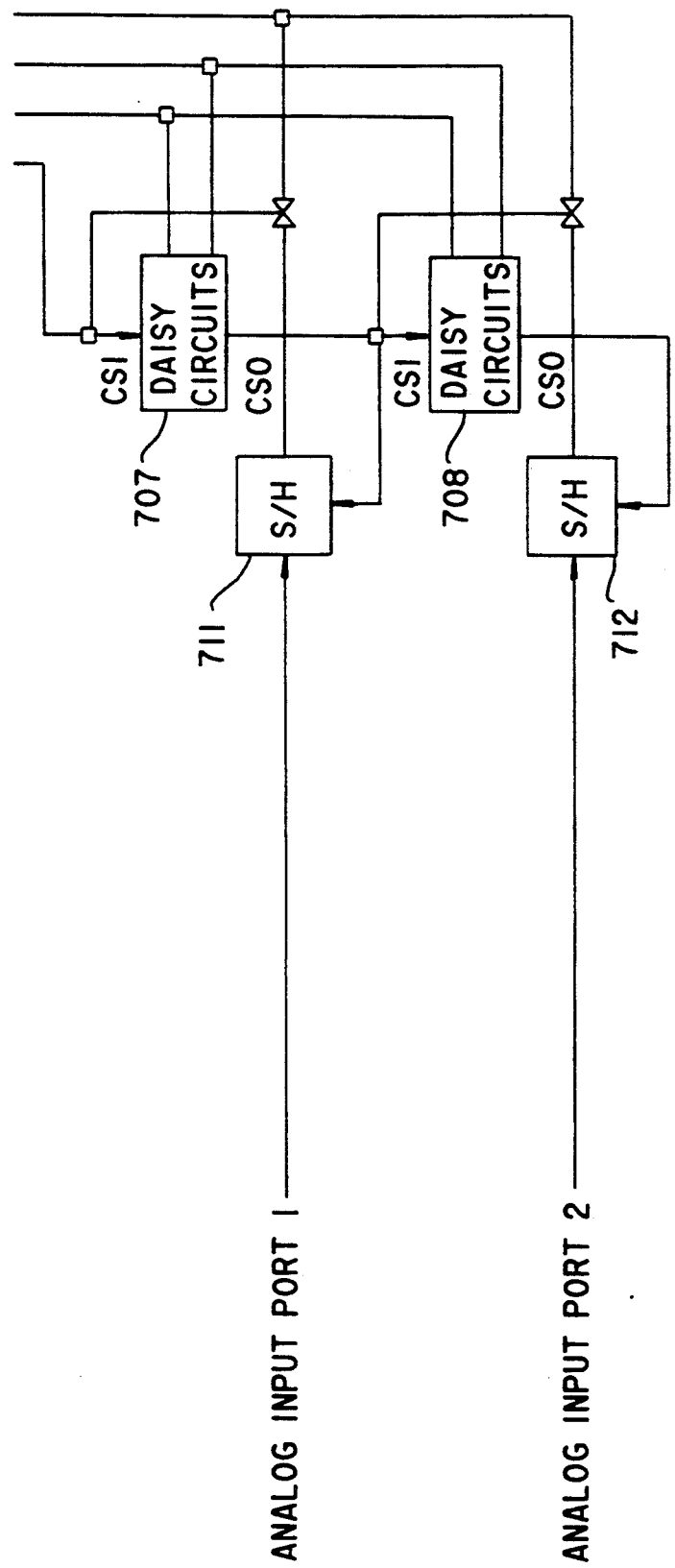
FIG. 27 shows a detailed circuit diagram of an input control circuit of the above embodiment.

FIGS. 26 and 27 are presented to explain the interface circuit between the MPU and the ANP when a learning algorithm is executed in accordance with FIGS. 12C and 12D. FIG. 26 shows the layered type network designated in FIG. 8 with an input control block circuit 721 which determine whether the input data from the MPU or the ordinary analog input signal is received by a network of ANPs. Input control block circuit 721 is provided in the pre-stage, namely, the input stage of the analog bus. Further, the analog buses B1 and B2 are connected to analog multiplexer 179 through sample/hold circuits 722 and 723, respectively. The weight data in the input state and the same parts as in the layered type neural network in the previous embodiment are designated by the same reference numbers and their explanations are omitted.

Input control block 721 receives CSO1 from master control block 181 as CSI and also receives DCLK and WCLK as input. Input control block 721 is connected to the MPU analog bus and the data bus. The input signals from analog input ports 1 and 2 are input to input control block 701. Input control block 721 operates as an input stage and the output is connected to the analog bus B1. All the circuits and blocks shown in FIG. 26 are formed on a board such as a printed board or a semiconductor substrate.

FIG. 27 shows the structure of input control block circuit 721. As shown, input control block 721 comprises address decoder 701, first in first out FIFO memory 702, D/A converter 703, D type flipflop 704 and daisy circuit 705.

When the learning algorithm is executed, data is input to the layered type neural network as complete information. The address from the MPU is then input to address bus 706, the predetermined address is determined by address decoder 701 and 1 bit of data from the MPU is set in D type flipflop 704 as a latch signal. Accordingly, either the data from the MPU is input to the ANP through the analog bus B1 or the analog input from the analog input port is input to the analog input bus through daisy circuits 707 and 708 as in the ordinary mode. When the CSI signal is input from master control block 181, the content of flipflop 704 is 1, the output of AND gate 709 becomes 1 and the output of AND gate 710 becomes 0. Accordingly, the CSI signal is not input to daisy circuit 705 and the CSO signal, which is delayed by a predetermined time from a rise of CSI, remains 0. Therefore, the output of FIFO memory 2 in which the MPU data is stored is not output through D/A converter 703 because CSI is 0 and analog switch 713 is still closed.

Thus, since the output of AND gate 709 is 1, and this is an ordinary mode, the CSI of daisy circuit 707 becomes 1. The analog input from analog input port 1 passes to the analog bus through sample/hold circuit 711. After the input is completed, CSI falls. After a predetermined time passes, CSO is input to daisy circuit 708 to have a daisy operation performed on it. At this time, the input from analog input port 2 is input to the analog bus through sample/hold circuit 712. The analog input is input to respective neuron chips in the intermediate layer in a time divisional manner.

On the other hand, when the content of flipflop 704 is 0, the CSI from master control block 181 is input to digital circuit 707 through AND gate 710 and simultaneously, to analog switch 713. In this case, the output from D/A converter 703 is provided at analog bus B1. Upon a completion of this output, the CSO rises and then the last 0 data of FIFO memory is provided at the analog bus through A/D converter 703. A FIFO operation is conducted simultaneously and the CSO signal is fed back to the CSI of daisy circuit 705 through AND gates 714 and 710. The complete information is sequentially output from FIFO memory 702 to analog bus B1. Where A to Z is learned as complete information, FIFO memory 702 becomes empty, thus completing the learning. When FIFO memory 702 becomes empty, the output of analog circuit 714 becomes 0, thereby causing the output of AND circuit 710 to be 0 and closing analog switch 713. Input to FIFO memory 702 is enabled by a predetermined address of the MPU and the MPU data is stored sequentially in the right-most address of FIFO memory 702. The data from the MPU is an input pattern to be learned, and it should be complete. Incomplete information from D0 to Dn are multiple cycles learned and are converted to weight data for the neural network. As a result, the neural network is organized. The weight data corresponding to respective input patterns and Di are determined by the previous learning algorithm and stored in weight memory blocks 1 (185) and 2 (186) through the MPU.

If a previous stage layer comprises n neuron chips and a following stage layer comprises m neuron chip, the prior art requires n×m wires. However, in the present invention, only a single analog bus is required, thus greatly reducing the number of wires. When an input analog signal is received by layers comprising n neuron chips, an input signal is transmitted to all n neurons simultaneously as in the broadcast system, through an analog bus n neuron chips in one layer can be operated in parallel. Further, pipeline processing is conducted in respective layers and this increases the operation speed. The circuit is realized by the analog neuron chip. Therefore, because the power is made small, circuit error may be reduced. This means that a lot of neurons can be used in a neural network. The number of neuron chips can be easily increased by varying the control pattern stored in the master control block.

Further, by selecting the timing for executing the learning algorithm and for receiving the input signal, the learning function of the ANP can be greatly improved.

What is claimed is:

1. A learning system in a neuron computer comprising:
   a neural network receiving analog signals from a first analog bus through an analog input port in a time divisional manner, obtaining a product of the analog signals and weights and performing a sum-of-the-products operation, and outputting analog output signals to a second analog bus in a time divisional manner;
   a control pattern memory, connected to said neural network, for storing a pattern of a signal for controlling said neural network;
   a sequencer, connected to said control pattern memory, for producing an address of said control pattern memory to read a control signal to be provided to the neural network and an address of a weight memory to read the weights;
   said weight memory, connected to said sequencer and said neural network, for storing weight data of the neural network;
   digital control means, connected to said neural network, control pattern memory, sequencer and weight memory, for controlling said neural network, control pattern memory, sequencer, and weight memory, and for executing a learning algorithm; and
   input control means, connected to an input side of said neural network and to said digital control means, for selecting an input signal for executing the learning algorithm input from one of a) said digital control means and b) an analog input signal input from said analog input port so that said input signal and analog input signal are applied to said neural network.

2. The learning system according to claim 1, wherein said input control means comprises FIFO memory means for storing a learning pattern received from said digital control means and to be learned as weight data for the network in according with an order of the input of the learning pattern;

D/A converting means having an input connected to an output of said FIFO memory means;

address decoding means for decoding a predetermined address from a microprocessor which manages an overall system;

latching means for latching at least one bit of the data from the microprocessor when the predetermined address is designated by an output of the address decoding means;

selection means for selecting either a signal from the analog input port or an output signal from said FIFO memory means corresponding to the input signal to be input to said neural network in accordance with said latch information;

daisy circuit means for performing D/A converting of the data read from said FIFO memory means in accordance with a CSI signal from said control pattern memory when said selection means selects the output of said FIFO memory means and for outputting a CSO signal when the data read out from said FIFO memory means is transmitted to an analog neuron processor; and means for transmitting the output from said FIFO memory means when a signal designating that said FIFO memory means has become empty is generated from said FIFO memory means.

3. The learning system according to claim 2, wherein said digital control means calculates an updating quantity of the weight from an error between the output of said neural network produced in response to a respective learning pattern output from said FIFO memory means and a teacher signal or a previous output value so that the error is decreased and the neural network executes the learning algorithm, and said neural network outputting weight updating quantity of said neural network to the weight memory is repeated until said error becomes small and the digital control means stores the determined weight information in the weight memory.

4. The learning system according to claim 2, wherein said neural network includes an analog neuron processor, said daisy circuit feeds back said CSO signal to CSI as a signal to be controlled by an empty signal designating that said FIFO memory means is empty, and said FIFO memory means transmits an output signal to said analog neuron processor through said D/A converter until said FIFO memory means becomes empty.

5. The learning system in a neuron computer according to claim 1, wherein
said neural network, control pattern memory, sequencer, weight memory, digital control means and input control means are formed on one board.

6. The learning system in a neuron computer according to claim 5, wherein
said board comprises a printed circuit board.

7. A learning system in a neuron computer comprising:
   a neural network receiving analog signals from a first analog bus through an analog input port in a time divisional manner, obtaining a product of the analog signals and weights and performing a sum-of-the-products operation, and outputting analog output signals in time divisional manner to a second analog bus;

a control pattern memory, connected to said neural network, for storing a pattern of a signal for controlling said neural network;

a sequencer, connected to said control pattern memory, for producing an address of said control pattern memory to read a control signal to be provided to the neural network and an address of a weight memory to read the weights;

said weight memory connected to said sequencer and said neural network, for storing weight data of the neural network; and digital control means, connected to said neural network, control pattern memory, sequencer and weight memory, for controlling said neural network, control pattern memory, sequencer, and weight memory, and for executing a learning algorithm, and wherein said neural network, control pattern memory, sequencer, weight memory and digital control means are formed on one board.

8. A learning system in a neuron computer comprising:

a neural network receiving signals from a first bus through an input port in a time divisional manner, obtaining a product of the analog signals and weights and performing a sum-of-the-products operation, and outputting output signals in a time divisional manner to a second bus;

a control pattern memory, connected to said neural network, for storing a pattern of a signal for controlling said neural network;

a sequencer, connected to said control pattern memory, for producing an address of said control pattern memory to read a control signal to be applied to the neural network and an address of a weight memory to read weight;

said weight memory, connected to said sequencer and said neural network, for storing weight data of the neural network;

digital control means, connected to said neural network, control pattern memory, sequencer and weight memory, for controlling said neural network, control pattern memory, sequencer, and weight memory, and for executing a learning algorithm; and input control means, connected to an input side of said neural network and connected to said digital control means, for selecting an input signal for executing the learning algorithm input from one of a) said digital control means and b) an input signal input from the input port, so that said input signal and analog input signal are supplied to said neural network.

9. The learning system according to claim 1 wherein said input control means receives digital data for learning from said digital control means, and converts the digital data to analog values to be applied to said neural network, when said digital control means executes the learning algorithm.

10. The learning system in a neuron computer according to claim 1 wherein said learning algorithm is performed by a back propagation method in which a difference between an output signal and a teacher signal is subject to back propagation, and weight of the neural network is determined so that the difference is minimized.

11. The learning system in a neuron computer according to claim 1 wherein said digital control means provides digital data for learning to the input control means when said digital control means executes the learning algorithm for learning the weight stored in the weight memory, by using the weight of the weight memory, and said input control means applies the received data to the neural network so that the output of the neural network is applied to the digital control means.

* * * * *

UNITED STATES PATENT AND TRADEMARK OFFICE
CERTIFICATE OF CORRECTION

PATENT NO. : 5,142,666
DATED : August 25, 1992
INVENTOR(S) : Hideki YOSHIZAWA et al It is certified that error appears in the above-identified patent and that said Letters Patent is hereby corrected as shown below:

On title page, Item [75], after "Kawasaki, all of" insert -- Japan --.

Signed and Sealed this

Twelfth Day of October, 1993

*Attest:*

BRUCE LEHMAN

*Attesting Officer*         *Commissioner of Patents and Trademarks*